(12) United States Patent
Blanc et al.

(10) Patent No.: US 6,606,300 B1
(45) Date of Patent: Aug. 12, 2003

(54) FLOW CONTROL PROCESS FOR A SWITCHING SYSTEM AND SYSTEM FOR PERFORMING THE SAME

(75) Inventors: Alain Blanc, Vence (FR); Pierre Debord, Tourrettes sur Loup (FR); Alain Saurel, Nice (FR); Bernard Brezzo, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/219,081

(22) Filed: Dec. 22, 1998

(30) Foreign Application Priority Data

Feb. 19, 1998 (EP) .............................. 98480007

(51) Int. Cl.$^7$ ............................... H04L 12/56
(52) U.S. Cl. ....................... 370/229; 370/389
(58) Field of Search ................ 370/231, 235, 370/236, 359, 366, 373, 396, 398, 395.52, 400, 401, 410, 426, 522, 535, 229, 389, 411, 468

(56) References Cited

U.S. PATENT DOCUMENTS 4,251,880 A * 2/1981 Baugh et al. ................ 370/468

(List continued on next page.)

FOREIGN PATENT DOCUMENTS

| EP | 0 849 973 A | 6/1998 | ........... H04Q/11/04 |
| WO | WO 95 30313 A | 11/1995 | ........... H04Q/11/04 |

OTHER PUBLICATIONS

Widmer, A. et al., Single chip 4*500 Mbaud CMOS Transceiver Feb. 1996, IEEE, ISSCC96, p. 126–127, 430.*

*Primary Examiner*—Wellington Chin
*Assistant Examiner*—William Schultz
(74) *Attorney, Agent, or Firm*—John D. Flynn; Winstead, Sechrest & Minick, P.C.

(57) ABSTRACT

A flow control process for a switching system having at least one switch core connected through serial communication links to remote and distributed Protocol Adapters or Protocol Engines through Switch Core Access Layer (SCAL) elements. For each input port i, the SCAL element contains a receive Protocol Interface corresponding to the adapter assigned to the input port i and a first serializer for providing attachment to the switch core by means of a first serial communication link. When the cells are received in the switch core, they are deserialized by means of a first deserializer. At each output port, the cells are serialized again by means of a second serializer and then transmitted via a second serial communication link, to the appropriate SCAL. The SCAL contains a second deserializer and a transmit Protocol Interface circuit for permitting attachment of the Protocol Adapter. The flow control process permits two flow control signals, a flow control receive (FCR) from the core to the SCAL, and a flow control transmit (FCX) from the SCAL back to the core. For transmission of the FCR signal in response to the detection of local saturation in the switch core, the process causes transfer of an internal FCR signal to the serializer located within the saturated core. The FCR is introduced in the normal data flow to be conveyed through the second serial link to the remote SCAL corresponding to the saturated input port of the core. An internal control signal can be transmitted to the Protocol Interface that is originating too many cells which results in the overloaded input port of the core. For the transmission of the FCX signal in response to the detection of a saturated Protocol Interface element at one output port, the process generates an internal control signal to the serializer located in the SCAL element. The serializer can introduce a FCX signal in the normal data flow which is conveyed to the core and then decoded by the deserializer in the core. Thus, the core can be informed of the saturation condition that has occurred in the considered output port. Particular adaptations are provided in which the switching system is arranged in a set of individual switching structures mounted in a port expansion mode.

5 Claims, 34 Drawing Sheets

U.S. PATENT DOCUMENTS

| | | | |
|---|---|---|---|
| 5,469,545 A | * 11/1995 | Vanbuskirk et al. | 370/235 |
| 5,490,140 A | * 2/1996 | Abensour et al. | 370/352 |
| 5,668,798 A | * 9/1997 | Toubol et al. | 370/230 |
| 5,673,254 A | * 9/1997 | Crayford | 370/231 |
| 5,777,984 A | * 7/1998 | Gun et al. | 370/230 |
| 6,055,235 A | * 4/2000 | Blanc et al. | 370/389 |
| 6,343,081 B1 | * 1/2002 | Blanc et al. | 370/411 |
| 6,452,900 B1 | * 9/2002 | Blanc et al. | 370/229 |

* cited by examiner

FIG. 1

| TOKEN 7325j | QE 7131j | QE 7132j | 7326j | GNT 7131j | GNT 7132j | 7315j |
|---|---|---|---|---|---|---|
| 0 | X | X | X | 0 | 0 | No change |
| 1 | 1 | 0 | X | 1 | 0 | 0 |
| 1 | 0 | 1 | X | 0 | 1 | 1 |
| 1 | 1 | 1 | 0 | 0 | 1 | 1 |
| 1 | 1 | 1 | 1 | 1 | 0 | 0 |

FIG. 23

FLOW CONTROL PROCESS FOR A SWITCHING SYSTEM AND SYSTEM FOR PERFORMING THE SAME

TECHNICAL FIELD OF THE INVENTION

The invention relates to the telecommunications field, and more particularly to a switching system which is based on a self-routing switch core and having a distributed flow control mechanism.

BACKGROUND ART

Patent applications 96480126.0 (IBM Docket FR996040), 96480125.2 (IBM Docket FR996041), 96480117.9 (IBM Docket FR996042), 96480120.3 (IBM docket FR996045) are non-published European applications illustrating a powerful self-routing switch that provides a high switch rate. Flow control mechanisms are essential in switching systems in order to prevent any loss of data. This is particularly true when the switching architecture is based on a switch core and some distributed and remote Switch Core Access Layer (SCAL) elements which may be located in different premises at a distance of over 100 meters. In such systems, it is highly essential that the switch core remain able to slow down the generation of cells coming from one particular SCAL element even if the latter is located in another physical area.

Additionally, as the distance between the different components tend to increase, it is desired that the different flow control signals be transmitted without any further communication wires, which is not particularly easy since the direction of the flow control signals are reverse to that of the normal data flow. This generally prevents the possibility of introducing the control signals for slowing down the generation of cells in the normal data flow conveying those cells.

Finally, the high requirement for sophisticated switching architectures, involving higher speed and higher number for ports of the switching process, tends to favor some complex architectures in the switching techniques, such as the port expansion architecture. Such a system is based on a set of numerous switch cores, connected in a manner which is not easy to achieve, in order to permit the increase in the number of ports of the overall switching architecture. In this situation it is obvious that the flow control mechanism tends to become even more complex and hard to achieve.

SUMMARY OF THE INVENTION

The technical problem to be solved by the present invention is to provide an efficient flow control mechanism for a high speed switching architecture, based on a self-routing switch core, even when the different components of the architecture are physically located at different and remote areas.

It is an object of the invention to provide a flow control mechanism that does not require additional control leads or wiring for transporting the different flow control signals for slowing down some components in the switching architecture.

It is a further object to provide an efficient flow control mechanism which operates even when the architecture is based on a port expansion with a great number of individual switching structures in order to provide an aggregate, high speed core having an increased number of input and output ports.

This problem is solved by the process and apparatus in accordance with the present invention, and which is defined in the appended set of claims. The flow control process is particularly well suited for a switching system comprising at least one switch core connected through serial communication links to remote and distributed Protocol Adapters or Protocol Engines through Switch Core Access Layer (SCAL) elements. For each input port i, the SCAL element comprises a receive Protocol Interface (PINT) for the handling of the particular protocol corresponding to the adapter being assigned the input port i and first serializing means for providing the attachment to the switch core by means of first serial communication link(s). When the cells are received in the switch core, they are deserialized by means of first deserializing means. On the other hand, at each output port, the cells are serialized by means of second serializing means and then transmitted via a second serial communication link, such as a coaxial cable or optical fiber, to the appropriate SCAL. When the SCAL receives the cells, they are deserialized by second deserializing means and then transmitted to the Protocol Interface (PINT) circuit for permitting the attachment of the Protocol Adapter.

In accordance with the present invention, the flow control process permits the transmission of two flow control signals, a first Flow Control Receive (FCR) signal flowing from the core to the SCAL, and a second Flow Control Transmit (FCX) signal from the SCAL back to the core. This is achieved without any additional wiring or circuitry even when long distances are involved. To achieve this, the process involves the following steps:

For the transmission of the FCR signal in response to the detection of a local saturation into the switch core, the process causes the transfer of an internal FCR signal to the serializer belonging to the corresponding saturated port. Then the FCR is introduced in the normal data flow to be conveyed through the second serial link to the remote transmit Protocol Interface located in the SCAL which is also the SCAL that includes the receive PINT that generates too many cells for the saturated input port. An internal control signal is then generated to that receive PINT, so that the latter can slow down the production of the cells.

Conversely, when the transmit PINT appears to become saturated, the process permits the transfer of an FCX signal as follows. An internal control signal is generated and locally transmitted to the serializer belonging to the SCAL whose output port is saturated. An FCX control signal is then transmitted in the normal data flow to the switch core and is then decoded by the deserializing means located therein. Once decoded, the FCX signal can be used to inform the core of the saturation that occurred in the transmit PINT.

Particular adaptations are provided when the switching system is arranged in a set of individual switching structures mounted in a port expansion mode. This is particularly achieved with the method as defined in the claims. Thus, there is provided an effective flow control without requiring the use of additional wires or communication links for transmitting the control signals in a direction that is reverse with respect to that of the control flow.

DESCRIPTION OF THE DRAWINGS

Figure 1:
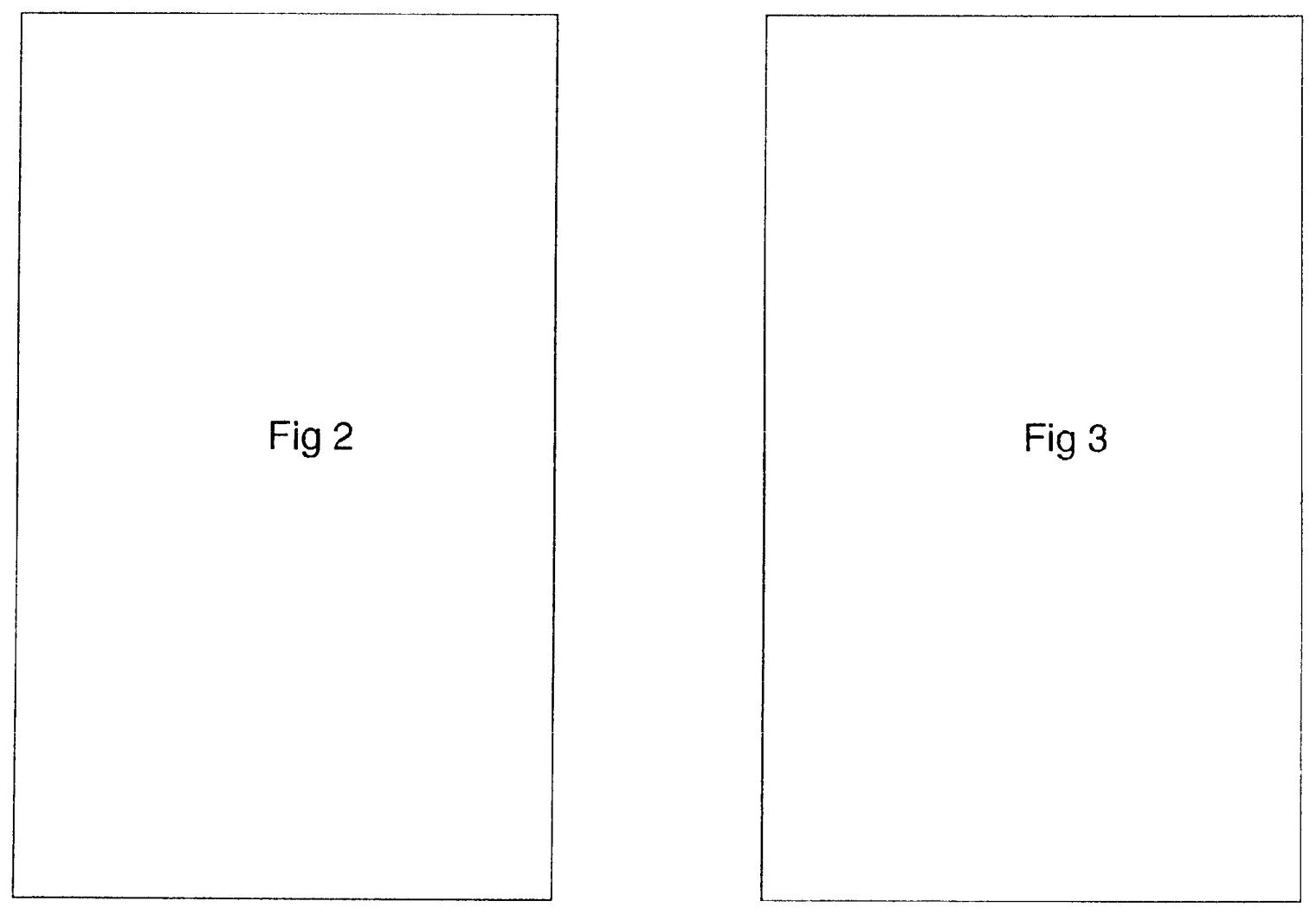

FIG. 1 shows the arrangement of FIGS. 2 and 3 in order to provide a full and comprehensive illustration of the switching module 401 used for embodying the present invention.

FIG. 23 is a truth table for the combinatory logic circuit 7311-j which determines the appropriate direction of propagation of the token which is to be distributed back to the switch cores arranged in port expansion mode.

DESCRIPTION OF THE PREFERRED EMBODIMENTS

Figure 2:
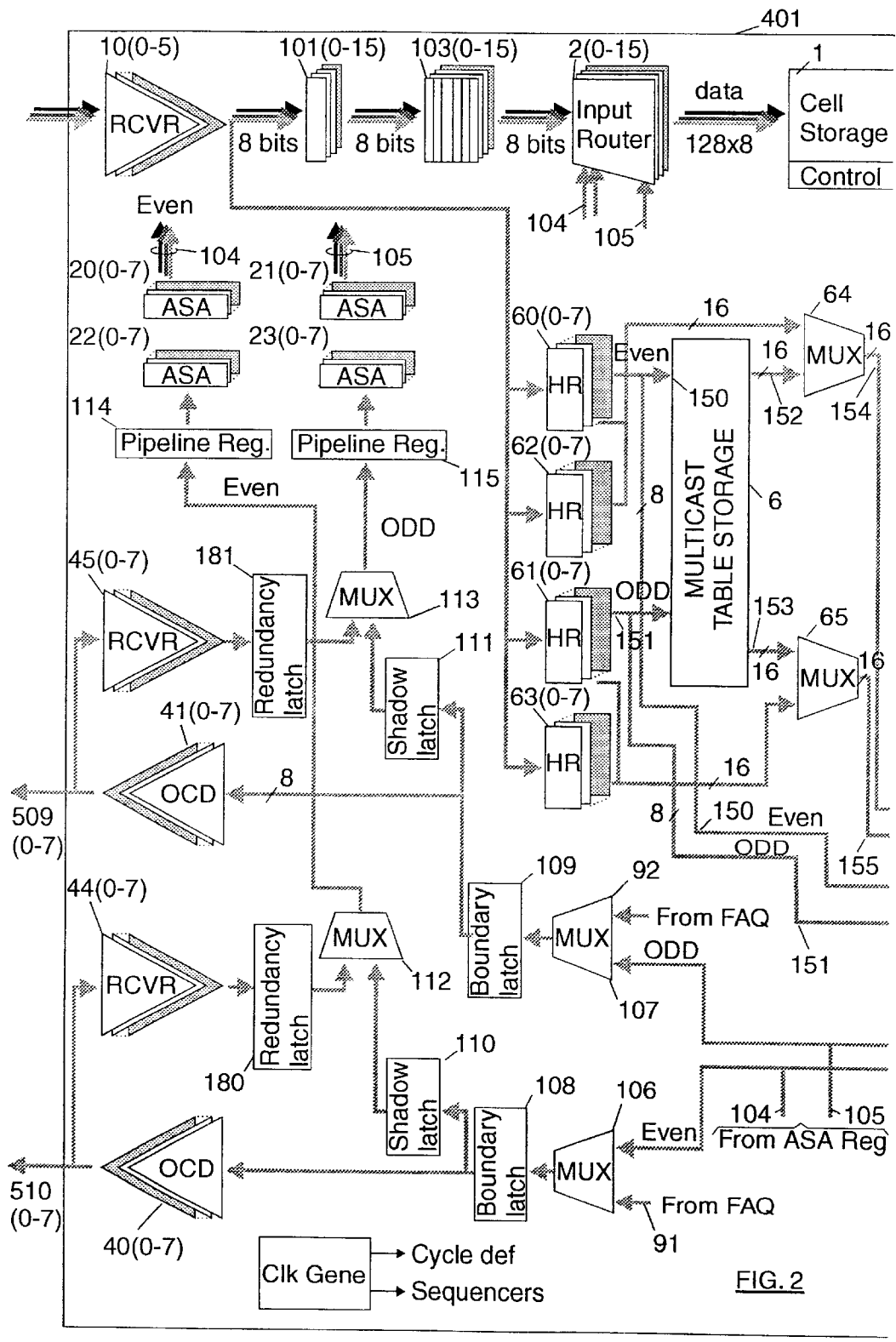
FIGS. 2 and 3 illustrate the structure of the switching module that is used in the preferred embodiment of the present invention.
Figure 3:
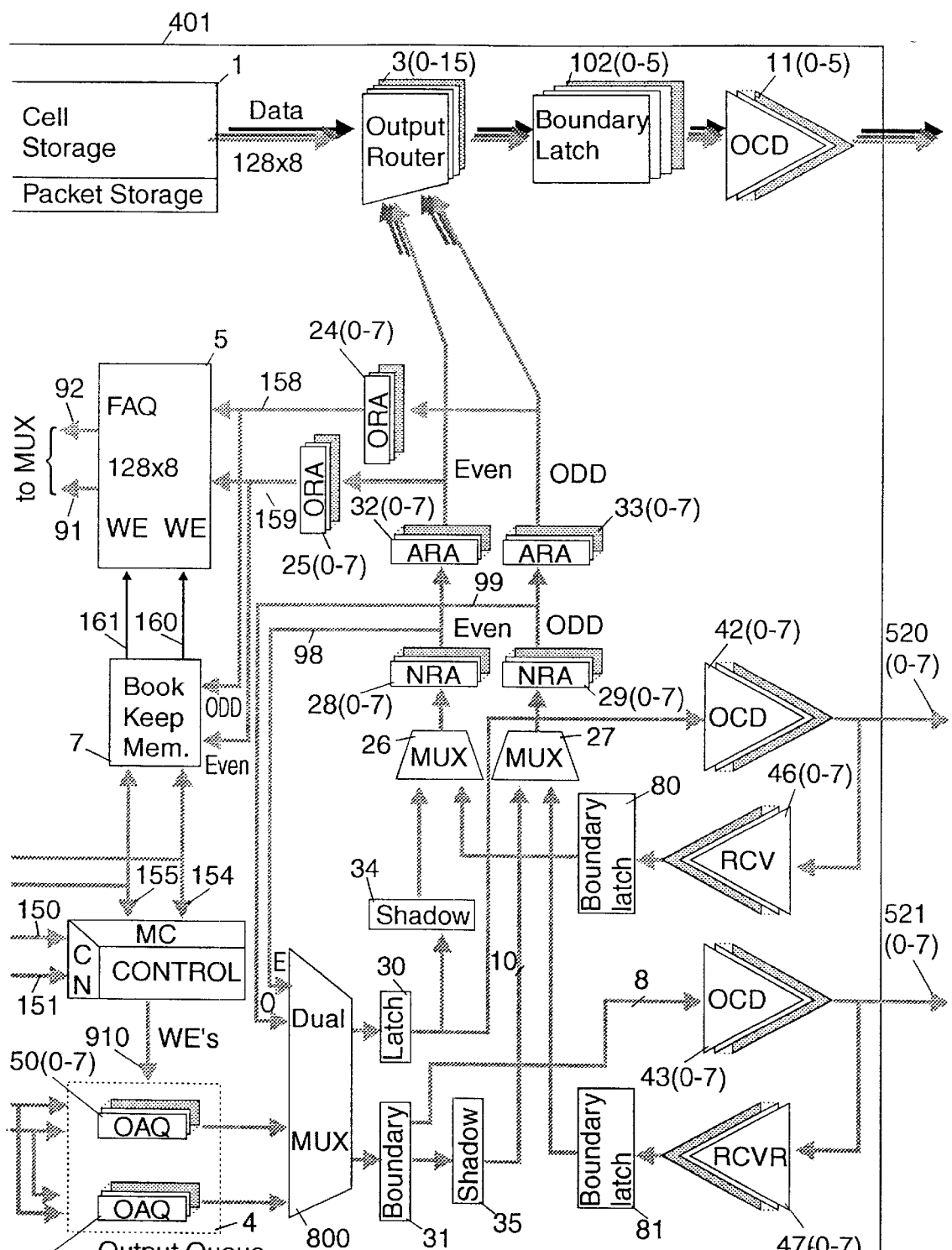

With respect to FIGS. 2 and 3, there is illustrated the switching module that is used for embodying the switching apparatus in accordance with the present invention. This module, represented in block 401 includes a data section comprising a storage section for performing the storage process of the cells coming through any one of the sixteen input ports into a common Cell Storage 1, in addition to a retrieve section for outputting the cells therein loaded and for transporting them to any output port of the switching module.

The storage section uses a set of sixteen RCVR receivers 10-0 to 10-15 which represents the physical interface for the sixteen different input ports. A set of sixteen corresponding routers 2-0 to 2-15 achieves the connection of the input ports to anyone of the 128 positions of Cell Storage 1. For timing considerations, the storage section further comprises a set of sixteen boundary latches 101-0 to 101-15 and a set of pipeline circuits 103-0 to 103-15 so that the data that is transmitted by every receiver 10-i is conveyed to router 2-i via its corresponding boundary latch 101-i and pipeline 103-i.

On the other side, the retrieve section of switching module 401 comprises a set of sixteen Off-Chip-Drivers (OCD) drivers 11-0 to 11-15 which are used for interfacing the sixteen output ports of the switching module. The OCD drivers receive the data from sixteen routers 3-0 to 3-15 via an associated set of sixteen boundary latches 102-0 to 102-15 (used for timing considerations) so that each router 3-i can retrieve any data located within the 128 locations that are available in Cell Storage 1, and can transport them via a corresponding OCD driver 11-i towards the appropriate destination output port I.

In addition to the data section, switching module further comprises a control section that is based on a Free Access Queue (FAQ) circuit 5 (represented in FIG. 3) which is used for storing the addresses of the empty locations in Cell Storage 1. An Output Queue Memory 4, constituted by two distinct sets of eight Output Address Queues (OAQ) 50-0 to 50-7 and 51-0 to 51-7. As it will be explained hereinafter with greater detail, these two sets are used for storing the addresses of the locations within Cell Storage 1 that contain the data cells that are to be transmitted to the output ports. Two sets of eight registers, namely ASA Registers 20-0 to 20-7 and ASA Registers 21-0 to 21-7 are respectively used for generating addresses on a set of two busses—an ODD bus 104 and an EVEN bus 105—the two busses being connected to the sixteen Routers 2-0 to 2-15, and to OAQ queue 4. Bus 104 is formed by the association of the eight output busses of ASA registers 20-0 to 20-7 (composed of 64 bytes), while bus 105 is a 64 byte bus that is constituted from the combination of the output busses of the eight ASA registers 21-0 to 21-7.

Additionaly, EVEN bus 104 is connected to a first input bus of a MUX multiplexor 106 receiving at a second input the free addresses from FAQ 5 via bus 91. The output of MUX 106 is connected to a boundary latch 108, the output of which is connected to the inputs of a set of eight Off Chip Drivers (OCD) 40-0 to 40-7 and to a shadow latch 110. OCD drivers 40-0 to 40-7 have outputs which are respectively connected to form an 8-bit bus 510 (formed of the eight outputs 510-0 to 510-7), also connected to the input of corresponding RCVR receivers 44-0 to 44-7. The outputs of RCVR receivers 44-0 to 44-7 are connected to a redundancy latch 180, whose output is connected to one input bus of a MUX multiplexor 112, the second input of which receives the contents of shadow latch 110. MUX multiplexor 112 has an output that is connected to a pipeline Register 114 in order to load the data there through conveyed into the appropriate NSA registers 22-0 to 22-7 as will be described hereinafter.

Similarly, ODD bus 105 is connected to a first input bus of a MUX multiplexor 107 receiving at a second input the free addresses from FAQ 5 via bus 92. The output of MUX 106 is connected to a boundary latch 109, the output of which is connected to the inputs of a set of eight Off Chip Drivers (OCD) 41-0 to 41-7 and to a shadow latch 111. OCD drivers 41-0 to 41-7 have their outputs 509-0 to 509-7 which are respectively assembled in order to form an 8-bit bus 509, also connected to the inputs of eight RCVR receivers 45-0 to 45-7. The outputs of RCVR receivers 45-0 to 45-7 are connected to a redundancy latch 181, whose output is connected to one input bus of a MUX multiplexor 113, the second input of which receives the contents of shadow latch 111. MUX multiplexor 113 has an output that is connected to a pipeline register 115 so that the addresses can be made available to the appropriate NSA registers 23-0 to 23-7 as will be described hereinafter. The control section further comprises four sets of Holding Registers 60-0 to 60-7, 61-0 to 61-7, 62-0 to 62-7, and 63-0 to 63-7, that will be use switching process as will be described with greater detail.

Coming back to the data section again, it should be noted that the sixteen input ports can simultaneously load sixteen cells into Cell Storage 1 at the addresses that are defined by the contents of a two sets of eight ASA 20-0 to 20-7 registers and ASA 21-0 to 21-7. During the same time, sixteen cells can be extracted from Cell Storage 1 at the addresses that are defined by the contents of sixteen ARA registers, arranged in two sets of eight registers each: ARA registers 32-0 to 32-7 and ARA registers 33-0 to 33-7. ARA registers 32-0 to 32-7 receives the contents of corresponding NRA registers 28-0 to 28-7 through an EVEN bus 98 which is also connected to a first input of a dual-multiplexor circuit 800. Similarly, ARA registers 33-0 to 33-7 receives the contents of corresponding NRA registers 29-0 to 29-7 through an ODD bus 99 which is connected to a second input of dual-multiplexor circuit 800. Dual-multiplexor 800 respectively receives the output of the first and second set of OAQ queues 50-0 to 50-7 and 51-0 to 51-7 at third and fourth input bus. Dual-Multiplexor 800 has two output bus which are respectively connected to a boundary latch 30 and to a boundary latch 31.

NRA registers 28-0 to 28-7 are connected to receive the output of a MUX multiplexor circuit 26 which has a first and second input that respectively receives the contents of a shadow latch 34 and a boundary latch 80. Similarly, NRA registers 29-0 to 29-7 are connected to receive the output of a MUX multiplexor circuit 27 which has a first and second input that respectively receives the contents of a shadow latch 35 and a boundary latch 81. The output of latch 30 is connected to the input bus of shadow latch 34 and also to the inputs of a set of eight Off-Chip-Drivers (OCD) 42-0 to 42-7, whose outputs 520-0 to 520-7 are assembled in order to form a bus 520 which is also connected to the inputs of a set of eight RCV Receivers 46-0 to 46-7. Similarly, the output of latch 31 is connected to the input bus of shadow latch 35 and also to the inputs of a set of eight Off-Chip-Drivers (OCD) 43-0 to 43-7, whose outputs 521-0 to 521-7, forming a bus 521, are connected to corresponding inputs of a set of eight RCVR Receivers 47-0 to 47-7. The outputs of RCVR receivers 46-0 to 46-7 are connected to the input bus of latch 80, and the outputs of RCVR receivers 47-0 to 47-7 are connected to the input bus of latch 81.

As will be described below, the structure of the present invention permits a set of sixteen cells to be simultaneously extracted from Cell Storage 1, and routed to the appropriated output port. 21 Should one cell comprise N bytes (for instance 54 bytes), the switching module provides the capability to store sixteen cells into Cell Storage 1 and to retrieve sixteen cells from Cell Storage 1 in a set of N clock cycles. The Input and Output processes that are involved in the switching module 401 are described in greater detail in the following sections.

1. Input Process

The input process is involved with achieving the complete storage of a set of N bytes comprised in one elementary cell (considering that sixteen cells are actually being inputted simultaneously). The input process basically involves two distinct operations: first, the cells are entered into the data section via the sixteen receivers 10-0 to 10-15 as will be described below. This first step is achieved in a set of N clock cycles. Additionaly, a second operation is performed for preparing the addresses within Cell Storage 1, or more exactly for computing the sixteen addresses that will be used within Cell Storage 1 for the loading of the next set of sixteen cells that will follow. In the preferred embodiment of the invention, this second address computing step is achieved in a set of eight elementary cycles only. Indeed, the first cycle is used for computing the addresses used by input ports 0 and 1, while the second achieves the determination of the addresses that will be needed by ports 2 and 3 and, more generally, cycle n provides the computing of the two addresses within Cell Storage 1 that will be involved with inputting the cell coming through ports 2n and 2n+1.

In order to prepare the input operation, the free addresses of the Cell Storage 1 are provided by Free Address Queue 5 and loaded into. the first set of ASA registers 20-0 to 20-7, and second set of ASA registers 21-0 to 21-7. For the sake of conciseness, when the ASA registers 20-0 to 20-7 are considered without any distinction, there will be a single reference to "ASA registers 20". Similarly, the use of the reference to "ASA registers 21" will stand for the use of the eight ASA registers 21-0 to 21-8 indistinctly. When a distinction needs to be introduced, the normal reference to the registers 20-0 to 20-7 (or a reference to register 20-i) will be reestablished. This simplification will also be used in the remaining part of the description for the other groups of seven or fifteen individual elements, such as ARA registers 32-0 to 32-7, NRA registers 28-0 to 28-7 etc. The full loading of the ASA registers 20 and 21 will now be described. As mentioned above, this is achieved by eight successive transfers of the addresses provided by FAQ circuit 5, via multiplexor 106, boundary latch 108, shadow latch 110, multiplexor 112, pipeline register 114 and multiplexor 112. For instance, the loading of register 20-0 is achieved by a transfer of the address provided by FAQ circuit 5 (on bus 91), via multiplexor 106, latches 108 and 110, multiplexor 112, pipeline register 114 and NSA register 22-0. Then, ASA register 20-1 is loaded by a similar transfer via its corresponding NSA register 22-1 etc. Similarly, the loading of the set of ASA registers 21 is successively carried out via the multiplexor 107, boundary latch 109, shadow latch 111, multiplexor 113, pipeline register 115, and the set of eight NSA registers 23. As mentioned above, multiplexors 106 and 107 have a second input which is connected to receive the contents of the ASA registers 20 and 21 respectively. The use of the second input of multiplexors 106 and 107 allows the recycling of the addresses that are loaded into the ASA registers 20 and 21 (for instance ASA register 20-i when the transfer is being performed during cycle i among the eight elementary cycles). It should also be noted that the two sets of ASA registers form a group of sixteen registers that will be associated with the sixteen input ports of the switch module. The invention takes advantage of the arrangement of the set of ASA registers 20 and 21 in two groups of eight registers each in order to reduce the number of elementary cycles that are required for computing the sixteen addresses used for the loading of the sixteen cells into Cell Storage 1. With only eight successive cycles, the invention provides the possibility of handling sixteen different input ports.

When the free addresses are loaded into ASA registers 20 and 21, the cell cycle which achieves the actual loading of the N_byte cell into Cell Storage 1 can be initiated. Indeed, it appears that, for each input port, an address is made available in a corresponding one of the set of sixteen ASA registers. More particularly, the cell that is presented at an input port number 2n (that is to say even since n is an integer between 0 to 7) will be loaded into Cell Storage 1 through the corresponding router 2-(2n) at a location whose address is defined by the contents of ASA register 20-n. The cell that is presented at an input port being odd, that is to say number 2n+1 (with n being an integer between 0 and 7) will be loaded into Cell Storage 1 through router 2(2n+1) at a location that is defined by the contents of ASA register 21-n. From this arrangement, it appears the complete storage of a full cell of N elementary bytes requires a set of N elementary clock periods, while the control section allowing the storage of the ASA registers 20 and 21 requires eight elementary cycles. However, it should be noted that since each router 2 is associated with a corresponding one among the sixteen ASA registers 20 and 21, sixteen cells can be simultaneously loaded into Cell Storage 1. More particularly, router 2-(2n) receives the output bus of the ASA register 20-n, while router 2-(2n+1) receives the output bus of ASA register 21-n.

What will now be described is how the routing process of the incoming cell is being performed, simultaneously with the above mentioned loading of the ASA registers 20 and 21. In the preferred embodiment of the invention, this routing process is based on a use of a routing header that can be of either one or two bytes.

When the header is limited to a single byte, the switch module according to the present invention operates differently in accordance with the Most Significant Bit (MSB) of the header. Indeed, as will explained below, the switch is designed to operate in an unicast mode when the MSB of the one-byte routing header is set to zero, while it operates in a multicast mode when the MSB is fixed to a one.

In unicast mode, the header is defined according to the following format:

bit 0 !bit 1 bit2 bit 3 !bit 4 bit 5 bit 6 bit 7 0 ! module number ! port number !

with the module number defining the actual module that will route the cell. The port number defines the identification of the port to which the cell must be routed.

Conversely, when the MSB is fixed to a one—characteristic of the one-byte multicast mode—the seven remaining bits of the one-byte header are used as a multicast label which is used to determine the output ports to which the cell must be duplicated, as will be shown hereinafter.

In addition to the one-byte header, the switching module of the present invention is also designed to operate with a two-byte header. In this case, the sixteen bits of the header are used to define the output ports where the cell will be duplicated. Indeed, each bit of the sixteen bits of the header is associated with one output port—for instance the MSB corresponding to output port number 0—and every bit of the header that is set to a one indicates that the cell carrying this header will have to be duplicated to the output port that is associated with the considered bit. For instance, the MSB being set to "one" will cause the cell to be duplicated to output port 0, while bit number one set to a one will results in the same duplication to output port number 1 etc.

With this possibility of using different header formats resulting in different modes, the switching module is allowed a great flexibility, only requiring adaptations of the microcode that is loaded in the switching module.

What will now be described in greater detail are the unicast one-byte-header mode (the "Unicast mode"; section 1.1), the multicast one-byte-header mode ("integrated multicast mode"; section 1.2) and then the two-byte header mode (the "bit-map"mode; section 1.3).

Section 1.1. Description of the Unicast Mode (Unicast One-byte Header Mode)

The unicast mode is based on the use of the two sets of Holding Registers 60 and 61, forming a total set of sixteen Holding Registers. Simultaneously with the loading of the sixteen cells (formed of N bytes each), the one-byte header of each cell is loaded into the corresponding one among the sixteen Holding Registers 60 and 61 mentioned above. These sixteen Holding Registers (namely registers 60-0 to 60-7 and 61-0 to 61-7) hold the header as long as the entire loading process of the cells is not fully completed. In the arrangement of the present invention, the header of the cell that comes through port 2n is being loaded into Holding Register 60(n), while the header of the cell coming through port 2n+1 is loaded into Holding Register 61(n). The sixteen values that are loaded into these sixteen Holding Registers will be used by the control section of the switching module. As it appears in FIGS. 2 and 3, each Holding Register 60-i is connected via an EVEN bus 150 to a control module 200, as well as to a Multicast Table Storage 6. Similarly, each Holding Register 61-i is connected via an ODD bus 151 to control module 200 and to Multicast Table Storage 6. Similar to the loading process of the ASA registers 20 and 21 that was described above, the access of the sixteen Holding registers 60 and 61 are achieved by eight successive elementary clock periods, each clock period providing the access of a dual ODD-EVEN Holding Register to bus 150 and bus 151. More particularly, during clock period number 0 for instance, Holding Registers 60(0) and 61(0) get the access to EVEN bus 150 and ODD bus 151 respectively in order to transfer their contents into Control Module 200. At the next clock period, the busses 150 and 151 are used for transporting the contents of the Holding Registers 60(1) and 61(1), and so on. It should be noted that the access of Holding Register 60(i) and 61(i) to Control Module 200 particularly permits the monitoring of the MSB of the header of each cell being inputted into the switching module. This particularly permits Control Module 200 to be aware of the actual mode of operation—either unicast or integrated multicast—that will be associated with each input port. For instance, should the header being loaded into Holding Register 60 (i) carry a MSB set to zero—indicative of the unicast mode of operation—then the Control Module 200 will determine that the considered input port 2n will require unicast processing. Conversely, if the MSB of Holding Register 61(i) carries a one—characteristic of the integrated multicast mode—then the Control Module 200 will cause the associated cell to be processed according to the integrated multicast mode that will be described below.

Therefore, it appears that the switching module of the present invention permits the sixteen input ports to operate quite independently, that is to say in different modes—either unicast or integrated multicast—in accordance with the contents of the routing header that is being transported by the considered input ports.

The unicast routing process operates as follows:

Output Queue is formed of the sets 50 and 51 of eight queues each. Each individual OAQ queue of sets 50 and 51 has a dual input port of at least 64 bytes that is connected to EVEN bus 104 and ODD bus 105. Additionaly each OAQ queue receives an ODD Write-Enable and an EVEN Write-Enable control signal from control module 200. The sixteen sets of ODD and EVEN Write-Enable control leads form a 32-lead bus 210. Similarly to the notation that was already employed above, each OAQ queue is associated with a corresponding one of the sixteen output ports of the switching module. Therefore, output port number 2n will be associated with OAQ queue 50(n), while output port 2n+1 corresponds to OAQ queue 51(n).

At a given instant (referred to as cycle n), the two input ports 2n and 2n+1 are processed as follows: Control Circuit 200 gets access to the contents of Holding Registers 60(n) via bus 150 (ie the header of the cell on input port 2n) and the contents of Holding Register 61(n) (i.e., the header of cell received at input port 2n+1) via bus 151. Control Module 200 uses these headers for generating the appropriate ODD and EVEN Write-Enable control signals so that the contents of the ASA registers 20(n) and 21(n) are loaded into one or two of the sixteen OAQ queues 50 and 51. More particularly, it should be noticed that Control Module 200 generates the Write-Enable control signals on bus 210 so that the contents of the ASA register 20(n) is loaded into one of the sixteen OAQ queues 50 and 51 that corresponds to the output port that can be determined from the contents of the header being transported and loaded into Holding Register 60(n), in accordance with the Port Number field that is defined by bits 4 to 7 of the one-byte header. Simultaneously, the contents of ASA register 21(n) is loaded into one of the sixteen output queues 50 and 51 that corresponds to the output port that can be determined from the contents of the header being loaded into Holding Register 61(n), particularly bits 4 to 7 of the header. More precisely, considering the input port 2n for clarity's sake, should the contents of Holding Register 60(n) be equal to an integer 2p, the contents of ASA register 20(n) will be loaded into Output Queue 50(p). This will result, as will be described below, in the cell being received on input port 2n to be routed to the output port number 2p in accordance with the contents of the routing header being transported by the cell. Should the contents of Holding Register 60(n) be equal to integer 2p+1, Control Module 200 generates the appropriate Write-Enable control signals on bus 210 so that the contents of ASA register 20(n) is loaded into OAQ 51(p), causing the cell that is received at input port 2n to be routed to output port 2p+1. Similarly, considering now input port 2n+1, should the contents of Holding Register 61(n) be equal to integer 2q, the contents of ASA register 21(n) will be loaded into Output Queue 50(q) (so that the cell will be transported to output port 2q). However, should the contents of Holding Register 61(n) be equal to 2q+1, then Control Module 200 generates the appropriate Write-Enable control signals so that the contents of ASA register 21(n) is loaded into Output Queue 51(q), so that the cell will be routed to output port 2q+1.

It may well occur that the two cells coming in at input ports 2n and 2n+1, and which are loaded into Cell Storage 1, are to be directed to the same output port, for instance output port 2p (resp. 2p+1) in accordance with the header being transported by the two cells. In this case, it appears that both Holding Registers 60(n) and 61(n) carry the same header, which results in the contents of the ASA register 20(n) and 21(n) being loaded into unique Output Queue 50(p) (resp. 51(p)). In the invention, this type of contention is advantageously solved by using a Dual-Port Storage for embodying each one of the sixteen output queues 50 and 51.

Section 1, 2 Description of the Integrated Multicast Mode

The integrated multicast mode is based on the use of the two sets of Holding Registers 60 and 61, forming a total of 16 registers. As above, the header of the cell coming in at input port 2n is loaded into Holding Register 60(n), while that of the cell coming in at input port 2n+1 is loaded into Holding Register 61(n). The loading of the sixteen Holding Registers 60 and 61 requires eight clock periods, as above, since two registers can be simultaneously loaded. As mentioned above, by monitoring the MSB of the one-byte header that is incorporated into each cell, the Control Module 200 is made aware of the appropriate processing—unicast or integrated multicast —that has to be performed for every cell coming in at one input port.

The integrated multicast routing process operates as follows:

As above, the sixteen dual-port Output Queues 50 and 51 of OAQ queue 4 are arranged so that output port 2n is associated with queue 50(n) and output port 2n+1 is associated with queue 51(n).

At a given instant, during cycle n, the two input ports 2n and 2n+1 are processed as follows: the 7 Least Significant Bits (LSB) of the two headers that are respectively loaded into Holding Register 60(n) and 61(n)—which corresponds to the multicast label as mentioned above—are simultaneously used for addressing Multicast Table Storage 6 via busses 150 and 151. This entails the execution of simultaneous reading operations of the dual-port memory used for embodying the Multicast Table Storage 6. Multicast Table Storage 6 presents two 16-bit data busses 152 and 153 which are respectively connected to a first 16-bit input bus of a multiplexor 64 and to a first 16-bit input bus of a multiplexor 65. Multiplexor 64 (resp. 65) has a second input bus that is respectively connected to receive the contents of the two 8-bit Holding Registers 60(n) and 62(n) (resp. Holding Registers 61(n) and 63(n)). The use of this second input bus of Multiplexors 64 and 65 will be more fully explained with respect to the description of the bit-map multicast mode. Multiplexors 64 and 65 have a 16-bit output bus that are respectively connected to a dedicated part (so called MultiCast or MC) of Control Module 200.

The results of the two simultaneous reading operations of Multicast Table Storage 6 are presented to Control Module 200 via multiplexors 64 and 65, respectively. It should be noticed that the control of all the multiplexors that are used in the switching module of the present invention is achieved by means of a general control device such as a general microprocessor (not shown in the figure). Therefore, for the input ports which are identified by Control Module 200 as requiring the integrated multicast processing, the Control Module 200 uses the contents of the Multicast tables that are passed through multiplexors 64 and 65 via busses 154 and 155 respectively, to generate the appropriate Write-Enable control signals on bus 210 so that the contents of the ASA registers 20(n) and 21(n) are loaded into the appropriate queues 50 and 51 that correspond to the output ports involved in the multicast operation. This is achieved as follows: according to the multicast label that is carried by the header of input port 2n, loaded into Holding Register 60(n), the result of the reading operation performed in Multicast Table Storage 6 provides a 16-bit word that is presented on bus 152. Each of the sixteen bits forming this word is associated with one output port of the switching module. For instance, the MSB corresponds to the output port number 0 that is associated with OCD driver 11(0), while the LSB corresponds to the output port 15. Therefore, the sixteen bits of the word presented on bus 152 define the different output ports to which the cell carrying the considered one-byte header will have to be duplicated. Should the cell be duplicated in the EVEN output ports (i.e., ports 0, 2, 4, . . ., 14), then the word will be X'AAAA (in hexadecimal). Should the cell be duplicated in all output ports —corresponding to a so-called broadcast multicast— then the word will be X'FFFF.

More generally, Control Module 200 generates the Write-Enable control signals on bus 210 so that the contents of ASA register 20(n) is loaded into the group of appropriate queues among the sixteen output queues 50 and 51 of block 4 that corresponds to one output port which is determined by the word transported on bus 152. Simultaneously, the contents of register 21(n) is loaded into the group among the sixteen output queues of OAQ block 4 that corresponds to the output port determined by the value carried by bus 155. More precisely, during cycle n, considering the bit number 2p of bus 154, if this bit is set to a "one", this will cause the contents of ASA Register 20(n) (corresponding to input port 2n) to be loaded into output queue 50(p). This will result in the duplication of the cell at output port 2p. Considering now bit number 2p+1 of bus 154 during the same cycle n, if this bit is set to a "one", this will be intepreted by Control Module 200 as a need for loading the contents of ASA register 20(n) (still corresponding to input port 2n) into OAQ output queue 51(p). This will result in the duplication of the incoming cell on input port 2n at output port 2p+1. This mechanism permits the duplication of one cell (incoming on input port 2n in the considered example) at any combination of the output ports. Considering cycle n again, and bit number 2q of bus 155, if the latter is set to a one, this will result in Control Module 200 causing the contents of ASA register 21 (n) (corresponding to input port 2n+1) to be transferred into output queue 50(q). As above, this will result in the duplication of the cell arriving at input port 2n+1 to the output port 2q. Similarly, if the bit number 2q+1 of bus 155 is set to a one during cycle n, the contents of ASA register 21(n) will be loaded into output queue 51(q), resulting in the duplication of the cell at the output port 2q+1.

It appears from the above described mechanism that it could well occur that the two cells that arrive at input ports 2n and 2n+1 each contain a header that corresponds to a broadcast operation, in which case the duplication of the cells are requested for all the output ports. In this very particular case, during cycle n of the eight clock periods needed for processing the sixteen ports, the two busses 154 and 155 appear to convey the same information, ie X'FFFF (in hexadecimal). Control Module 200 simultaneously generate the 32 Write-Enable control signals on bus 210, thus causing the loading of the contents of the two ASA registers 20(n) and 21(n) processed during cycle n into the sixteen OAQ output queues 50 and 51. Since these queues are embodied by means of a dual-port storage, it appears that any contention is advantageously solved.

Next, a specific operation is involved in preparing the output process associated with the two addresses which were transferred from ASA registers 20(n) and 21(n). This mechanism involves the use of the Book Keep Memory circuit 7. Indeed, during cycle n, the address defined by the contents of the ASA Register 20(n), presented on bus 104, is used as an address for addressing the Book Keep Memory 7 and for therein storing the actual number of times that the considered address in ASA 20(n) was stored into Output Queue 4, that is to say the number of duplications which must be performed for the considered cell being loaded into Cell Storage 1. More particularly, for an unicast operation, the value which is loaded into Book Keep Memory 7 at the address defined by the contents of ASA register 20(n) will be equal to 1. In the case of a multicast operation on the cell arriving on port 2n, the value which is loaded will represent the number of "1's" existing on bus 154, that is to say the number of times that the cell will be duplicated on the output ports. Simultaneously, the address that is loaded into ASA Register 21(n), during cycle n, is processed in the same way. Therefore, for an unicast operation on input port 2n+1, the value which is loaded into Book Keep Memory 7 at the address defined by the contents of ASA register 21(n) will be equal to 1, while, in a multicast operation, that value will be equal to the actual number of "1's" that exists on bus 155.

1.3. Description of the Two-byte Header Multicast Mode (Bit Map Mode).

In the bit map mode, the multiplexors 64 and 65 are switched at their alternate position contrary to the one-byte header mode (thanks to some internal control device not shown on the figure). Therefore, it appears that the data can be directly transferred from bus 156 to bus 154 and similarly data that appear on bus 157 can be directly transferred to bus 155. The bit-map mode is based on the use of Holding Registers 60, 61, 62 and 63, thus forming a set of 32 registers of eight bits each. The two-byte header of the cell that comes through input port 2n is loaded into Holding Register 60(n) and 62(n), while the header of the cell arriving at input port 2n+1 is loaded into Holding Register 61(n) and 63(n). The full loading of the 32 Holding Registers requires a set of eight successive cycles. In the bit map mode, the Multicast Table 6, busses 150, 151, 152 and 153 are not used. Further, an initialization period is involved in setting the control module 200 into this bit map mode, so that the Control Module 200 can then use the 16-bit words that are presented on busses 154 and 155—and respectively coinciding with the two-byte headers of the cells arriving at input port 2n and 2n+1—for generating the appropriate Write-Enable control signals on bus 210. This results in the contents of ASA registers 20(n) and 21(n) being loaded into the appropriate queues 50 and 51 that correspond to the appropriate output ports involved in the multicast operation, as described above for the integrated multicast mode in section 1.2.

In the particular case where an unicast operation is to be performed on one cell arriving at input port 2n, it should be noted that the two-byte header will have one unique "1", which location among the sixteen bits will accurately define the target output port where the cell will be routed.

Finally, the Book Keep Memory 7 is similarly processed as above, for the purpose of preparing the output process that will use the particular addresses that were loaded into ASA registers 20(n) and 21(n). The output process will now be described in greater detail.

2. Description of the Output Process Performed by the Switching Module

The output process is independent of the input process and involves two distinct phases. A preliminary phase is first initiated, which requires a succession of 8 consecutive cycles. During cycle n, there is simultaneously prepared the operation for the output ports 2n and 2n+1. The first phase allows the loading of the sixteen ARA Registers 32 and 33. This is achieved as follows: during cycle n the address loaded into Output Address Queue 50(n) is extracted and transported to NRA Register 28(n) via boundary latch 30, Shadow Register 34 and Multiplexor 26 (controlled by internal processor not shown in the figure). Simultaneously, the address that is loaded into Output Address Queue 51(n) is extracted and conveyed to NRA Register 29(n) via boundary latch 31, Shadow Register 35 and Multiplexor 27. It therefore appears that the loading of the sixteen NRA Registers 28 and 29 requires a set of eight elementary clock cycles. When these eight cycles are completed, then the contents of each NRA Register among the sixteen NRA Registers 28 and 29 is simultaneously loaded into the corresponding one among the sixteen ARA Registers 32 and 33. This loading completes the first initialization phase.

The second phase can then be initiated. The sixteen addresses which are now available in ARA registers 32 and 33 are presented to their corresponding Output Routers 3-0 to 3-15. Each router will then perform the appropriate connection of its corresponding output port to one among the 128 locations within Cell Storage 1 that is designated by the address defined by the contents of the corresponding ARA Register 32 or 33. More particularly, each Router 3(2p), with p=0 to 7, performs the connection of output port 2p to the appropriate location within Cell Storage 1 that is defined by the contents of ARA Register 32(p). Simultaneously, every Router 3(2p+1), with p=0 to 7, performs the connection of output port 2p+1 to the appropriate location in Cell Storage 1 that is designated by the contents of ARA Register 33(p). Therefore, it appears that the sixteen retrieve operations can be simultaneously performed and sixteen cells can be routed towards the sixteen OCD drivers 11, allowing a very effective switching mechanism. It should be noted that the full extraction of the cells requires a number of N clock periods.

At the completion of the output process, the sixteen addresses that are contained in the ARA Registers are transferred into corresponding locations of a set of sixteen Old Retrieve Address (ORA) registers 24(0) to 24(7) and 25(0) to 25(7). This is achieved by a single transfer of the contents of ARA Register 32(n) and 33(n) into ORA Register 24(n) and 25(n).

It should be noted that in the preferred embodiment of the present invention, the dual transfer of the contents of NRA Registers 28(n) and 29(n) into the corresponding ARA Registers 32(n) and 33(n) is simultaneously achieved with the dual transfer of the contents of ARA Registers 32(n) and 33(n) into ORA registers 24(n) and 25(n).

The process then proceeds to a recycling of the addresses of Cell Storage 1 which becomes available again because of the possible extraction of the cells which were therein loaded. This process uses the Book Keep Memory 7 in order to take into account the possibility of multiple booking when in multicast mode. Indeed, in the case of multicast cells, the invention prevents the first retrieve operation performed on this cell resulting in the availability of the considered location in Cell Storage 1 until the last duplication of the cell is actually completed. Also, the process used in the present invention takes into consideration the fact that, should a cell be duplicated three times at three distinct output ports for instance, the three retrieve processes might well not occur at the same instant for each output port. The difference in the actual retrieve operation of the same cell obviously depends upon the actual loading of the OAQ queue that corresponds to the output port being considered, that is to say the actual traffic of the output port. The recycling process requires a set of eight elementary cycles performed as follows: during cycle n, the contents of ORA Register 24(n) is presented via bus 158 to the Free Address Queue (FAQ) circuit 5 and to the Book Keep Memory circuit 7. For the address which is considered, and defined by the value carried by bus 158, Book Keep Memory 7 provides the number of remaining reservations, that is to say the number of times the cell stored in the considered location should still be retrieved. This number is then reduced by one and a test is performed on the result. If the result is not equal to zero, it is loaded again into the storage of Book Keep Memory circuit 7 at the same address. However, if the result of the decrementation appears to be equal to zero—indicating that the retrieve operation corresponds to the last duplication that was requested by the header—this result is also reloaded into the internal storage of Book Keep Memory circuit 7, at the same address, and, additionally, circuit 7 generates a Write-Enable control signal on lead 160 in order to load the address existing on bus 158 into the internal storage of FAQ circuit 5. The address is therefore registered as an available location for further cell storage operation.

The same process is simultaneously performed for the value of the address that is stored in ORA register 25(n) which is presented via bus 159 to the input bus of both FAQ circuit 5 and to the Book Keep Memory circuit 7. Similarly as above, if the result of the decrementation by one which is performed on the value being loaded into circuit 7 at the address carried by bus 159 appears to be equal to zero, then circuit 7 generates a Write-Enable control signal on lead 161 to FAQ circuit 5 so as to load the considered address into the internal storage of the FAQ circuit 5. When this is completed, the considered address is made available again for further cell storage operations, as described in section 1 relating to the input process.

It should be noted that the invention takes great advantage of the use of Dual-Port storage for embodying the internal storage of the two circuits 5 and 7. Indeed, this particularly allows the possibility to reduce by two the number of cycles which are necessary for processing the different addresses within Cell Storage 1. In the invention, only 8 elementary cycles are required for providing a 16-input and 16 output port switching module.

Figure 4:
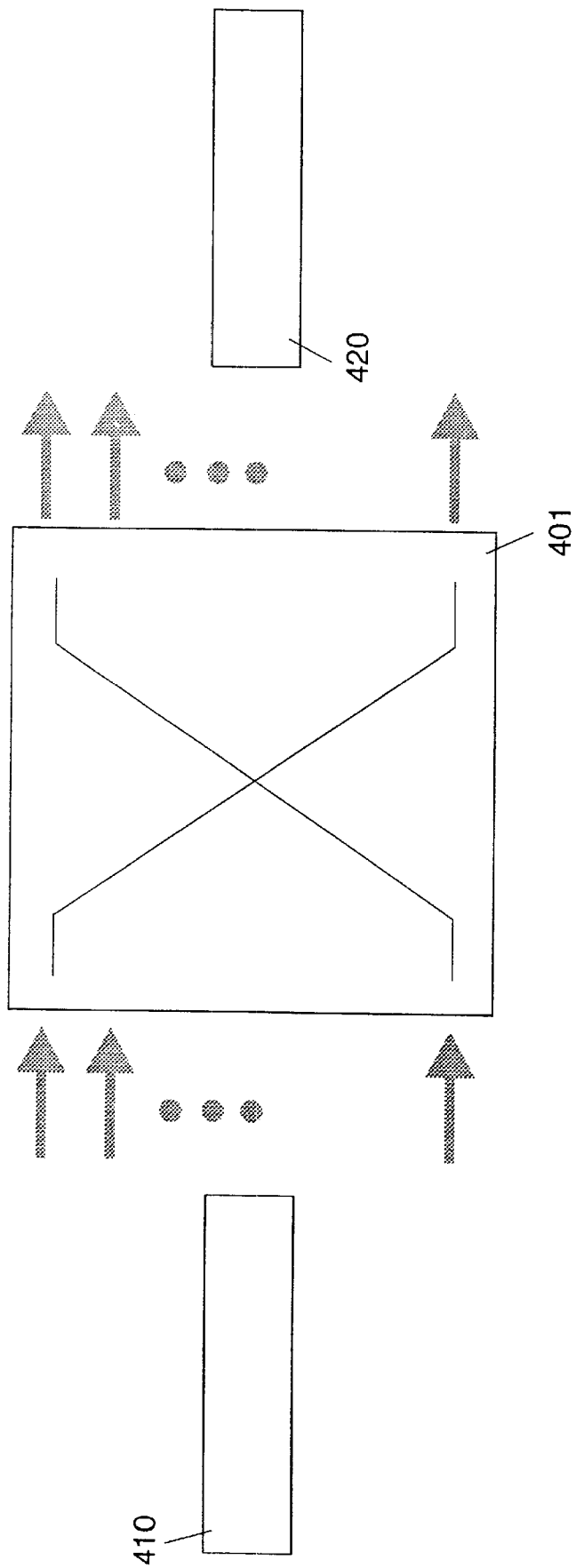
FIG. 4 illustrates the use of a single switching module for carrying out a switching apparatus.

FIG. 4 illustrates the use of a single switching module 401 of the present invention in order to provide a switching apparatus. As shown in the figure, a particular cell 410 is received by the switching module 401 and routed in accordance with the routing process that was described above. The cell—represented with reference to arrow 420—is made available at the appropriate output port of module 401. In this figure, the switching apparatus, that will hereinafter called the switch fabric, is based on one single module 401 and operates at a speed which is basically fixed by a given technology.

Figure 5:
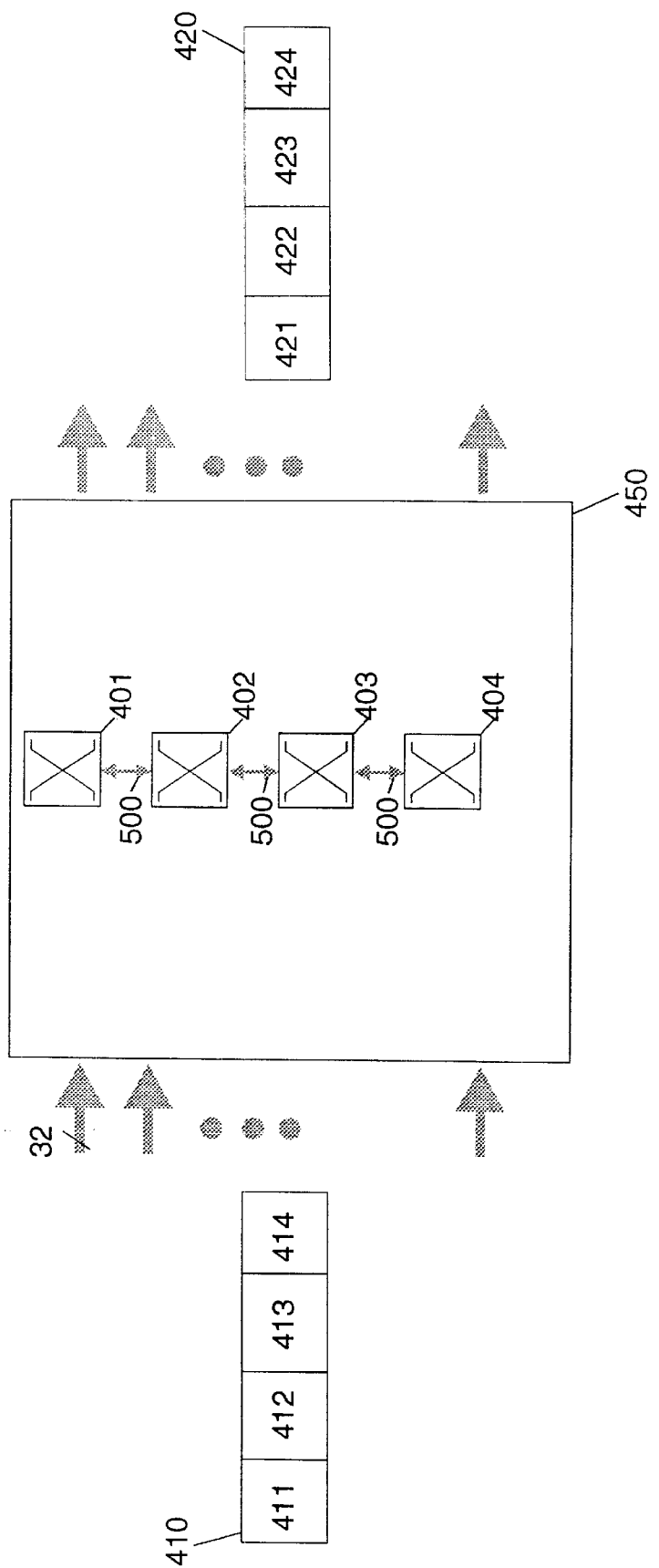
FIG. 5 illustrates the use of multiple switching modules arranged in port speed expansion for carrying out an enhanced switching structure operating at higher speed.

However, there will be requirements for higher speeds in a single stage architecture. The switching module of the present invention permits higher speeds to be attained even with the same technology. This is advantageously permitted by a particular arrangement of identical switching modules 401 which will now be described and which allows a very simple and effective possibility for aggregating multiple different switching modules in a speed expansion mode. FIG. 5 illustrates an arrangement where four different switching modules 401–404 are aggregated in order to constitute a more powerful switching structure 450 operating at a higher speed. In this arrangement of four switching modules 401–404, each cell 410 that is presented to an input port p of aggregate switching structure 450 is logically divided, or sliced into four distinct parts 411, 412, 413 and 414. The first part 411 of the cell is presented to the input port p of module 401, while the second part 412 is entered into port p of module 402. Similarly, the third and fourth parts 413 and 414 of the cell are respectively presented to the input port p of switching module 403 and 404. As will appear below, the internal design of the switching modules 401–404 permits such arrangement to be made advantageously, so that the four distinct parts of the cell 410 are simultaneously processed. On the other side, the cell will be retrieved and routed towards the appropriate output port of each switching module 401–404. More particularly, the first part 421 of cell 420 will be routed to the appropriate output port q of switching module 401, while the second part 422 of cell 420 will be forwarded to the appropriate output port q of switching module 402. Similarly, the third and fourth parts 423 and 424 of the cell will be presented respectively at the appropriate port q of the switching module 403 and 404.

It obviously appears that the simultaneous processing of the four distinct parts of cell 410 results in a descrease by four of the size of the cell that is actually processed by each individual switching module. Therefore, the four switching modules are fully combined so as to multiply by four the effective speed of the switching structure. This arrangement entails a substantial advantage since it becomes possible, for a given technology, to virtually increase the speed of the switching process. As will be explained hereinafter with more detail, the substantial increase in the speed is made possibe by simply aggregating multiple switching modules of FIGS. 2 and 3. As the cell cycle will be reduced by a factor of four for any switching module 401–404, it appears that the sole limit for aggregating multiple switching modules in order to carry out a more powerful switching structure 450 resides in the need to execute, with the possibilities given by the given technology, the eight elementary clock cycles that are required for both the input and output processes described above. In the present invention, the enhanced switching structure 450 is based on four switching module 401–404 and the description will be fully made for this particular arrangement. However, it should be noted that the skilled artisan will readily adapt the description below for any other combination of switching modules. In the arrangement of the preferred embodiment, it appears that switching module 401 is presented with the first part of cell 410, that is to say part 401 that includes the routing header used for controlling the routing process as was described above. Therefore, switching module 401 will be used as a master module within the aggregate structure 450, that is to say that the control section of module 401 will operate for the entire set of four switching modules 401–404. The three other switching modules 402–404 will operate as slaves for the routing process, so that the four distinct parts constituting the output cell 420 will simultaneously appear at the same output port(s) q. Since the storage process inside Cell Storage 1 of the master switching module 401 operates randomly, depending upon the storage locations that are available at a given instant, it is quite necessary to make sure that the same storage process be performed inside the slave switching modules 402–404 in order to ensure the integrity of the cell that is routed through the four switching modules. In the invention, this is advantageously ensured by use of a specific speed expansion control bus 500 that is under control of master switching module 401. In the preferred embodiment of the invention, speed expansion bus 500 is a 32 bit bus which is made of four distinct parts. Speed expansion bus 500 includes a first set of eight leads 510-0 to 510-7 that are respectively connected to the input of receivers 44-0 to 44-7, and to the output of drivers 40-0 to 40-7 described above with respect to FIG. 2. Additionally, speed expansion bus 500 comprises a second set of eight leads 509-0 to 509-7 that are respectively connected to the output lead of the eight drivers 41-0 to 41-7, also respectively connected to the input lead of the eight receivers 45-0 to 45-7 described above. Further, speed expansion bus 500 comprises a third set of eight leads that are connected to bus 520 (that is to say, to the input lead of the eight receivers 46 and to the output of drivers 42), and a fourth set of eight leads that are connected to bus 521 (i.e., to the input lead of the eight receivers 47 and to the output of the eight drivers 43. Therefore, it appears that speed expansion bus 500 realizes the full connection between the four switching modules forming the switching structure. The speed expansion mode then operates as follows: In the master module 401, the different OCD drivers 40, 41, 42 and 43 are enabled. Thus, they provide the routing data that will be conveyed through bus 500 to the other slave switching modules 402–404. Also, Multiplexor 112 (resp. Multiplexor 113) is controlled by an internal processor (not shown) so that the contents of register 110 (resp. register 111) are transmitted to pipeline register 114 (resp. pipeline register 115). Multiplexor 26 (resp. multiplexor 27) is configured so that the contents of register 34 (resp. 35) is transmitted to NRA registers 28 (resp. NRA registers 29) since, in this case, no pipeline register is being used. In the slave switching modules 402–404, the different OCD drivers 40, 41, 42 and 43 are disabled. Multiplexor 112 (resp. Multiplexor 113) is controlled so as to connect the output of boundary latch 180 (resp. boundary latch 181) to the pipeline register 114 (resp. pipeline register 115) via the EVEN bus (resp. the ODD bus). On the other side, multiplexor 26 (resp. multiplexor 27) is configured so as to connect the output of boundary latch 80 (resp. boundary latch 81) to the set of NRA registers 28 (resp. NRA registers 29). Therefore, at each cell cycle the ASA registers 20 and 21, and ARA registers 32 and 33 of every switching module 401–404 will contain the same data, thus ensuring the same routing process in the four components of the aggregate switching structure. This results in a strictly identical routing process being performed inside the four distinct switching modules and permits the four distinct parts of the cell 410 to simultaneously appear at the same appropriate output ports of the modules 401–404. The full synchronism is particularly achieved by the use of boundary and shadow latches 110, 111, 80 and 81. It therefore appears that the switching module of the present invention can be easily aggregated with other modules in order to achieve a powerful switching structure operating at high speeds. Although the above description was based on the use of four individual switching modules 401–404, it should be noted that other arrangements can be achieved. Indeed, the possibility of aggregating similar modules is obviously not limited to four. When using two modules operating in speed expansion mode, the switch speed can be increased by a factor of two. The performance of the switching structure— either based on two, four or more switching modules 401—is still enhanced in the present invention by means of the use of specific circuits which are designed to satisfy the numerous requirements that exist in the market. Indeed, the invention takes advantage of a set of adapters that provides, in addition to the cell slicing that is required for dividing the cell into four parts (in the preferred embodiment of the invention), the different interfaces that are needed by a wide variety of customers. Thus, the invention achieves a highly flexible switching system that can meet most switching requirements.

Figure 6:
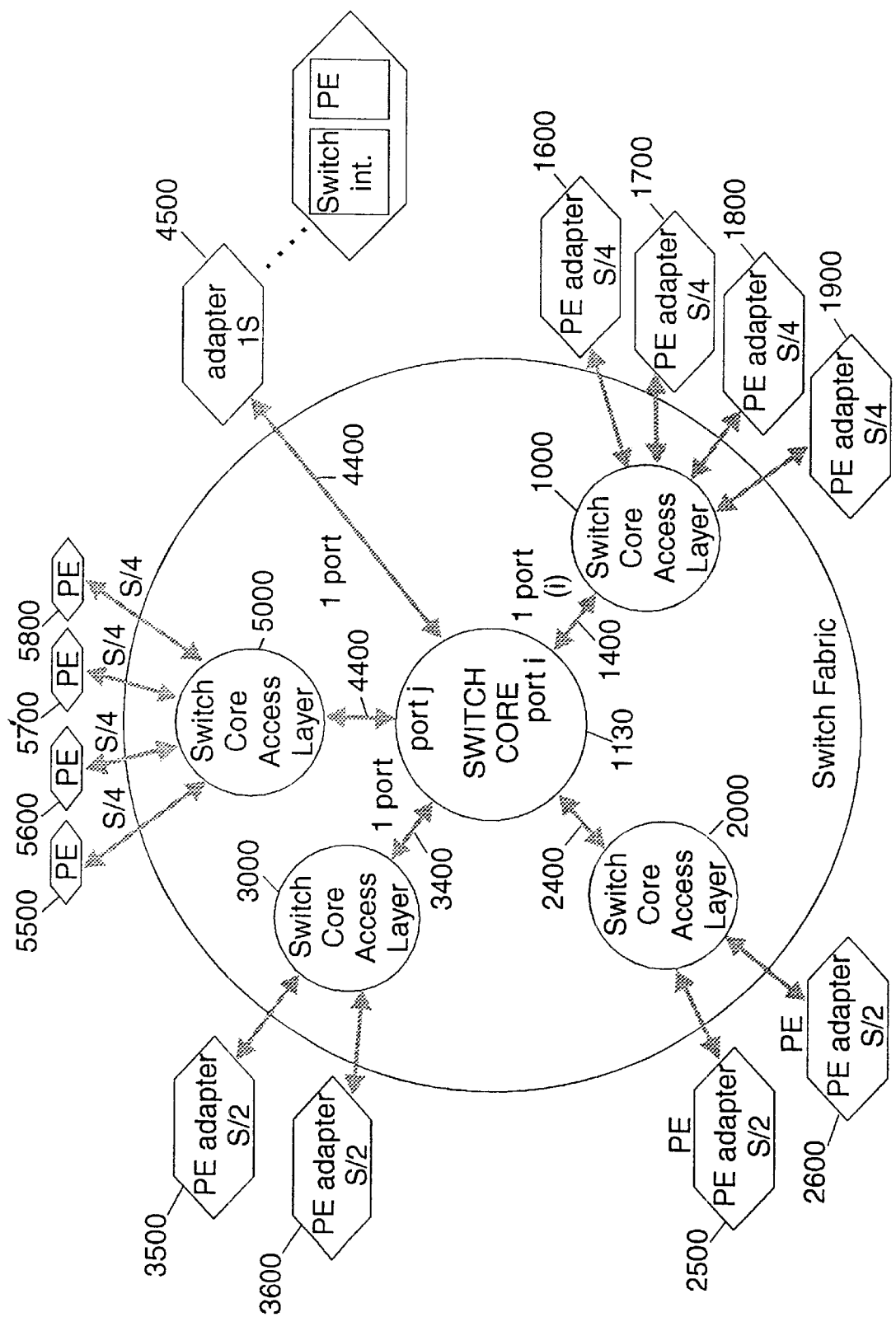
FIG. 6 illustrates a general switch fabric including a switch core based on the switching structure of FIG. 5 associated with Switch Core Access Layer elements.

FIG. 6 shows an example of a switching architecture—based on high speed switching structure 450—that achieves a wide variety of line attachments. The switch core may be located in one building and provide a set of N different input and output telecommunication ports (sixteen ports in the preferred embodiment of the invention). One port providing a 1.6 Gigabit/s telecommunication link may be used for providing a high speed communication link (represented by reference number 4400) with an adapter 4500. Switch core 1130 has a 1.6 Gigabit/s port i that provides a telecommunication link 1400 to a Switch Core Access Layer (SCAL) element 1000. SCAL element 1000 provides attachment to four Protocol Engine adapters 1600, 1700, 1800 and 1900 that each provide a s/4 communication link. A third port of switch core 1130 is dedicated to a link 2400 to another SCAL element 2000, which provides the attachment to two s/2 Protocol Engine adapters. A similar attachment may be provided by means of a an additional SCAL element 3000 attached to two PE adapters 3500 and 3600 sharing the 1.6 Gigabit/s communication link 3400 provided by switch core 1130. Finally, in the example illustrated in the figure, a SCAL element 5000 allows attachment to four s/4 Protocol Engines 5500–5800 which gets access to the 1.6 Gigabit/s dataflow of port j of switch fabric 450 via link 4400. In the preferred embodiment of the invention, SCAL elements 1000–2000 and 3000 take the form of electronic packages to which are attached the different Protocol Engines which take the form of electronic cards.

Figure 7:
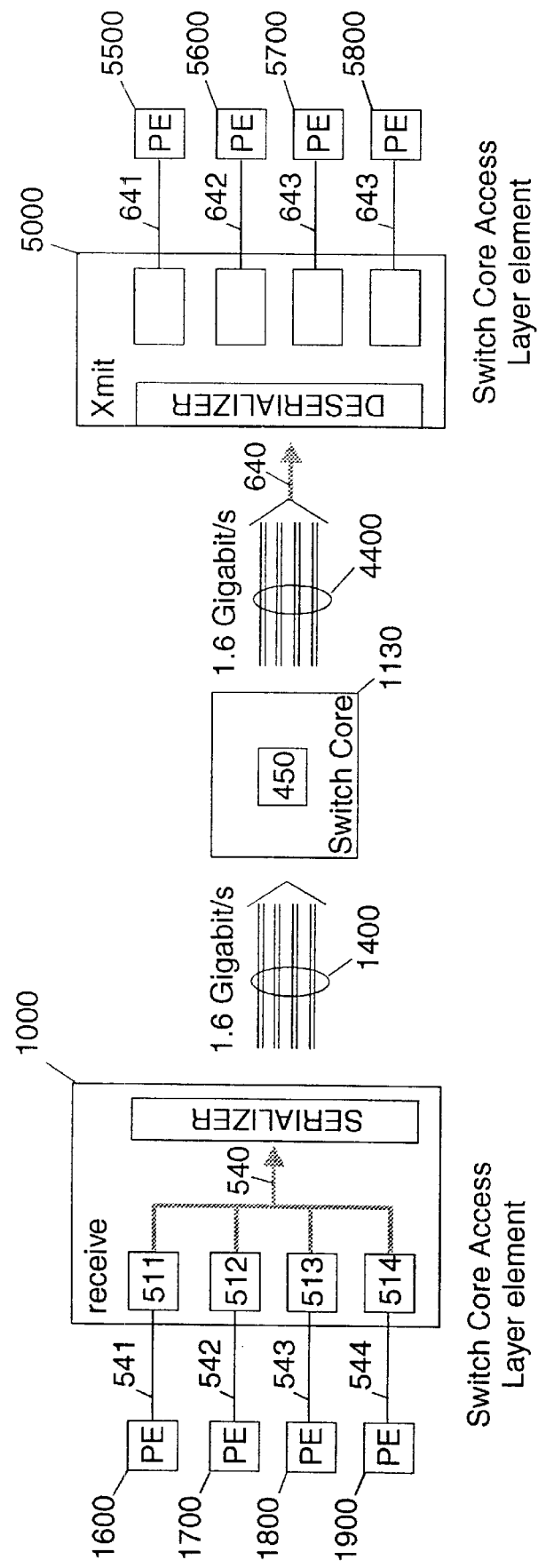
FIG. 7 illustrates the logical flow of the distributed switch core fabric embodiment.

As will be shown hereinafter in more detail, the invention provides two distinct embodiments of the general architecture, an example of which is illustrated in FIG. 6. Indeed, depending on the requirements of the customer, the switch fabric may take two distinct forms: a first compact switch fabric architecture and a second distributed switch fabric architecture. The first embodiment of the invention referred to as the compact switch fabric architecture is used when a highly flexible and powerful switch is need in a close, compact area. In this case, the switch core 1130 and the different SCAL elements 1000, 2000, 3000 and 5000 are located in the same restricted physical area by means of a direct 1.6 Gigabit/s communication link, based on the use of coaxial cables. However, in the more general case, the line attachments are located in different physical areas of a set of industrial buildings. In this case, the invention permits the SCAL elements to be located far enough from the switch core 1130 (up to 100 meters) by means of 1.6 Gigabit/s communication links 1400, 2400, 3400 which are each based on a set of optical fiber communication links, at least four 500 Mbits/s optical links for the data. This results in simple connections being performed for the attachments of the different elements forming the switching architecture, so called "switch fabric". The structure of the receive and transmit part of each SCAL element 1000–5000 is illustrated with respect to FIG. 7 showing the logical dataflow between the receive part of SCAL element 1000 (communicating through port i of switch core 1130) and the transmit part of the SCAL element 5000 that is attached to port j of switch core 1130. This figure particularly illustrates the above mentioned distributed embodiment of the switch fabric where each Switch Core Access Layer element 1000–5000 is located apart from the switch core 1130 at a distance up to 100 meters. The receive and transmit part of one SCAL element will now be particularly described and it will be assumed that this SCAL element provides the attachment to four Protocol Engines. However, it be noticed that the SCAL structure of the invention is not limited to this particular arrangement of four Protocol Engines. Protocol Engines 1600–1900 may provide attachment to two OC3/STM1 links each according to CCITT Recommendations, or eight DS3 communication links. In the present invention, each Protocol Engine is connected to a SCAL element associated with one so-called Protocol Interface (PINT) element. With respect to the receive part of the SCAL element 1000, PE 1600 (resp. PE 1700, PE 1800, PE 1900) is associated with a PINT element 511 (resp. 512, 513, 514) via bus 541 (resp. 542, 543 and 544), while with respect to the transmit side of SCAL element 5000 (attached on port j), PE 5500 (resp. 5600, 5700, 5800) receives data cells from a PINT 611 (resp. 612, 613, 614) via bus 641 (resp. 642, 643, 644). Should the number of Protocol Engines attached to a SCAL element (for instance SCAL 2000) be limited to two, then that SCAL element will only include a set of two PINT circuits. Additionally, the SCAL elements are fitted with serializer/deserializer circuits allowing the conversion of the data flow so as to reduce the number of coaxial cables (in the compact switch core ) or optical fibers (in the distributed switch core).

Thus, FIG. 7 illustrates the logical flow of data between two determined ports, for instance port on the receive side and port j on the transmit side. Therefore, each element appearing at the left side of the switching structure 450 should bear an indicia i indicating its correspondence to the port number i. Similarly, every element appearing on the right side of block 450 should bear an indicia j for expressing the destination output port j. However, for clarity's sake the indicia will be suppressed in FIG. 6 for simplifying the following description. The use of the indicia will however be introduced in FIG. 9 when considering the multicast operation of the enhanced switching system.

It should be noted that the general term of "Protocol Engine" designates the line adaptation layer of the different lines that exist on the market. Basically, this term stands for hardware and software functional components that are well known to the skilled artisan and that provides the line interface adaptation to the different lines used by customers. Such lines may include lines carrying ATM protocols, T3, DS3, AT1, E1, and interfaces such as FCS, ESCON etc. Such a system can be for instance the "Trunk Port Adapter" that is marketed by IBM for the Nways 2220 module 500.

A particular improved ATM Protocol Engine will be described in detail with reference to FIGS. 14 to 17. However, regardless of the particular type of line being interfaced, it should be kept in mind that the Protocol Engine is used for interfacing the line used by the customers for providing SCAL element 1000 with cells that are intended for the switch core 450, the cells comprising a routing header and a payload. The routing header of the cells is used in accordance with the above described routing mechanism.

Figure 8:
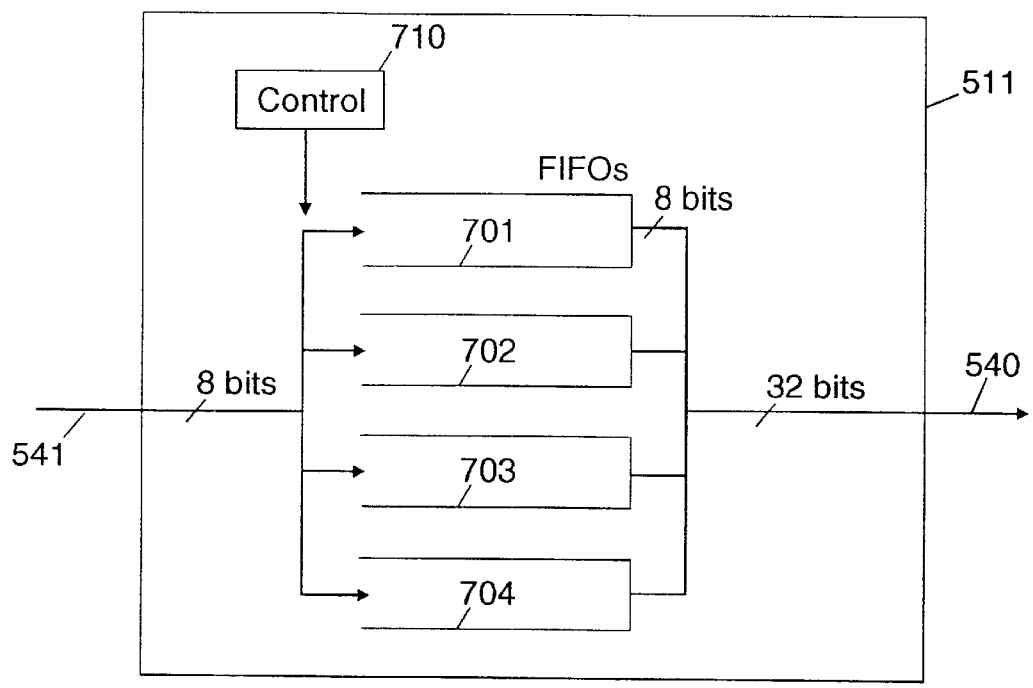
FIG. 8 shows the PINT receive part 511 of the SCAL of the present invention.

FIG. 8 shows the structure of any one of the receive parts of PINT circuit 511–514 of the Switch Core Access layer element 1000. The dataflow coming in on 8-bit input bus 541 is distributed through four FIFO queues 701–704 so that the first byte is entered into FIFO 701, the second one into FIFO 702, the third one into FIFO 703, the fourth one into FIFO 704, the fifth one into FIFO 701 again etc. Therefore, the 8-bit data flow is transformed into a four-byte output bus 540 that is needed by the four switching modules of structure 450. In the compact switch fabric embodiment, each byte is transmitted by means of the serializer/deserializer and a common coaxial cable, while in the distributed switch core embodiment each byte uses the path formed by the serializer/deserializer and a longer optical fiber. Therefore, bus 540 provides four flows of bytes that are directed to the four sets of receivers of each individual switching module.

For both the compact and distributed embodiments of the switch fabric, it should be noted that the first byte of bus 540 (the 8 MSB) is intended to be transmitted to the 8-bit input bus of receiver 10 at the appropriate input port of the first module 401. Similarly, the second byte of bus 540 (bits number 9 to 15) is transmitted to the input of receiver 10 at the appropriate input port of the second switch module 402, etc. Should the cell be received at the input port 541 of element 511 in N cycles, the same cell is approximately presented at the input of the four switching modules 401–404 in N/4 cycles. In the preferred embodiment of the invention, the cell which arrives at input bus 541 has 58 bytes. This set of 58 bytes is completed by two additional bytes that are incorporated at appropriate locations within the cell in order to form a 60-byte cell which, when distributed through the four FIFOs, provides a succession of 15 sets of 4-byte words that can be processed by the switching modules 401–404. The two extra bytes which are added to the 58 original bytes are used in conjunction with the above described "bit-map mode" or "two-byte header multicast mode". To achieve this, and assuming that the switching module that operates as a master is module 401, a control circuit 710 provides the incorporation of the two bit-map bytes at the first and second location within FIFO 701 (that is to say at the first and fifth position of the cell being received on bus 541). Therefore, switching module 401 receives the two bit-map bytes forming the routing header at the first two locations of the data flow coming in at its input port. It should be noted that the speed on the two busses 541 and 540 are largely independent since the former may be lower than the latter. Assuming that the switch operates at a speed of 20 nanoseconds (corresponding to an aggregate data flow of 1.6 gigabits/s), the higher speed that is permitted on bus 541 appears to be 60/58×20 nanoseconds. In addition to the PINT circuits, the SCAL element 1000 further includes control logic that provides control of the four "Enable-Output" input leads (not shown) of PINT circuits 511–514 so that aggregate switching structure 450 can successively process the cell received by circuit 511 (requiring fifteen cycles in the preferred embodiment), then the cell received by element 512, then that received by element 513 and so on. In this way, each PINT circuit 511–514 gets access to one fourth of the bandwidth of the bus 540.

Figure 9:
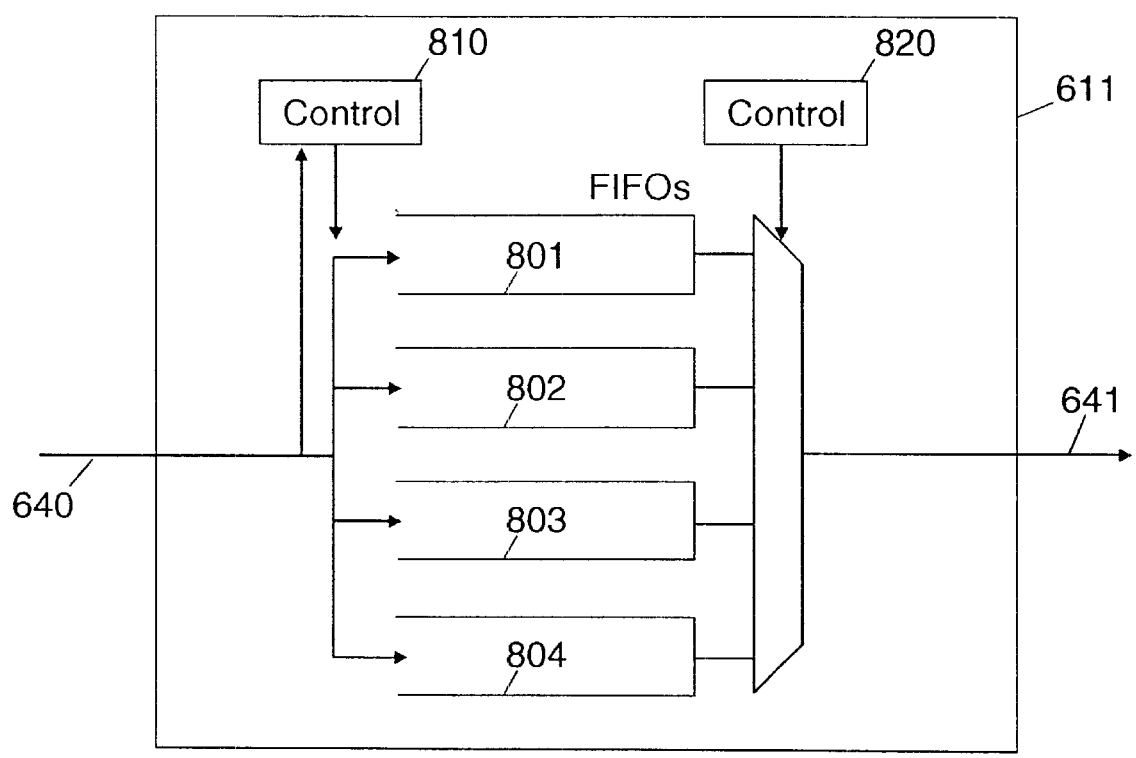
FIG. 9 shows the PINT transmit part 611 of the SCAL of the present invention.

FIG. 9 illustrates the structure of the four transmit parts of PINT circuits 611–614. Each PINT element 611–614 receives the totality of the 32-bit bus 640. The latter receives the four parallel flows of serialized bytes that are received from the four coaxial cables separating the switch core from the SCAL (in the compact embodiment) or from the four optical links (in the distributed switch fabric where the different SCALs are located at different physical areas with respect to the switch core 1130). Each PINT element 611 is fitted with a set of four FIFOs 801–804 that present a storage capacity that is far higher than that of the FIFO used for the received part. In the preferred embodiment of the invention, the ratio between the FIFO storage 801–804 and the FIFO storage 701–704 is fixed to at least 250 in order to ensure high buffering when many cells are destined to the same output port. Considering for instance transmit block 611, a control module 810 receives the data coming from bus 640 and extracts the "bit map" two bytes from the cell being received. From the value that is currently carried by these two bytes, control module 810 determines whether the cell has to be loaded into a set of four FIFO registers 801–804, or discarded. In the first case, control module 810 generates a load control signal which allows each of the four bytes carried by the 32-bit bus 640 to be loaded into its corresponding FIFO register 801–804. For instance, the first byte appearing on bits 0–7 of bus 640 will be loaded into FIFO 801, while the second byte (bits 8–15) will be transferred into FIFO 802 and so on. In the second case, if the cell appears to be discarded by the considered transmit block, then control module 810 does not generate the load control signal, thus preventing the loading of the cell into the FIFO registers.

Any one of the four elements 611 to 614 receives the same cells which appear on the common bus 640. However, since the two-byte "bit-map" header is used by each of the elements 611 to 614 in order to control (or not) the loading of the considered cell into the internal FIFO queues, it appears that this header also realizes a multicast operation that still permits the duplication of the cell coming in on bus 540 to multiple output directions. In the preferred embodiment of the invention, the first bit of the header is used by control module 810 in order to determine whether the cell has to be duplicated to the output bus 641, while the second bit of the two-byte header is used by control module of element 612, and so on. In each block 611–610, the four FIFOs are accesssed by a control module 820 which is used for regenerating the sequence of the different bytes forming the cell on an 8-bit bus 641. Additionally, control module 820 provides the removal of the "bit map" two-byte header so that the cell becomes identical to the one that was received by the receive part of the SCAL circuit 1000. In the preferred embodiment of the invention, this is simply achieved since the "bit-map" header always occupies a fixed position within the 60 bytes forming the cell. The Protocol Engines 5500–5800 are then provided with the appropriate train of cells generated by the blocks 611–610.

Figure 10:
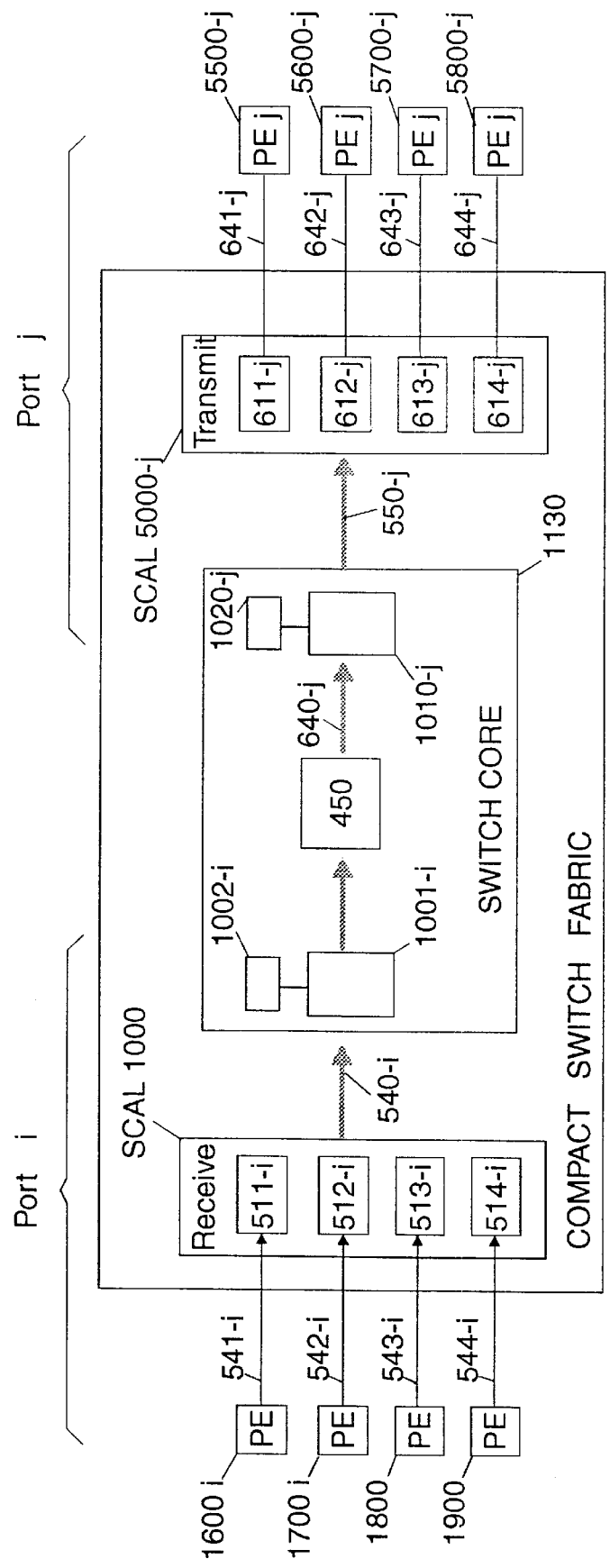
FIG. 10 illustrates a compact switch fabric embodiment enhanced in order to provide wide multicast capability.

It should be noted that the invention provides two independent embodiments that both provide wide flexibility because of the efficient cooperation between the powerful switching structure 450 and the different SCAL elements attached to every port. In one embodiment, it was shown that the SCAL elements are all located close to the switch core 1130, thus providing a compact switching architecture. In the second embodiment, where numerous line adapter attachments are required in a wide industrial area, the invention uses the serializer/deserializer in association with optical fibers so as to achieve links that can attain a length of 100 meters. FIG. 10 illustrates a significant optional enhancement that can be brought to the switching fabric of FIG. 7 that provides wide multicast capabilities for both the compact and distributed switch fabric embodiments. For clarity's sake, the explanation will be made for the compact switch fabric embodiment, where the SCAL elements can directly communicate with the switching structure 450 by means of bus 540 without the use of the additional path formed of the serializer, the optical channels and the deserializer (required for forming again the 32 bit wide bus at each input port of switch core 1130). In this figure, indicia i and j are introduced in order to clearly illustrate the logical path of a cell arriving at one input port i, and which is routed to output port j. Additionally, it is assumed that the sixteen SCAL elements that are attached to the switching structure are based on a similar structure, that is to say include four identical PINT elements (associated with four corresponding Protocol Engines). In FIG. 10, it is shown that bus 540-i connecting the switch structure 450 to the PINT receive circuit 511-i, 512-i, 513-i and 514-i of SCAL element 1000, is separated into two parts by means of the insertion of a routing control device 1001-i. Similarly, bus 640-j that connects the output of aggregate switching structure 450 to the PINT transmit circuits 61-j, 612-j, 613-j and 614-j of SCAL 5000-j, is separated by means of the insertion of another Routing Control Device 1010-j. Each control device among the set of 32 control devices being inserted in the 32 input and output busses of switching structure 450 is associated with a corresponding Routing Control Table 1002-i and 1020-j which is used for performing the routing process for the cell. For instance, Control Device 1001-i is associated with its corresponding Routing Control Table 1002-i, while Control Device 1010-j is associated with its corresponding Routing Control Table 1020-j.

This enhanced compact switch fabric operates as follows: Assume for instance that Protocol Engine 1600-i at port i generates a cell comprising a Switch Routing Header (SRH) followed by a payload. This SRH is characteristic of the destination Protocol Engine which will receive this cell. Should the cell be transported to one unique destination PE, then the switching will have to be unicast. In the other case, there will be multiple destination Protocol Engines and the switching will be multicast. In accordance with the above description, the cell enters into the PINT receive circuit 511-i which introduces within the cell a set of two bytes that will be affected to the location of the bit map that will be determined later on by the Routing Control Device 1001-i. The cell is then propagated on the bus 540-i as described above, and is presented after communication on optical lines to the Routing Control Device 1001-i. This element executes on the fly the following operations. First, the Routing Control Device 1001-i accesses the associated Routing Control Table 1002-i , using the SRH as an address. The value that is extracted from this table is then inserted, on the fly, within the cell at the two additional locations that were inserted before by the PINT receive circuit 511-i. Therefore, the master switching module 401 receives these two bytes at its first two locations within the cell coming in at its input port and can use them in accordance with the two-byte header multicast mode (bit map mode).

After the cell is processed by the Routing Control Device 1001-i, the cell is presented at the input bus of aggregate switching module 450, so that the master module 401 can use the bit map appearing at its first two bytes in order to control the overall routing mechanism for the four elements. However, it should be noted that the same mechanism could be used with one single switching module. Then the switching structure 450 duplicates the cell being received at the appropriate output ports. Assuming that the cell being considered is duplicated at the ports j, k and 1, it will appear on busses 640-j, 640-k and 640-1. The cell being presented on bus 640-j is entered into the Routing Control Device 1010-j which, as above, accesses the associated Routing Control Table 1020-j in order to extract data that includes a two-byte bit map that will be used by the transmit part of PINT element 100-j of the SCAL circuit 1000. This extraction uses the SRH data that is incorporated in the cell being received. It should be noted that, as above, the access of Routing Control Table 1020-j can also be used for providing additional bits that can be advantageously used for control purposes. The newly extracted bit-map header is then used by SCAL circuit 5000-j for determining which one(s) of the PINT transmit circuits 611-j; 612-j, 613-j and 614-j will have to propagate the cell. For instance, should the bit map only contain a single "1", then the cell will be propagated to one single element (for instance block 611-j), while if the bit map contains two "1's" the cell will be propagated by two different elements. It therefore appears that a second duplication step is introduced, the former one occurring within the switching structure 450. Each Protocol Engine 5500-j, 5600-j, 5700-j and 5800-j can then be accessed by the cell in accordance with the bit-map that was determined by Routing Control Device 1010-j, which bit-map was uniquely determined in accordance with the SRH that was transported by the cell.

It appears that the SRH that is determined by each Protocol Engine is considered by the switching structure 450 and the PINT circuits of SCAL 1000-j as a part of their payload, while the routing header used for controlling the switching mechanism is locally generated from this SRH. The same mechanism applies for the ports k and 1, thus resulting in the cell being duplicated by one or more elements 611-k, 612-k, 613-k or 614-k, 611-1, 612-1, 613-1 or 614-1 of the PINT elements 100-k and 100-1. A wide capability for of multiplexing through the two distinct multiplexing stages is thus permitted within the switching system.

Figure 11:
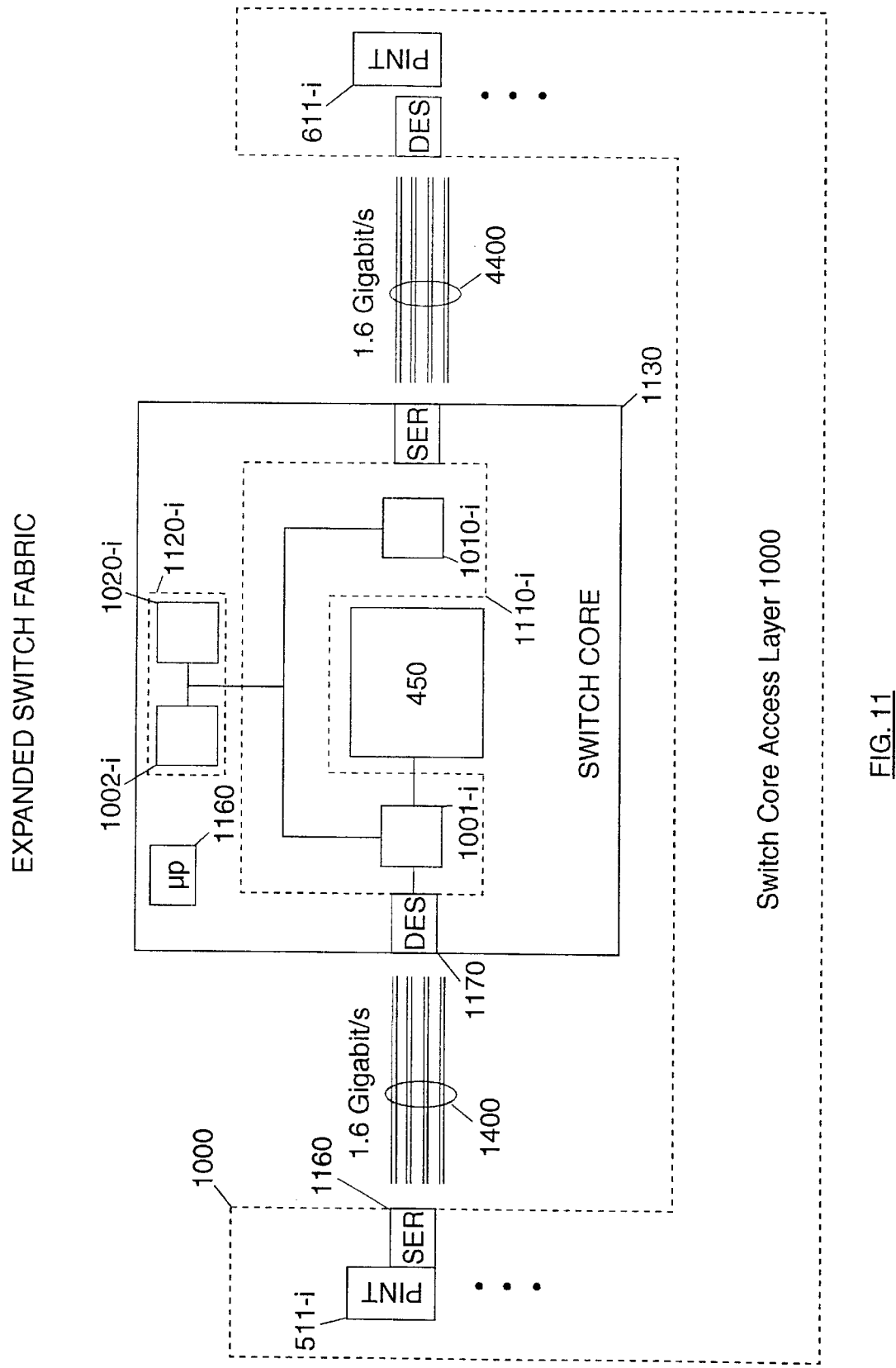
FIG. 11 illustrates the distributed switch fabric enhanced in order to provide wide multicast capability.

In the preferred embodiment of the invention, the Routing Control Devices are located within the switch core 450. This substantially enhances the capabilities of the switch since it becomes very simple to update the different contents of the multiple Routing Control Tables. Additionally, this presents the advantage of using slower, cheaper and larger memory than that used for embodying Multicast Table 6 which must be very rapid since it might be the case that the latter is continuously in operation during one cell cycle. Further, the possibility of providing larger storage (also resulting from the fact that this storage may be located outside the chip of the switching module) for embodying Routing Control Tables permits increasing the number of routing SRH labels. This feature appears to be very simple to embody in the second distributed switch fabric embodiment where the SCAL elements 1000–5000 are located at different physical locations of an industrial area. FIG. 11 shows the arrangement of the distributed switch fabric that provides great flexibility and high speed and which further permits, by using the Routing Control mechanism described above, a wide multicasting capability. Dotted lines represent the physical boundaries of the modules or packages in FIG. 11. There is shown the switch core 1130 taking the form of one physical apparatus, which includes the switch structure 450, generally embodied in the form of a card comprising at least the four switching elementary modules, each module being an electronic chip. The two Routing Control Devices 1001-i and 1010-i that are associated with the same port i are embodied into the same physical chip 1110-i that is associated with a corresponding storage 1120-i that contains the two Routing Control Tables 1002-i and 1020-i described above with reference to FIG. 9. It therefore appears that switch structure 450 and the sixteen associated modules 1110 and 1120 are advantageously located in the same physical package, while the different SCAL elements are distributed in the different physical area of the industrial premises where line attachment needs appear to be. As mentioned above, the distributed switch fabric comprises a set of N physically distributed SCAL packages (N being equal to 16 in the preferred embodiment of the invention), only SCAL package 1000 being represented in the figure. Every SCAL package contains the PINT receive and transmit circuits that are each associated with one attached Protocol Engine. The latter are embodied in the form of additional cards that are plugged into the SCAL electronic circuitry board. Since the 1.6 Gigabit/s communication link between each SCAL and the switch core 1130 is achieved by means of a set of optical fibers (at least four for the data path), the two elements can separated by a large distance with an optical fiber. This is very advantageous since it becomes possible to realize a powerful switching connection regardless of the position of the different telecommunication links in the industrial premises. Should for instance an ATM link be located in a first building and an OC3 in a second one, the invention achieves the switching connection by simply using a first SCAL package receiving an ATM PE in the first building, a second SCAL element in a second building. This example shows the great flexibility of the solution of the present invention that particularly avoid the drawbacks of solutions of the prior art, based on costly telecommunication cables or on a multiples switches that are arranged in networks—each switch being located in one premises—thus using their ports for the network connection. Since some ports are used for achieving the network connections of the different switches, it obviously results that these network connection ports are lost from the customer standpoint because they can not be connected to a communication link. The architecture of the present invention eliminates all of these drawbacks.

Further, the teachings of the document "Single-chip 4×500 Mbaud CMOS Transceiver" by A. Widmer et al, in IEEE ISSCC96, Session 7, ATM/SONET/PAPER FA 7.7, published on Feb. 9, 1996 can be used for providing the embodiment of the 1.6 Gigabit/s communication links 1400, 2400, 3400 and 4400. This document is incorporated herein by reference. This document shows the possibility of using the 8B/10B encoding scheme. During idle periods that are marked by a flag, fill packets of data are transmitted which start with a non-data comma character. The comma character marks both byte and cell boundaries on the serial link. Therefore, synchronization at the byte and packet level can be provided and the 1.6 Gigabit/s communication link may be embodied by means of an unique set of four cables, either coaxial or optical. The reduction in the number of cables is substantial since, without this feature, at least five or six optical lines would be necessary for embodying the 1.6 Gigabit/s communication link. It should be noted that the Switch Core package 1130 contains a processor 1160 which can access, for control purpose, any storage and register within the package. In addition, there is incorporated additional circuitry that monitors the presence of the particular bit map header being set to X'0000', which causes the cell to be extracted from the normal data processing using ASA and NSA registers and directly loaded into one particular fixed location within the cell storage 1, shown in FIGS. 2–3 under the name Control Packet Storage. This achieves a general extraction process allowing the processor to get access to control cells. Conversely, the process is also provided with an insertion process allowing the possibility of propagating a cell loaded into the last position of the memory towards any one of the output port.

As the particular bit map X'0000' is used for control purpose between the control processor 1160 (inside the switch core) and other components of the switch fabric, this bit map value is no longer available for discarding the cells. The possibility of discarding cells is reestablished by means of an additional control bit—a so called "valid bit" that is advantageously used for discarding the cells. The valid bit is provided from the read operations of tables 1002 and 1020.

Figure 13:
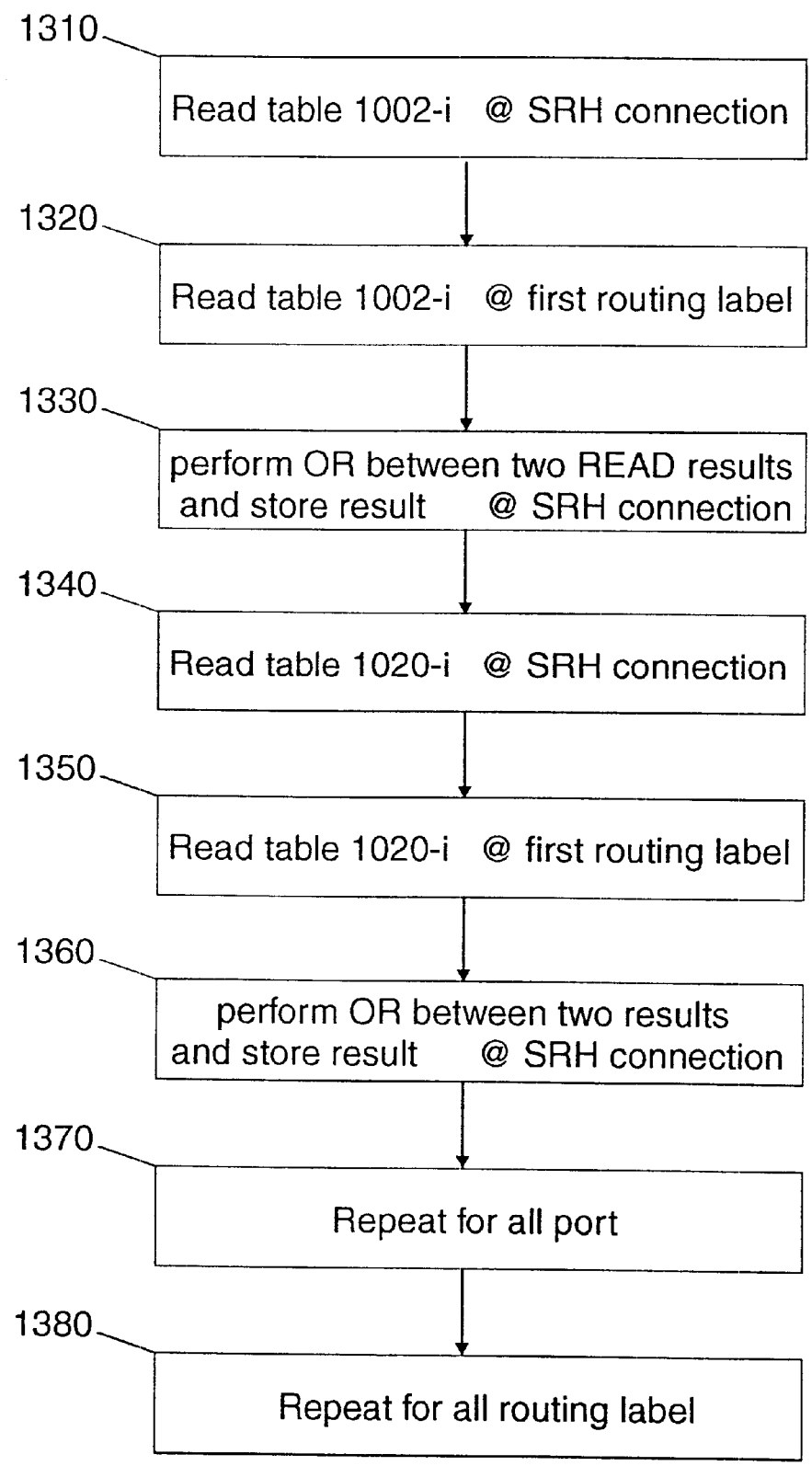

It should be noted that the skilled artisan may advantageously loop the steps 1320 and 1330 in FIG. 13 in order to directly update the table 1002-i , before initiating the update process of table 1020-i. However such implementation details will depend on the particular context.

Therefore it appears that the general control processor 1160 that is located within the switch core package can access and load values within the sixteen Routing Control Tables that are embodied in the sixteen storage modules 1120.

Figure 12:
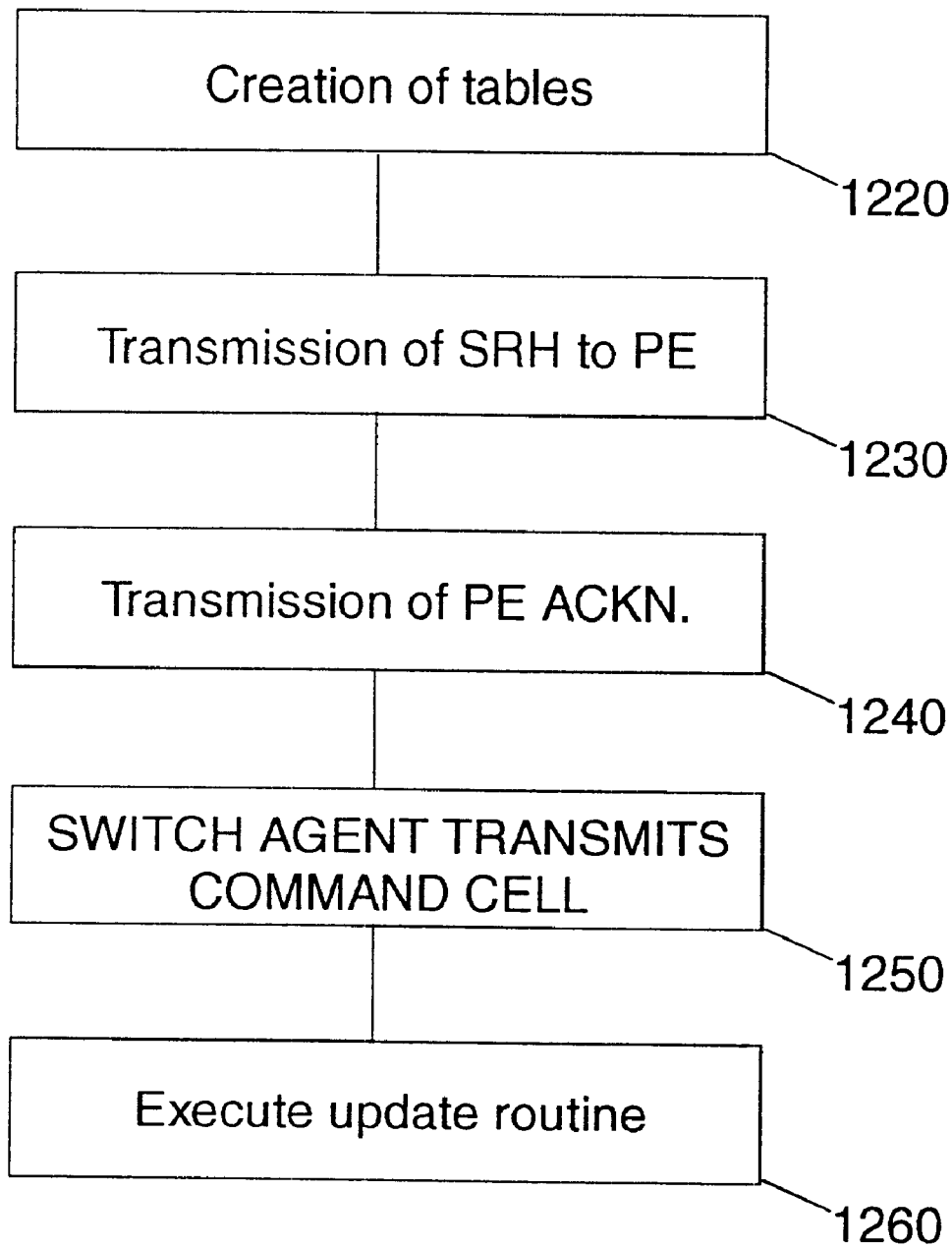
FIGS. 12 and 13 illustrate the update and creation procedure of the Routing Control Tables.

Next, the general procedure that is used for creating and updating the Routing Control Tables 1002-i and 1020-i which are located in the same chip will be described. The procedure is illustrated in FIG. 12. First, the procedure begins with an initialization step 1220 where the control processor 1160 affects a set of SRH routing labels. This is made possible since the processor is aware of its own topology and therefore can assign some SRH values that can distinguish the different Protocol Engines connected to the different ports. This is achieved by using the following allocation procedure: the processor first determines the number of Protocol Engines that are associated with a given output port, and then assigns a number of SRH values so as to distinguish the PEs from each other. For instance, assuming that port number 0 is associated with four different Protocol Engines (connected to SCAL 1000), the processor will reserve four different SRH values for the Protocol Engines. Therefore, according to the topology of the switch architecture, the control processor 1160 assigns the desired number of SRH values that are needed to distinguish the different Protocol Engines.

Then the Routing Control Table creation can be executed. First, it should be noted that each Routing Control Table 1002-i will contain the same data since all the cells that arrive on bus 540-i (and contain the same SRH routing label) will have to be propagated to the same output port. The SRH is characteristic of the destination, and not the connection. Therefore, the processor builds a table which complies with the following format:

| Add ! | data loaded into table 1002-0 | data loaded into table 1020-0 (left adjusted). |
|---|---|---|
| X'0000' | X'8000' port 0 of 45 | X'8000' PE number 0 on PINT of SCAL 1000-0 |
| X'0001' | X'8000' port 0 of 450 | X'4000' representing "0100 0000 0000 0000" PE number 1 on the PINT. |
| X'0002' | X'8000' port 0 of 450 | X'2000" PE number 2 on the PINT |
| X'0003' | X'8000' port 0 of 450 | X'1000' PE number 3 on the PINT. |
| X'0004' | X'4000' port 1 of 450 | X'8000' PE number 0 on PINT 1000-1. |

A similar format is used for the tables 1002-1 and 1020-1, then 1002-2 and 1020-2, etc., but the values that are therein loaded are set to zero (with the exception of the valid bit). A more detailed representation of the table, clearly illustrating the use of the valid bit, can be found in the attached Annex A. Additionally, a particular SRH value is reserved for the communication between the processor 1160 and any PE.

The initialization procedure completes when the different Routing Control Tables are loaded. Then, in step 1230, processor 1160 uses the general insert capability for transmitting to every Protocol Engine a cell, characterized by a specific format, in order to inform it of the particular SRH value that was assigned to it. Therefore, each PE is made aware of a particular SRH value distinguishing it from the other ones. Then, in step 1240, each adapter acknowledges this assignment by means of the specific SRH value that is dedicated for the communication between processor 1160 and the PE.

Then, a switch agent that operates within one particular protocol engine is used for managing the different connections. Such a function is well known to the skilled artisan and involves, in the particular ATM case, the management of the allocation of the VP/VC parameters. This switch agent is used for handling the correspondence between the different connections and the SRH routing values that were correspond to each Protocol Engine. It should be noted that numerous connections can be associated with one single PE. Generally speaking the switch agent is aware of the precise topology of the network that may include a wide number of different switches as the one illustrated in FIG. 11. In particular, the switch agent can determine, should a switch X located into one area, wish to communicate with a switch Y located in another area, which output ports are involved in this communication. Therefore, since it knows the output port that has to be used, it can determine the unicast SRH (that is, the SRH provided during the initialization period 1220) that is needed. Therefore, in step 1250, the switch agent initiates the building of a Command cell which is destined to the processor 1160 within the switch. This cell will present a payload that is arranged as follows:

!Command ! SRH affected to connection ! label1 label2 label3 . . . !

with a first field (Command) defining a particular command which is requested by the switch agent. The second field, namely the SRH_connection field is used for defining the SRH that is affected to the connection and then follows one or more unicast routing labels that define the destination Protocol Engines for the cells which will includes the SRH defined in the second field. Basically, the third field comprises the distribution list of the unicast routing labels which were already affected during initialization period 1220) of the destination PE.

Then, step 1260, processor 1160 uses this information being received in order to store into memory 1002-i, at the address defined by the second field (SRH_connection), the data that will be used for controlling the different Routing Control Devices. This is advantageously achieved by the update routing algorithm that follows and which uses the unicast SRH allocations that were made during the initialization procedure. The update algorithm is shown in FIG. 13 and operates as follows:

In step 1310, processor 1160 performs a read operation of table 1002-i at the address defined by the value carried by the second field of the switch agent command cell. Then, in step 1320, processor 1160 performs a read operation of table 1002-i at the address which is determined by the first routing label carried by the third field of the switch agent command cell. This read operation returns an X value. Then in step 1330, processor performs a logical OR of the value X of step 1320 with the value returned by step 1310. This logical OR results in the addition of the ports that miss in the unicast configuration. The result of the OR operation is then loaded into table 1002 at the address SRH_Connection.

In step 1340, processor 1160 performs a read operation of table 1020-i at the address defined by the value carried by the second field of the switch agent command cell. In step 1350, processor 1160 performs a read operation of table 1020-i at the address which is determined by the first routing label carried by the third field of the switch agent command cell. This returns a value Y. Then in step 1360, a logical OR is performed between the value Y returned in step 1350 and that returned in step 1340 and the result of the OR operation is stored in table 1020-i at the address that is defined by the second SRH_Connection field carried by the switch agent command message. Steps 1310 to 1360 are executed for all ports so that all the sixteen tables 1002 and 1020 can be updated (step 1370). In the case where the switch agent command message has a third field that comprises more than one routing label, e.g., label2 and label3, the preceding procedure is performed again for all the remaining labels (step 1380). For instance, for the second label appearing in the third field, the procedure will be the following: Processor 1160 performs a read operation of table 1002-i at the address defined by the value carried by the second field of the switch agent command cell (step 1310). Then processor 1160 performs a read operation of table 1002-i at the address which is determined by the second routing label carried by the third field of the switch agent command cell (step 1320). This read operation returns an X value. A logical OR between the two values can then be performed and the result can be loaded into table 1002-i at the address SRH_Connection.

The update of table 1020-i can then be executed, by performing a logical OR of the value extracted at the address defined by the address SRH_Connection and the value extracted at the address defined by the second routing label. The result can then be loaded into table 1020-i at the address SRH_Connection. The processing of the second routing label proceeds then with the update of all the other tables 1002 and 1020. This algorithm appears particularly efficient as it allows the switch agent, being generally located in one Protocol Engine of the switching system, to update the different routing tables of the switch core 1130 without being aware of the internal topology of the switch. The logical OR operations permit easily adding output ports to an unicast configuration which the switch agent does not need to know.

It should be noted that the updating process that was described before can be executed for any new connections that are required by the switch agent. Whenever a new connection is requested, the update of the routing tables 1002 and 1020 can be easily achieved by a simple transfer of a switch agent command cell via the normal data path using a simple connection cable.

Below is described the functional operations that are involved in the deletion process of one label in an SRH connection. The principle is to search the particular value of i for which, in table 1020-i at the address defined by the considered label, the valid bit appears to be set on. At this location, the contents of table 1020-i, that is to say the bitmap is kept as a value X. In the next step, a read operation is performed in this table (1020-i) at the address defined by the particular value of SRH_connection to get the bitmap therein loaded (i.e., Y). Then, an AND operation is performed between Y and the inverted value of X. The result Z is stored again at the address that was defined by the SRH_connection field. If the above result Z is different from zero (thus implying that there still remains an unicast label on this SRH_connection), the bitmap must be kept to an ON state. Tables 1002-i remains unaffected.

However, when the value of Z appears to be equal to zero (thus implying that the delete operation was performed on the last label forming the SRH_connection), the valid bit corresponding to the particular SRH_connection being processed is set to OFF. Additionally, since the last Protocol Engine has to disappear, all the different tables 1002-i (with i=0 to 15) will be updated in order to suppress the output port (corresponding to the latter Protocol Engine) at the address SRH_Connection. In the case where the resulting bitmap is equal to zero, then an additional step is performed in order to set the valid bit to zero. Similarly as for the creation process, the delete operation appears very simple since it does not require that the switch agent be aware of the precise topology of the switching system.

Figure 14:
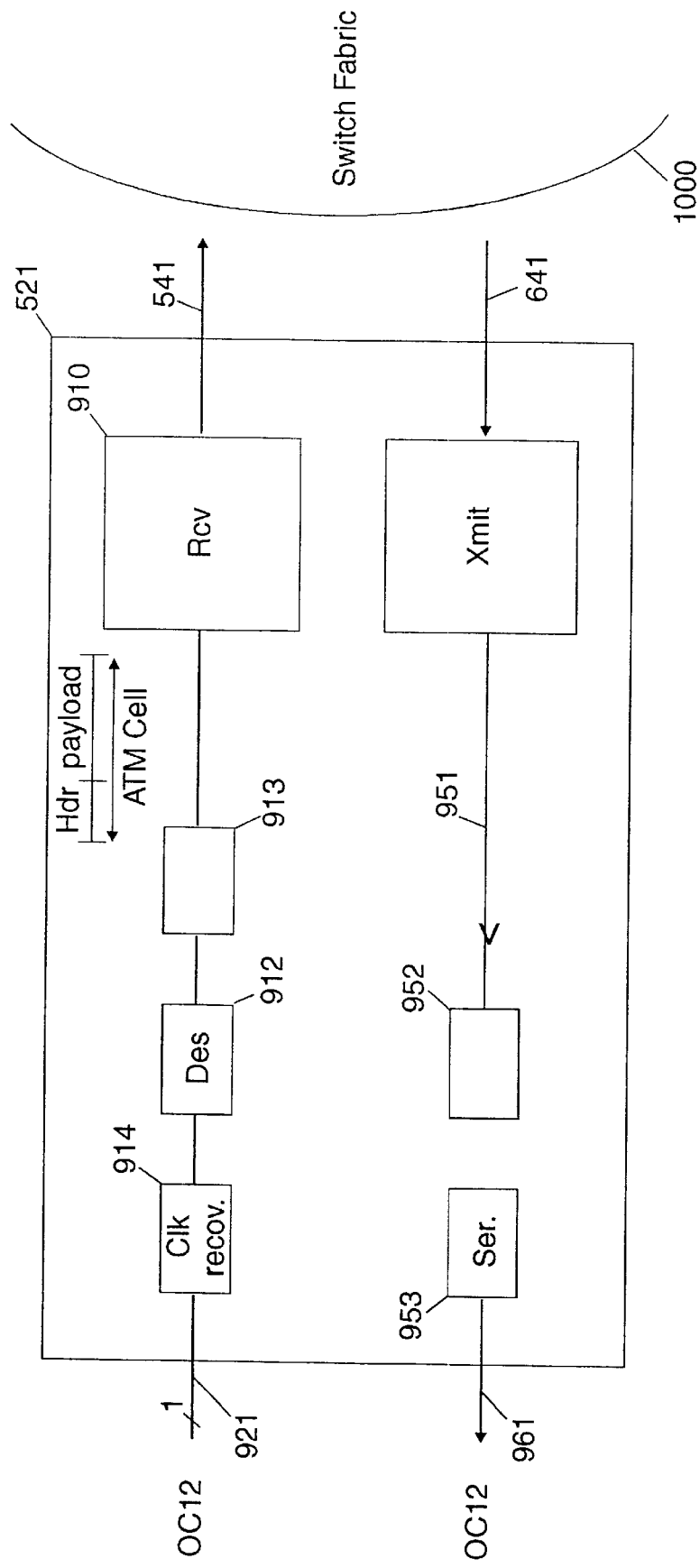
FIG. 14 shows the structure of a Protocol Engine well suited for interfacing lines carrying ATM cells.

With respect to FIG. 14 there is shown a particular embodiment of an enhanced "Protocol Engine" component that is well suited for interfacing lines carrying ATM cells. As shown in the figure, Protocol Engine 521 is based on a receive process block 910 for managing the ATM incoming flow and for preparing the Protocol Engine 521 for the attachment to the SCAL 1000. Receive block 910 has an input which is connected to 2-byte bus 911 and an output which is connected to a similar bus, namely bus 541. Conversely, Xmit process 950 receives the routed cells from bus 641 and provides the ATM cells on bus 951. In the example shown in the figure, the PE provides the attachment to one OC12/STM4 line. As known by the skilled man, such an attachment involves the use of traditional functions such as clock recovery 914, deserializing 912 and ATM cell delineation 913 so as to convert the physical one-bit data flow on lead 921 into a 16 bit ATM cell on bus 911. It should be noted that such functions involve well known circuitry—traditionally used in line interfaces—and will not be described in more detail. Conversely, the transmit path involves the Xmit block 950 providing ATM cells on a 16-bit bus 951 that will be transmitted to the one-bit physical media on lead 961 via a block 952 and a serializer 953. Block 952 provides the insertion of the ATM cells into the Synchronous Digital Hierarchy (SDH) bit stream.

Figure 15:
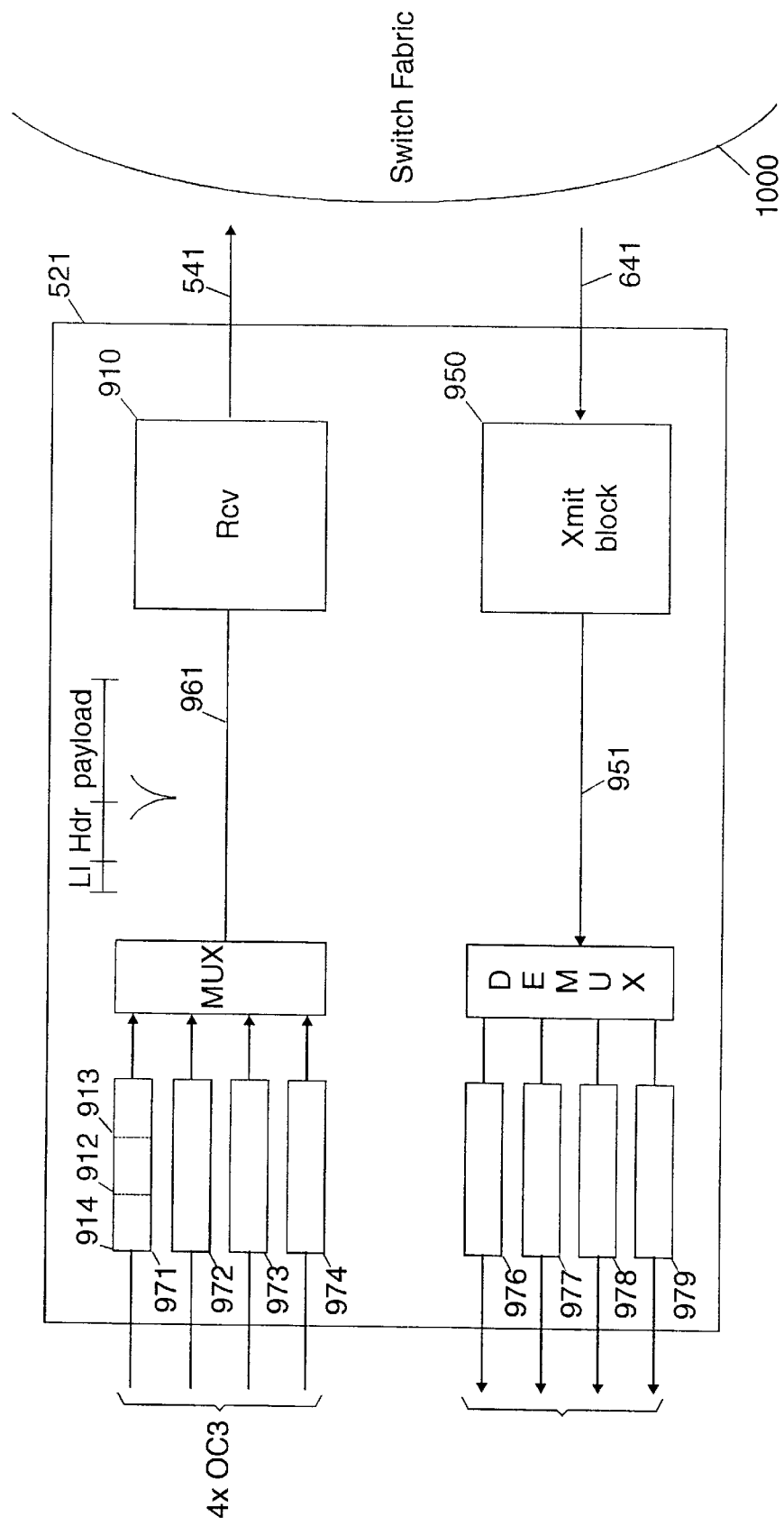
FIG. 15 shows a structure that is adapted for the attachment of four OC3 line interfaces via a set of four receive line interfaces 971–974 and four transmit line interfaces 976–979.

With respect to FIG. 15 there is shown a similar structure that is adapted for the attachment of four OC3 line interfaces via a set of four receive line interfaces 971–974 and four transmit line interfaces 976–979. For instance, receive line interface 971 comprises circuits 914, 912 and 913 of FIG. 15 and transmit line interface 976 may comprise circuits 952 and 953 of FIG. 15. With respect to the receive part, the output of the four blocks 971–974 are multiplexed at the cell level before the cells are generated on bus 911. Similarly, the flow of cells that is produced by Xmit block 950 is demultiplexed at the cell level so as to produce the four trains of cells which are transmitted to the appropriate OC3 line interface. In one embodiment of the invention the format of the cell that is received by receiver 910 may comprise three fields: a first one-byte field that defines the actual line on which the current cell was received, a second field comprising the 5-byte ATM header, and a third field comprising the ATM payload. However, it should be noted that other embodiments may take advantage of the so-called level_2 UTOPIA interface which provides the ATM layer with the capability of controlling several line interfaces. Such techniques are well known to the skilled artisan and will not be further described. In this case, the cell received by receiver 910 may only comprise the ATM cell (i.e., the header and the payload) and the information defining the associated line is provided to receiver 910 by separate means (not shown).

Figure 16:
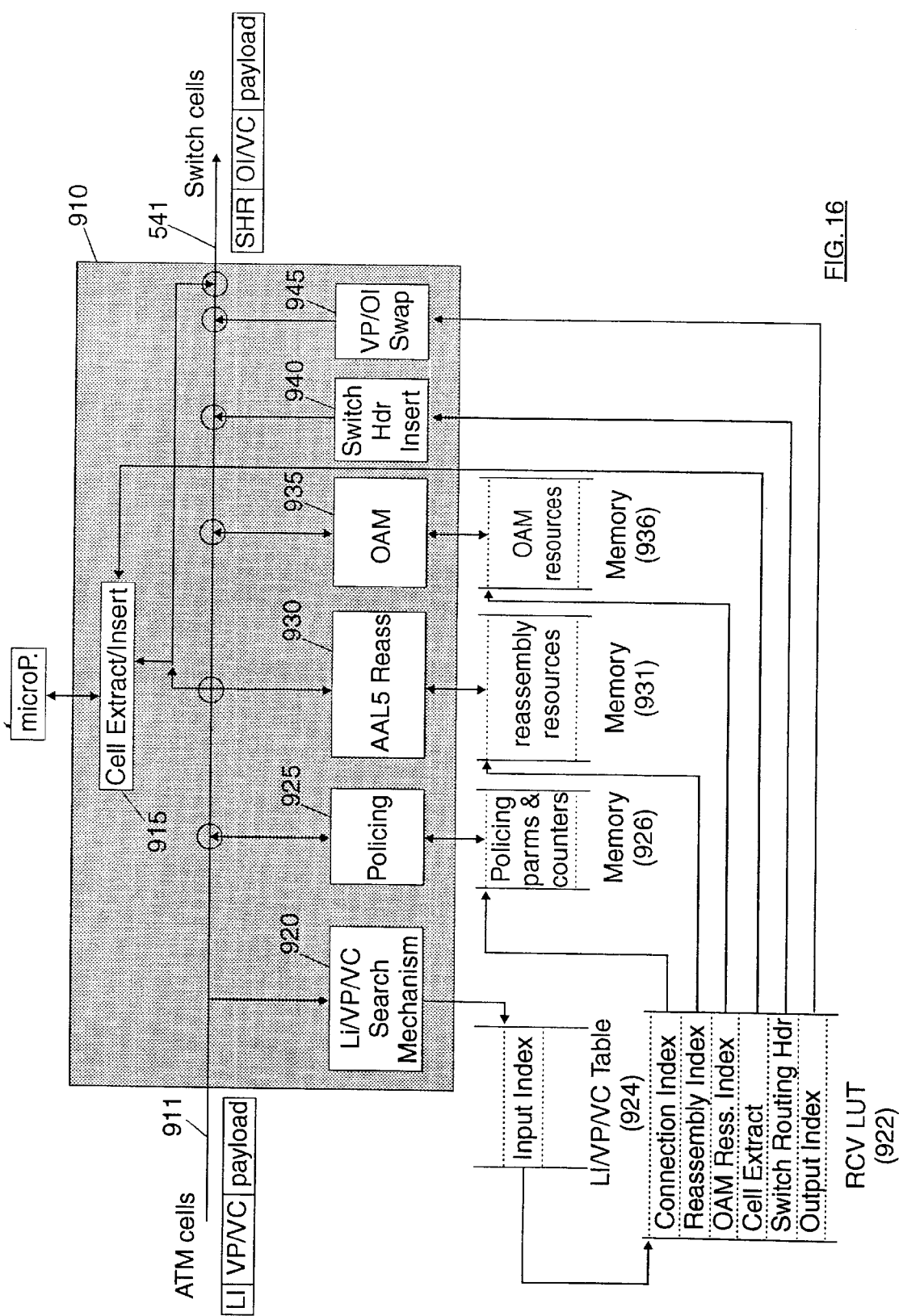
FIG. 16 shows the receive part of block 910 of the ATM Protocol Engine.

With respect to FIG. 16 there is shown the detailed structure of receive block 910. Basically, block 910 is based on a pipeline structure that successively performs elementary operations in order to convert the cell appearing on bus 911 into a switch cell on bus 541 that will be handled by the corresponding PINT element of the locally attached SCAL 1000.

First, receiver 910 comprises a Search block 920 that receives the cell on lead 911 and uses the LI/VP/VC field in order to access a LI/VP/VC table 924 for providing an input index. The access mechanism for such a table is well known and may advantageously use for instance the teaching of European patent application 94909050.0 owned by IBM Corp. (docket number SZ994001) showing an effective solution when a great number of different addresses (for instance 16000) are required. In the particular case where the LI/VP/VC appears not to be included in table 924, block 920 causes the cell to be discarded so that the cell will not be processed by the remaining part of the receiver block 910. In the case where an input index is associated with the particular LI/VP/VC value carried by the cell, the input is used for accessing a second table, namely a Receive Look Up Table 922 which is organized in order to contain, for each input index, a set of additional indexes which will be needed for the remaining part of the processing used by receiver 910.

More particularly, Table 922 is organized to contain the following fields: a Connection Index, a Reassembly Index, an Operation and Maintenance (OAM) index, a Cell Extract index, the Switch Routing Header that will be used by the switch fabric and particularly by the PINT element, and the switch core, and an Output index that will be used in conjunction with the transmit block 950.

When block 920 completes its processing, the cell is processed by a Policing block 925 which checks the conformance of the cell regarding the traffic parameters which have been defined for the particular ATM cell connection to which the considered cell belongs. To achieve this, block 925 uses the Connection index returned by the access to table 922, in order to access a Policing and Parameters Counters table 926 in order to check the incoming cell. Block 925 may check the conformance of the cell to the Generic Cell Rate Algorithm (GCRA) that is well known to the skilled artisan and recommended by the International Telecommunication Union (I.T.U.). Should non conformance to the GCRA algorithm be detected, the cell then may be discarded in accordance with the above mentioned recommendation. After the conformance processing performed by block 925, the cell is received by AAL5 block 930 which uses the Reassembly index provided by table 924 for determining whether the cell which is currently received should be directly forwarded to the next block 935, or reassembled in accordance with the well known AAL5 format. In the latter case, AAL5 block 930 causes the payload being transported in the cell to be loaded into a (not shown) buffer. It should be noted that since the storage capacity is limited, the number of reassembling operations which can be simultaneously performed is also limited.

When the full message is available in this memory, the latter may be accessed by the control processor that is located within the Protocol Engine.

If the cell is not to be reassembled, block 930 lets the cell be processed by an OAM block 935. The OAM block uses the OAM Resources index in order to determine whether or not the received cell belongs to a connection (defined by the VP/VC) for which a decision if OAM performance monitoring as specified in the I. 610 ITU Recommendations was made. If the cell is not under OAM performance monitoring, then block 935 lets the cell be processed by the next block 940. In the other case, however, block 935 determines whether or not a particular OAM cell is to be inserted or extracted, depending upon the actual number of user cells which were already received or transmitted according to the case. For instance, in the case of cell insertion, block 935 determines the opportunity for inserting an additional OAM cell (having a specific VP/VC) in accordance with the actual number of cells belonging to the considered connection which were already transmitted since the last OAM cell insertion. In the case of cell extraction, conversely, block 935 achieves the extraction of the OAM cell that is received. It should be noted that, since the receiver block 910 is based on a pipeline device, the insertion mechanism is actually performed at the first empty cell slot within the pipeline. This is made possible since the receive block 910 is designed so as to operate slightly faster than the actual data throughput of the lines which are thereto attached, thus ensuring the existence of sufficient empty cell slots within the cell flow. Additionally, an independent Cell Extract/Insert block 915 is fitted for the control processor inside the receiver block 910 so that the latter may also perform extraction in accordance with the contents of the Cell Extract field, or insert a cell when appropriate.

When block 935 completes its process, the cell is received by Switch Header Insert block 940 which uses the Switch Routing Header that was read from the access to table 922, and appends the header to the cell being received before it is transmitted to VP/OI swap block 945. The swap block uses the contents of the Outout Index that will be inserted within the cell in lieu of the eight LSB of the VP, plus the Header Correction Code (H.E.C.) field. As will be shown hereinafter in more detail, the latter will be used by the transmit part of the Protocol Engine for establishing the final VP/VC that will be required at the output of the PE. In other embodiments of the invention, the OI field may also be transmitted as a separate field which may be located at the first location of the cells. It should be noted that the Output index is characteristic of a specific process that is involved with the destination Protocol Engine. Therefore it may happen that two distinct connections may use the same output index. This achieves the possibility of realizing simple multipoint to point connections.

From the above described mechanisms, the SCAL 1000 receives a switch cell on bus 541 that takes the form shown in FIG. 16. A substantial advantage resulting from the structure of receiver 910 comes from the arrangement of the different tables in memory and the pipeline organization which permits each block 920, 925, 930, 935, 940, 945 to perform an elementary operation prior to the processing made by the block that follows in the path. This permits ensuring that the entire receiving process is achieved in a limited period, which appears essential for high speed lines.

Figure 17:
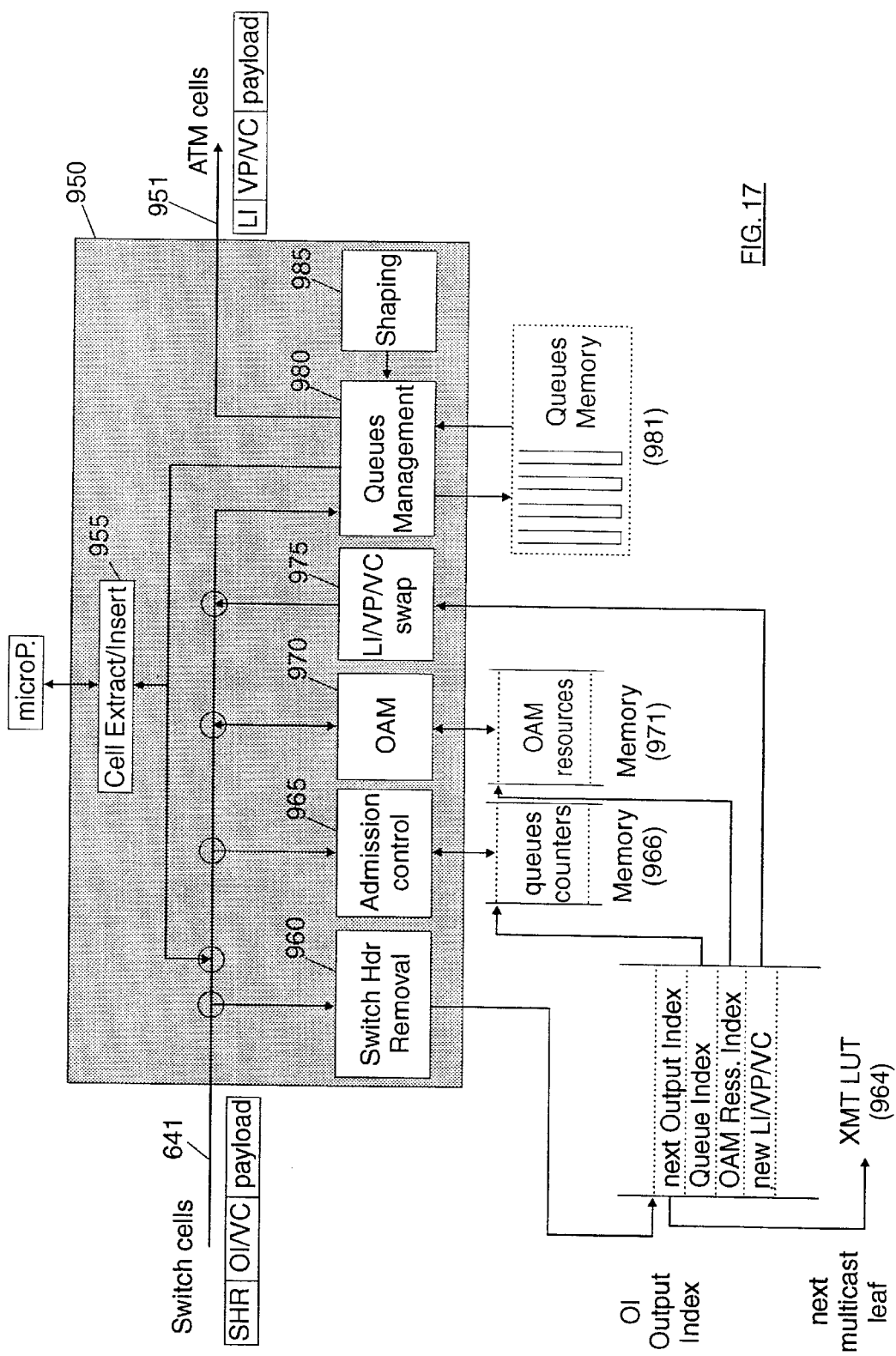
FIG. 17 illustrates the transmit part of block 950 of the ATM Protocol Engine.

The transmit part 950 is shown in FIG. 17. The switch cell that is received from the SCAL 1000 is entered into the Xmit part and processed by a block 960 that performs the suppression of the SRH from the cell. Additionally, block 960 uses the Output index that is located within the cell for accessing a XMIT Look Up table 964 which is so arranged as to provide the following field corresponding to the Output index being considered: a Next_Output Index that will be used for performing multicast operations with respect to ATM connections, a Queue Index, an OAM Resource index and a New LI/VP/VC that will be used for reestablishing the cell in the state in which it was received by receiver 910.

The cell is then processed by an Admission Control module 965 which checks the state of the queue that is associated with the particular connection corresponding to the cell being processed. Indeed, in the preferred embodiment of the invention, transmitter block 950 is designed for handling at least 16000 queues. When block 965 receives the cell, the Queue index is used for determining which queue is associated with the considered cell, and particularly for addressing a storage 966 which contains some parameters relating to this queue. Such parameters may include the number of cells being loaded into the queue, or the number of cells which could be loaded into the considered queue because of overload conditions. From these parameters, block 965 may decide whether or not to cause the loading of the processed cell into the queue that is associated with the considered Queue Index. In a preferred embodiment of the invention, a particular mechanism is used that monitors the current number of cells being loaded within the queue, and compares this value to a predefined threshold. Should the former exceed the latter, block 965 may either reject any additional cells, or in some restricted cases, accept additional cells when they correspond to priority connections.

Parallel with the loading of the cell into the appropriate queue, a LI/VP/VC block 975 performs the construction of a new header for the cell. This is achieved by suppression of the OI/VC from the cell being received and superseding it with the contents provided by the New_LI/VP/VC. It should be noted that this construction may leave the VC field unchanged, in which case, VP switching is performed. More generally however, the entire VP/VC field may change.

In addition to the arrangement of the 16000 queues used in the Xmit block 950, a Queue Management system 980 is provided for ensuring maintenance of an ordered list of buffers in which the cells are loaded , each ordered list corresponding to one of the 16000 queues. Additionally, a Shaping device 985 causes a smooth output of the cells which are loaded into the different queues. This particularly depends upon the output rate which is allocated to each queue.

Similarly to the receive block 910, an OAM block 970 is used for inserting or extracting OAM performance monitoring cells. If the cell is not under OAM performance monitoring, then block 970 does not operate. In the other case, however, block 970 determines, as above, whether or not a particular OAM cell is to be inserted or extracted, depending upon the actual number of user cells which were already received or transmitted according to the case.

As mentioned above for the receiver block 910, the invention takes advantage of the particular arrangement of the different tables that are used for managing the different indexes. This prevents the use of large and costly memories. This very effective organization provides a receiver and a transmit block for an ATM Protocol Engine that allows 600 Mbits/s connections. It appears from above, that the PE is used for performing the VP/VC swap by means of the additional output index which is embedded into the payload of the switch cell which is routed by the switch core. Without this particular feature, it would be necessary to perform the VP/VC swapping at the level of the PE receiver, thus resulting in a duplication of the cell prior to its routing by the switch core. With this very effective mechanism used in the PE of the present invention, only one cell is routed through the switch core thus minimizing the overload of the switch core, and the VO/VC swap is performed at the level of the Protocol Engine on the Xmit side before the cell is transmitted on the line. Thus, the use of the Output Index which is introduced by the receiver part of the Protocol Engine is advantageously combined with the efficiency of the switch core that was described above.

Additionally, the mechanism can still be enhanced by using the Output index for a second function, that of providing the possibility of multicasting cells on connection. This is made possible by combining a multicast buffer with an additional mechanism that is based on the use of a specific bit of Next_Output index field that is produced by the access to table 964.

Figure 18:
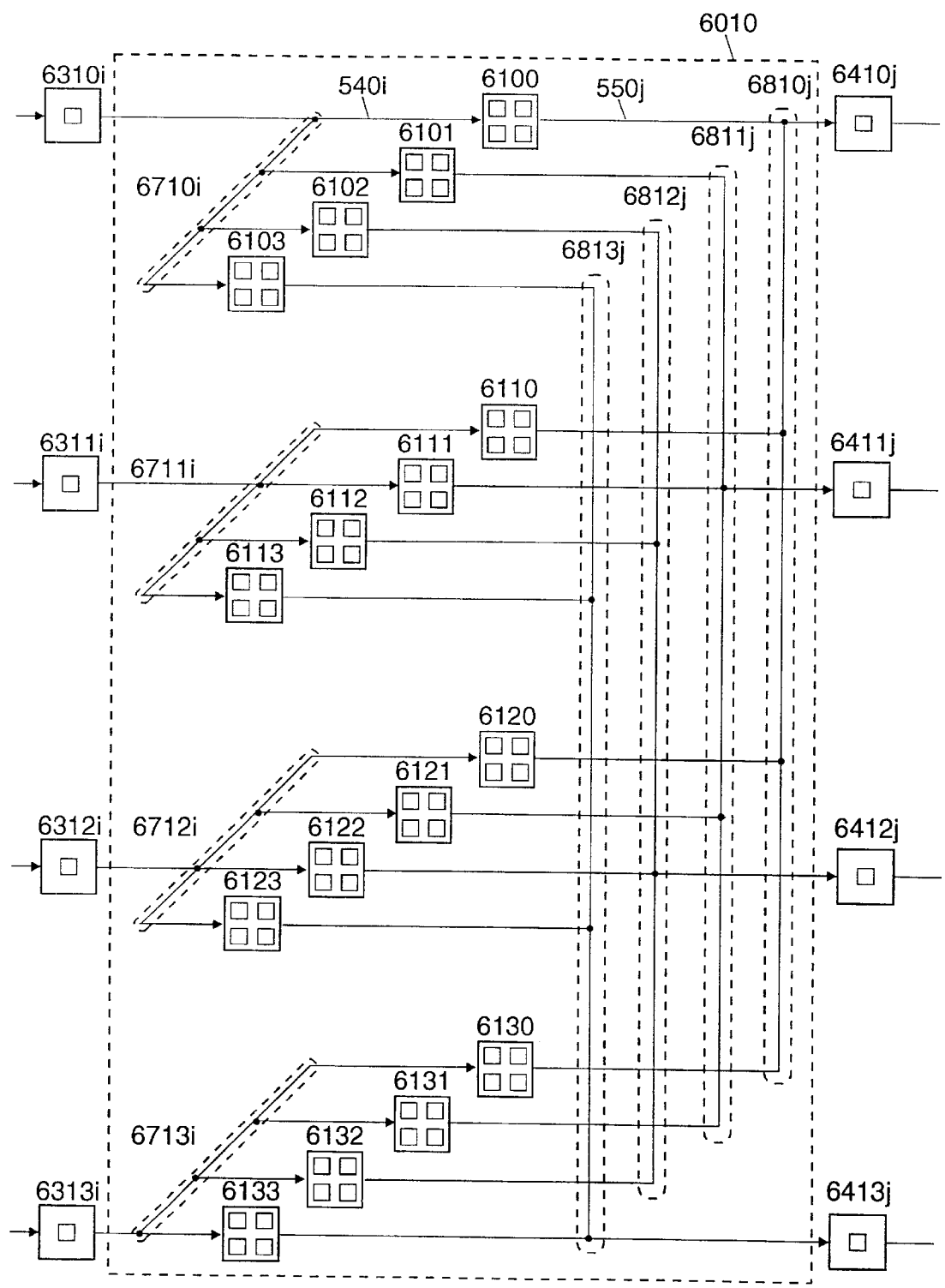
FIG. 18 illustrate the architecture of the switch fabric when arranged in port expansion mode.

Port Expansion architecture:

With respect to FIG. 18 there is shown an improvement of the switch fabric of FIG. 6 wherein the power of the switch core is substantially enhanced by multiplying the number of ports while maintaining the characteristics (speed, physical and logical interfaces) of the ports. In the preferred embodiment of the invention, the number of ports is multiplied by four, thus providing a single-stage aggregate switch core 6010 of 64 ports. In FIG. 18, switch core 6010 contains a set of sixteen elementary switch cores divided in four distinctive groups of four elements each: a first group including switch cores 6100–6103, each switch core 6100–6103 based on a switching structure 450 as described above (comprising four individual switching modules such as described with reference to FIGS. 2 and 3); a second group comprising switch cores 6110–6113; a third group of switch cores 6120–6123; and a fourth group of switch cores 6130–6133. It should be noted that each of the sixteen elementary switch cores fully complies with the structure 1130 of FIG. 10. Additionally, the skilled artisan will note that the number of ports may be multiplied by any value of n. The number of elementary switch cores will be concurrently increased by a ratio of n×n.

The aggregate switch core 6010 is designed to cooperate with a set of 64 SCAL receive parts with the receive SCAL element 1000 of FIG. 10. The 64 SCAL elements are divided into four groups of 16 receive SCALs each: a first group of receive SCALs 6310-0 to 6310-15 (represented by the reference 6310-i in FIG. 18), a second group of receive SCALs 6311-0 to 6311-15, a third group of receive SCALs 6312-0 to 6312-15, a fourth group of receive SCALs 6313-0 to 6313-15. Similarly, the aggregate switch core 6010 cooperates with a set of 64 transmit SCAL elements which are divided into four distinct groups: a first group of transmit SCALs 6410-0 to 6410-15, a second group of transmit SCALs 6411-0 to 6411-15, a third group of transmit SCALs 6412-0 to 6415 and fourth group of SCALs 6413-0 to 6413-15. Each of the sixteen transmit SCALs fully complies with element 5000 of FIG. 10.

The cells which are provided at the output of SCAL element 6310-i (for i=0 to i=15) are duplicated by means of a corresponding duplicating circuit 6710-i so that the cells are transmitted into the corresponding input i of the four elementary switch cores 6100–6103 that compose the first group of elementary switch cores. This eventually provides a fan-out operation of the bus 540-i of FIG. 10 at the considered i input port.

Similarly, a second set of sixteen duplicating circuits 6711-0 to 6711-15 is associated with the sixteen receive SCALs 6311-0 to 6311-15 so as to provide a fan-out operation for the second group of four elementary switch cores 6110–6113. Similarly, a third set of sixteen duplicating circuits 6712-0 to 6712-15 is associated with the sixteen receive SCALs 6312-0 to 6312-15 so as to provide a fan-out operation for the third group of four elementary switch cores 6120–6123. Finally, a fourth set of sixteen duplicating circuits 6713-0 to 6713-15 is associated with the sixteen receive SCALs 6313-0 to 6313-15 so as to provide a fan-out operation for the fourth group of four elementary switch cores 6130–6133.

The cells which are received by transmit SCAL element 6410-j (for j=0 to j=15) come from the corresponding output port j of one of elementary switch cores 6100, 6110, 6120 or 6130 (composing a first output group) via a corresponding merging unit 6810-j in order to provide a fan-in operation on the bus 550-j of FIG. 10.

Similarly, a second set of sixteen merging circuits 6811-0 to 6811-15 is associated with the sixteen transmit SCALs 6411-0 to 6411-15 so as to provide a fan-in operation for the four elementary switch cores 6101, 6111, 6121 and 6131 (composing a second output group) A third set of sixteen merging circuits 6812-0 to 6812-15 is associated with the sixteen transmit SCALs 6412-0 to 6412-15 so as to provide a fan-in operation for the elementary switch cores 6102, 6112, 6122 and 6132 that compose a third output group and, finally, a fourth set of sixteen merging circuits 6813-0 to 6813-15 is associated with the sixteen transmit SCALs 6413-0 to 6413-15 so as to provide a fan-in operation for the fourth output group comprising the four elementary switch cores 6103, 6113, 6123 and 6133.

It appears from the above described architecture that a cell which is transmitted from a considered Protocol Engine (not represented in FIG. 18), arriving to receive SCAL element 631P-i (with P=0 to 3), and which is to be routed to a Protocol Engine that is connected to a transmit SCAL 641Q-j (with Q=0 to 3) will be conveyed through the particular elementary switch core 61PQ via its input port referenced i and its output port j. For instance, the cell which arrives to receive SCAL 6312-4 and which is to be routed to transmit SCAL 6410-13 will be conveyed through duplication circuit 6712-4, then will arrive at the input port 4 of elementary switch core 6120 and will exit the switch core at the output port 13, and will be conveyed through merging circuit 6810-13 in order to arrive at SCAL 6410-13.

In the preferred embodiment of the invention, the invention takes advantage of the particular structure of each elementary switch core 1130 that is shown in FIG. 10. Indeed, as mentioned above in the description core 1130 is fitted with a set of sixteen routing control devices 1001-0 to 1001-15 with corresponding routing control tables 1002-0 to 1002-15. As explained above, the routing control device introduces the appropriate routing header that is read from the corresponding routing control table that corresponds to the SRH associated with the cell. In addition to the extraction of the appropriate routing header, table 1002-i provides an additional valid bit which can be used for discarding the cell, that is to say, preventing the transmission of the cell to the switching structure 450 when the valid bit is found to be invalid. This achieves a filtering capability which permits the use of very simple duplicating circuits 6710, 6711, 6712 and 6713 since they can be embodied by very simple electrical drivers.

Additionally, since the same cell is received by the four individual switch cores belonging to the same group (via its corresponding duplicating circuit), it appears the same cell will be processed by four distinct routing control devices (at the considered input port), each routing control device addressing its associated routing control tables. Therefore, as the contents of these four tables will be advantageously loaded as described below, it appears that the same cell that arrives at four switch cores may be routed to different output ports in accordance with the contents of the four tables being addressed. This is very important since it provides an additional level of multicasting. Indeed, as mentioned above the routing control device 1001 is used for generating the appropriate routing header which, when processed by the switching structure 450, will result in the transmission of the considered cell to the appropriate output ports of the switching structure 450. This was described as providing a first multicast capability since it makes possible having the cell duplicated at the appropriate output port of the switching structure 450. In the improvement illustrated in FIG. 18, the routing control devices 1001 are assigned an additional filtering function which, when cooperating with the broadcast operation performed by the duplicating circuits, provides an additional level of multicasting since it makes it possible to discard or keep the cell and moreover, when the cells are transmitted to the four switch cores of the same group, to independently route the same cell to four separate groups of directions.

Therefore, it appears that the same group of switch cores—such as cores 6100–6103—operates in the same way that one elementary switching structure 450 does, but with the important advantage that the number of ports is multiplied by four.

Figure 19:
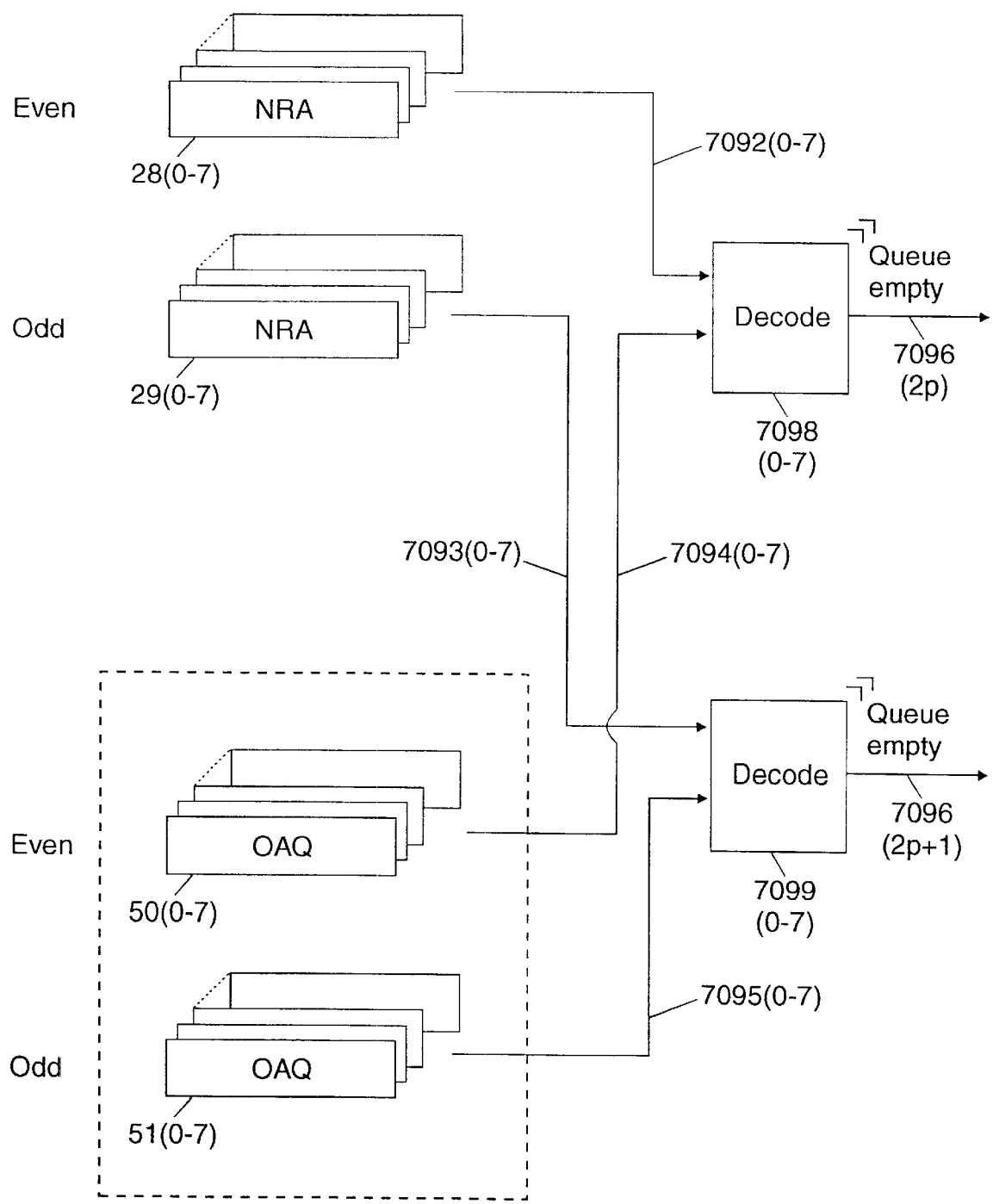
FIG. 19 shows the two Queue_Empty control signals that are used for embodying the merging of the port expansion architecture.

With respect to FIG. 19, there is shown how the merging function is achieved by means of a advantageous adaptation in the structure of the switching module 401, based on the use of two sets of additional control signals, a first set of 16 Queue_Empty control signals which are produced by means of 16 decoders located inside the switching module 401 of FIGS. 2 and 3. A first group (EVEN) of 8 control signals 7096 (2p) (for p=0 to 7) is generated as follows: a set of eight decoders 7098 (0-7) receives at a first input a corresponding one among eight control signals 7094 (0-7) which is generated in response to the empty state of the Output Address Queue 50(0-7). Additionally each one of the eight decoders 7098 (0-7) receives at a second input the control signal which is generated in response to the free state of the corresponding NRA register 28(0-7) that is illustrated in FIG. 3. The free state of these registers derives from the transfer of their contents into the corresponding ARA registers as explained above with reference to FIG. 3. Conversely, the non-free state is determined from the transfer of the OAQ into the NRA register.

A second group (ODD) of 8 control signals 7096(2p+1) (with p=0 to 7) is similarly generated as above: eight decoders 7099 (0-7) receives each at a first input a corresponding one among eight control signals 7095 (0-7) which is generated in response to the empty state of the Output Address Queue 51(0-7). Additionally each one of the eight decoders 7099 (0-7) receives at a second input the control signal which is generated in response to the free state of the corresponding NRA register 29(0-7) that is illustrated in FIG. 3. As explained above, the free state of these registers derives from the transfer of their contents into the corresponding ARA registers, while the non-free state is determined from the transfer of the OAQ into the NRA register. It should be noted that, since the four switching elements that compose a switching structure 450 operates under a master switching element, the Queue_Empty control signals that will be used in accordance with the description below are those that are generated by the master switching element.

Additionally, each switching element is designed so as to receive a set of sixteen GRANT control signals (0-15) that are separated in two ODD and EVEN groups of each signals each. The 8 ODD GRANT control signals are transmitted to the corresponding one among the first 8 drivers among the set of 16 OCD drivers 11 (0-15). When one among these 8 GRANT control signals is set at a low state, this entails a disabling of the corresponding OCD driver. The 8 EVEN Grant control signals are transmitted to the corresponding one among the last 8 drivers composing the set of 16 OCD drivers and, similarly, they are used for disabling the corresponding OCD driver when they are set at a low state.

Additionally, each one among the 16 GRANT control signals 7097(0-15) is assigned a second technical function: at a low level this function performs the disabling of the transfer of the NRA registers into the corresponding ARA registers. Conversely, when one GRANT control signal is set to a high level, the transfer of the corresponding NRA register (among the sixteen registers composing the two groups of ODD and EVEN sets of registers 28 and 29) is enabled. It should be noted that when the transfer of one NRA register is disabled (in response to a low level of its corresponding GRANT control signal), this prevents the NRA register from switching to a free state and, eventually, locks the transfer of the address loaded into the corresponding OAQ 50 or 51 towards this NRA register.

As it appears in FIG. 18, the j output (with j=0 to 15) of switch cores 6100, 6110, 6120 and 6130 for instance are connected to the same merging circuit 6810-j. Similarly, the j output of switch cores 6101, 6111, 6121 and 6131 are connected to a same merging circuit 6820-j and so on.

Figure 20:
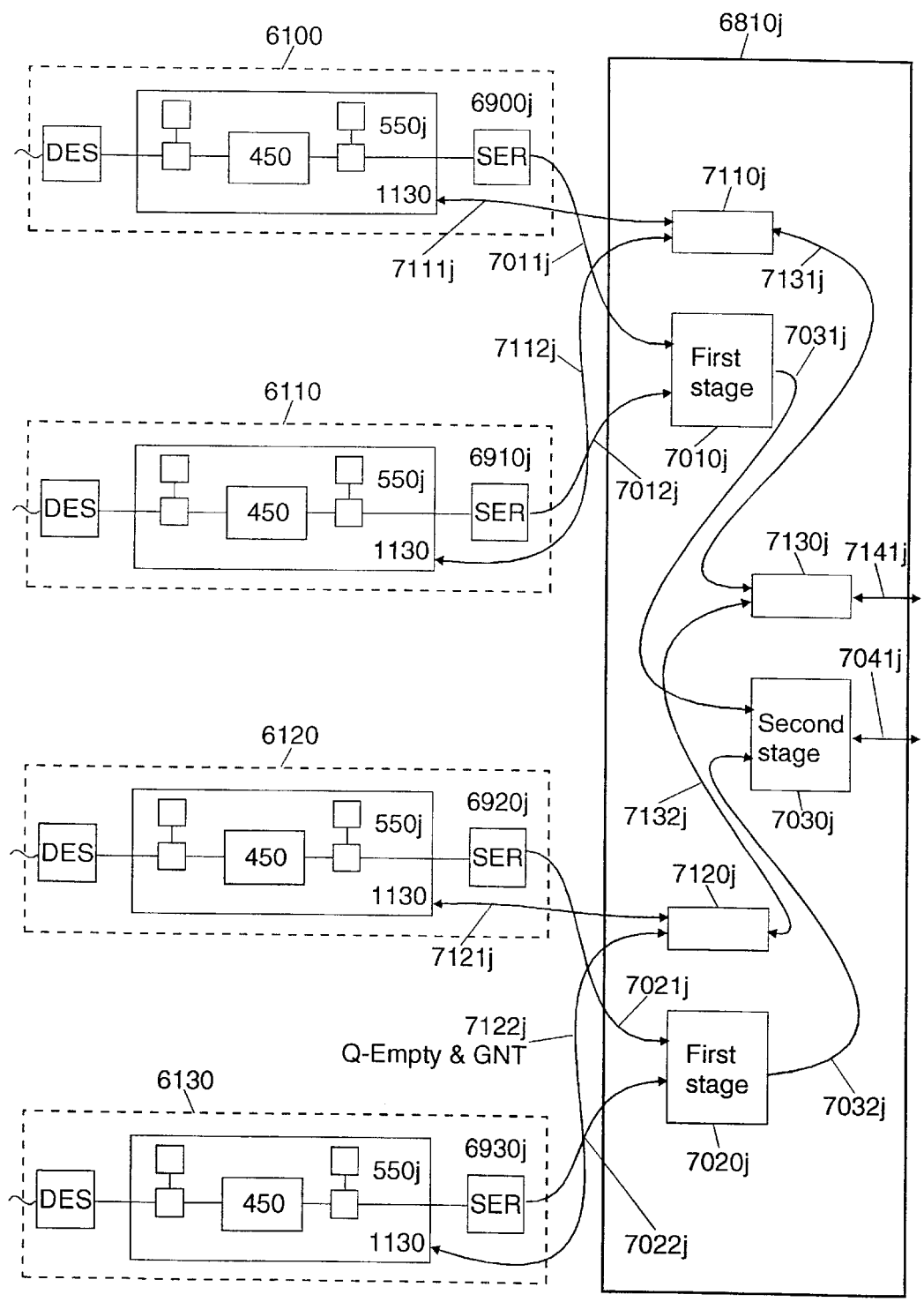
FIG. 20 is an illustration of the preferred embodiment of the architecture that is used for the practical realization of the merging circuit—e.g., merging circuit 6810—and the associated arbitration circuits.

With respect to FIG. 20 there is shown the preferred embodiment of the architecture that is used for the practical realization of the merging circuit, e.g. merging circuit 6810, and the associated arbitration circuits. As mentioned above, merging circuit 6810-j is designed to provide the fan-in of the data received from elementary switch cores 6100–6130. It should be noted that elementary switch core 6100 includes a switch core that is fully in compliance with the switch core 1130 that was illustrated in FIG. 10 (the control device 1000 and 1010 being symbolized in the figure without any reference), and further comprises a set of 16 communication circuits for the sixteen output ports, only one circuit 6900-j being represented in FIG. 20. Communication circuit 6900-j (basically a serializing circuit) is used for converting the information that is transported by the bus 550-j (in FIGS. 10 and 20) in a set of analog signals that is suited to the media that will be used for the communication, for instance a coaxial or optical fiber cable 7011j. Indeed, in view of the high frequencies that are used, communication circuit 6900-j achieves the transport of the signal towards the distance of the cable 7011-j (from a few meters to more than one hundred meters). Additionally, communication circuit 6900-j introduces a coding of the information which will be advantageously used by the first-stage circuit 7010-j of merging circuit 6810-j.

As shown in FIG. 20, merging circuit 6810-j has a first stage which comprises first_stage circuit 7010-j and first stage circuit 7020-j. First-stage circuit 7010-j receives the cells coming from elementary switch core 6100 through communication circuit 6900-j and the physical media 7011-j, as well as the cells that come from switch core 6110 through its communication circuit 6910-j and physical media 7012-j. The first stage of merging circuit 6810-j further includes first_stage circuit 7020-j. First-stage circuit 7020-j receives the cells coming from elementary switch core 6120 through communication circuit 6920-j and the physical media 7021-j, as well as the cells that come from switch core 6130 through its communication circuit 6930-j and physical media 7022-j.

Additionally merging circuit 6810-j comprises a second_ stage circuit 7030-j that receives the cells that come from the first-stage circuits 7010-j and 7020-j, respectively via physical media 7031-j and 7032-j. The cells that are outputted from second-stage circuit 7030-j are then available on a physical media 7041-j which can be embodied in the form of a coaxial cable or an optical fiber. It should be noted that, in the preferred embodiment of the invention, the length of the cables embodying the physical media that connect the switch core to the merging circuit are generally less than one meter, while the length of the cables that connects the first and second stage circuits of the merging circuit is several meters, and the last cable 7041 at the output of the merging circuit can have a length of several hundred meters.

In addition to the first and second stage circuits, merging circuit 6810-j comprises an architecture made up of two first stage arbitration circuits, arbitration circuits 7110-j and 7120-j (composing a set of 32 first stage arbitration circuits when considering the 16 ports of the switch core), and a second stage arbitration circuit 7130.

First stage arbitration circuit 7110-j receives the Queue_Empty control signal that is generated by switch core 6100 and conversely transmits a GRANT control signal to the switch core 6100. The two controls signals—being conveyed in opposite directions—are illustrated in the figure with a common control line 7111-j. Similarly, first stage arbitration circuit 7110-j receives the Queue-Empty control signal that is generated by switch core 6110 and conversely transmits a GRANT control signal to the switch core 6110 via dual control line 7112-j.

Also, first stage arbitration circuit 7120-j receives the Queue_Empty control signal that is generated by switch core 6120 and conversely transmits a GRANT control signal to the switch core 6120 via a dual common control line 7121-j. First stage arbitration circuit 7120-j receives the Queue-Empty control signal that is generated by switch core 6130 and conversely transmits a GRANT control signal to the switch core 6130 via dual control line 7122-j.

Second stage arbitration circuit 7130-j receives the Queue-Empty control signals that are generated respectively by first stage arbitration circuit 7110-j via cable 7131-j and circuit 7120-j via 7132-j. Conversely, first stage arbitration circuits 7110-j and 7120-j respectively receive the GRANT control signal from second stage arbitration circuit 7130-j via control line 7131-j and 7132-j. The second stage arbitration circuit 7130-j receives the GRANT control signal from the SCAL element 6410-j.

It should be noted that the preferred embodiment of the invention uses a merging circuit architecture that is based on a two-stage structure. However, the invention is not limited to the use of only two stages, and may be expanded to three or more stages. In the case of a three stage merging circuit, arbitration circuit 7130j would be connected to a third stage arbitration circuit via line 7141-j which would be a dual control line, that is to say which would allow the transmission of the GRANT control signal and the Queue_Empty control signal in the other direction.

Since the arbiter only provides one GRANT signal to one among the four elementary switch cores that belongs to the same merging circuit, it appears that theoretically contention is excluded since for each cell cycle the merging circuit should receive a maximum of one cell. However, the switching cores operate at a higher frequency, thus decreasing the cell cycle time. Additionally the physical size of the switch tends to increase (in term of the physical space and the length of the cables which are involved) and thus the transit times of the signals are accordingly increased. This substantially impacts the mechanism that is used by the arbiter and a specific mechanism is included in the arbiter in order to avoid this disadvantage.

For simplicity's sake, the elementary switch cores present the same cell cycle. For a given port j and at each cell cycle, the four elementary switch cores 6100–6130 of FIG. 18 control their corresponding Queue_Empty control lead in accordance with the actual state of their OAQ queues therein located. Therefore, the actual states of the four OAQ queues being considered are represented on the control leads 7111-j (for core 6100), 7112-j (for core 6110), 7121-j (for core 6120) and 7122-j (for core 6130). First-stage arbiter 71 10-j receives at its two inputs the two Queue_Empty control signals that are generated by elementary switch cores 6100 and 6110. From these two signals, first-stage arbiter 7110-j derives a corresponding Queue-Empty control signal on bus 7131-j which is transmitted to second-stage arbiter 7130-j.Similarly, first-stage arbiter 7120-j derives from the two Queue-Empty control signals that are received from the two corresponding cores 6120 and 6130 the Queue-Empty control signal that is transmitted to second-stage arbiter 7130-j via bus 7032-j.

Second-stage arbiter 7130-j receives at its two inputs the two Queue_Empty control signals that are generated by the two first-stage arbiters 7110-j and 7120-j. In the case where the arbitration circuit is distributed in more than two stages, e.g. includes an additional third stage arbiter, second-stage arbiter derives a corresponding Queue-Empty control signal which can be transmitted to third stage arbiter (not represented in the figure) and so on. Now consider the case where only a two-stage arbitration circuit is employed; this means that second-stage arbiter 7130 is the last element of the chain. Therefore, from the two Queue-Empty control signals that are transmitted from the first-stage arbiters, second-stage arbiter 7130-j generates a unique GRANT control signal if appropriate. This GRANT control signal is then propagated to the appropriate switch core, that is, to the first-stage arbiter that has issued an Queue-Empty control signal when alone, and, when the two first-stage arbiters issued a similar Queue-Empty control signal, second-stage control signal transmits the GRANT in accordance with a considered assignment process. In the preferred embodiment of the invention, in case of contention, the second-stage arbiter assigns the GRANT signal to the first-stage arbiter that was not serviced the last time. Similarly, the first-stage arbiter that receives the GRANT signal assigns the latter to the other switch that has previously received the GRANT signal. This assignment is embodied by means of an appropriate control signal on the GRANT lead of busses 7111-j, 7112-j, 7122-j and 7121-j.

Figure 21:
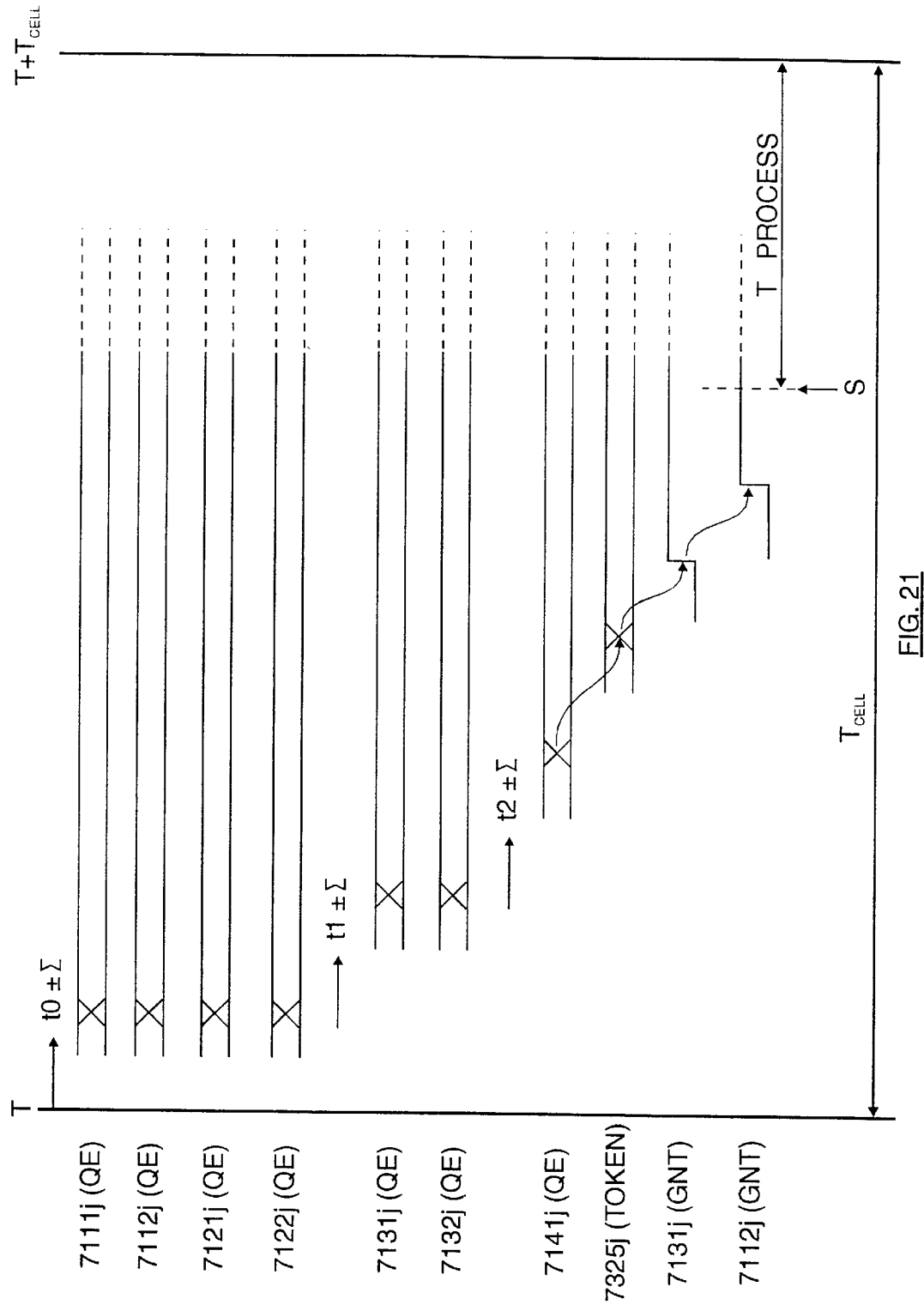
FIG. 21 illustrates the timing diagrams that are involved in the actual process of transmission of the Queue-Empty control signals through the first stage arbiters, the building of the GRANT control signal inside the second-stage arbiter, and the retransmission of the latter in the opposite direction towards the appropriate switch core that will receive the GRANT control signal.

It should be noted that, in view of the high switching rates of the switching architecture, the period that is assigned to one cell is very short, thus rendering the transit times not quite negligible. FIG. 21 illustrates the timing diagrams that are involved in the actual process of transmission of the Queue-Empty control signals through the first stage arbiters, the building of the GRANT control signal inside the second-stage arbiter, and the retransmission of the latter in the opposite direction towards the appropriate switch core that will receive the GRANT control signal. It should be noted that since the GRANT control signal is used by the considered switch core for the next cell cycle, it appears that the GRANT control signal should be available on one among the four considered busses 7111-j ; 7112-j, 7122-j and 7121-j before the occurrence of the sampling time that is represented in FIG. 21, and which corresponds to the latest time which is allowed by the switch core, in view of its physical requirements and internal organization, for ensuring the outputting of the data at the next cell cycle.

Figure 22A:
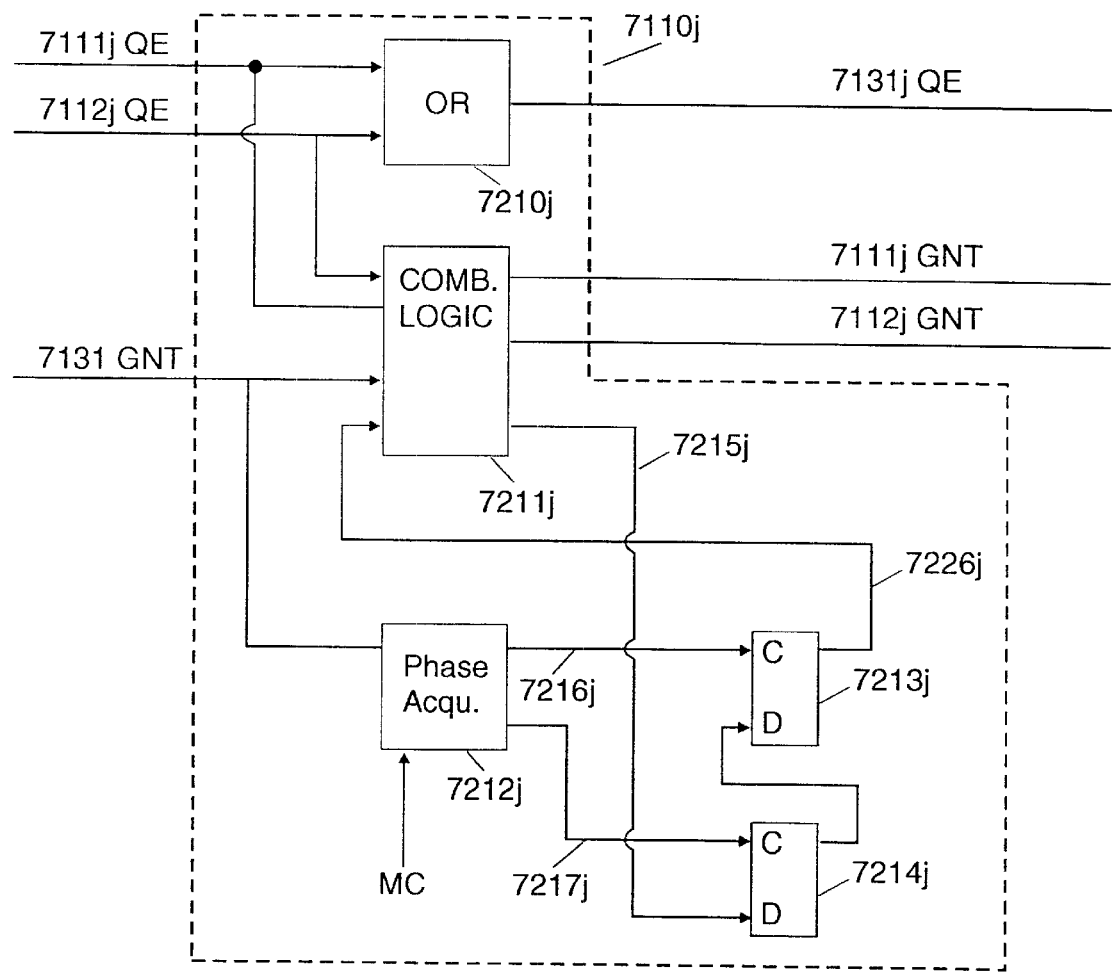
FIGS. 22A and 22B show the physical structure of the arbiters that are used for embodying first stage and second stage arbiters.
Figure 22B:
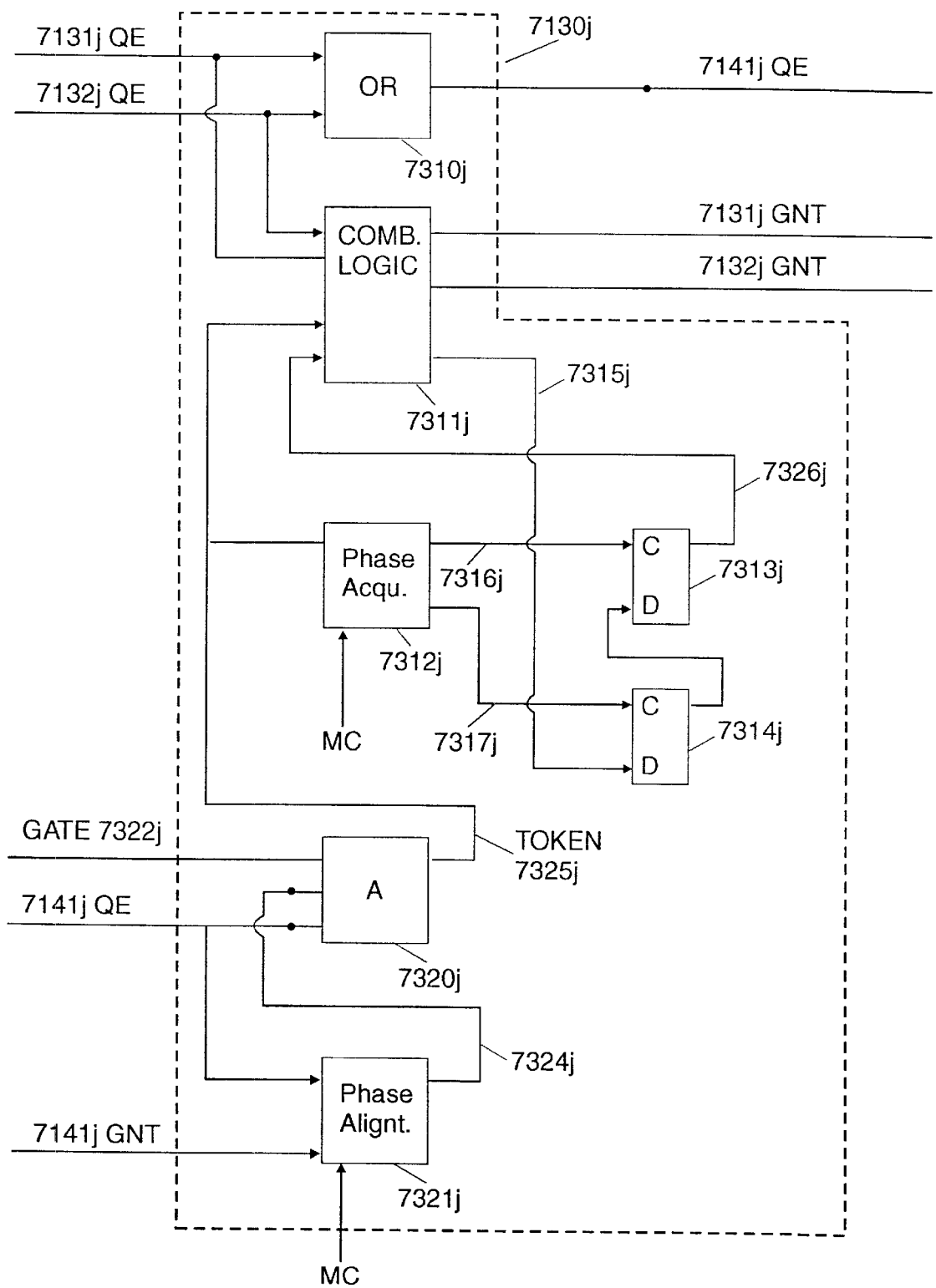

With respect to FIGS. 22A and 22B, there is shown the physical structure of the arbiters that are used for embodying the first stage and second stage arbiters. First stage arbiter—e.g. arbiter 7110-j—is represented in FIG. 22A and comprises an OR gate 7210-j that has a first input receiving the Queue_Empty control signal of bus 7111-j and has a second input that receives the Queue_Empty control signal of bus 7112-j. The output of OR gate 7210-j is used to generate the Queue_Empty control signal on bus 7131-j that is intended for the second stage arbiter. Additionally, first stage arbiter 7110-j comprises a combinatory logic circuit 7211-j having a first input that receives the Queue_Empty control signal from bus 7111-j, a second input that receives the Queue_Empty control signal from bus 7112-j, a third input that receives the GRANT control signal from bus 7131-j transmitted from the second stage, a fourth input that receives the contents of a latch 7213-j. Logic circuit 7211-j has a first output lead that generates the GRANT control signal on bus 7111-j and a second output lead that produces the GRANT control signal on bus 7112-j, those two control signals being used by the associated switch cores 6100 and 6110. Logic circuit 7211-j has a third output lead 7215-j that is connected to the data input of a second latch 7214-j, the output of which is connected to the data input of the first latch 7213-j. A Phase Acquisition circuit 7212-j receives the GRANT control signal from bus 7131-j and respectively produces a first clock signal 7216-j that is intended for the clock input of latch 7213-j, and produces a second clock signal 7217-j that is used for clocking the second latch 7214-j. To achieve this, the Phase Acquisition circuit 7212-j receives a master clock (MC) signal.

With respect to FIG. 22B, there is shown the structure of the last stage arbiter, e.g. second-stage arbiter 7130-j in the preferred embodiment made up of two stages. Second stage arbiter 7130-j comprises an OR gate 7310-j that has a first input receiving the Queue_Empty control signal of bus 7131-j and has a second input that receives the Queue_Empty control signal of bus 7132-j. The output of OR gate 7310-j is used to generate the Queue_Empty control signal on bus 7141-j that is transmitted to an AND gate 7320-j. Additionally, second stage arbiter 7130-j comprises a combinatory logic circuit 7311-j having a first input that receives the Queue_Empty control signal from bus 7131-j, a second input that receives the Queue_Empty control signal from bus 7132-j, a third input that receives the GRANT control signal available at the output of AND gate 7320-j, and a fourth input that receives the contents of a latch 7313-j. Logic circuit 7311-j has a first output lead that generates the GRANT control signal on bus 7131-j and a second output lead that produces the GRANT control signal on bus 7132-j, those two control signals being used by the first stage arbiters. Logic circuit 7311-j has a third output lead 7315-j that is connected to the data input of a second latch 7314-j, the output of which is connected to the data input of the first latch 7313-j. A Phase Acquisition circuit 7312-j receives the GRANT control signal available at the output of AND gate 7320-j and respectively produces a first clock signal 7316-j that is intended for the clock input of latch 7313-j, and a second clock signal 7317-j that is used for clocking the second latch 7314-j. To achieve this, the Phase Acquisition circuit 7312-j receives a master clock (MC) signal as detailed hereinafter.

In addition to the control signal received from the OR gate 7310-j at a first input, AND gate 7320-j receives a Gate control signal 7322-j at a second input lead, and a control signal at a third input lead that is generated by a Phase Alignment circuit 7321-j. The Phase Alignment circuit has two input leads that respectively receive the Queue_Empty control signal from bus 7141-j generated by OR gate 7310-j, and the GRANT control signal on bus 7141-j that is received from the Switch Core Access Layer (SCAL) 6410-j. Phase Alignment circuit 7321-j receives the same master clock (MC) that is also received by Phase Acquisition circuit 7312-j. Finally, AND gate 7320-j has an output lead that is transmitted to both the Phase Acquisition circuit 7312-j and to the combinatory logic circuit 7311-j.

With respect to FIG. 21, consider T to be the beginning of the cell cycle for the group of elementary switch cores 6100, 6110, 6120 and 6130. It should be noted that the cell cycles of each respective switch core element are synchronized with each other. This synchronization is performed with a given degree of precision. Each switch core element generates a Queue_Empty control signal which is in phase with its cell cycle in order to indicate whether or not there is something to transmit on the next cell cycle. These four control signals are represented in FIG. 21 with respect to the numeric reference 7111-j, 7112-j , 7121-j and 7122-j. Although the switching instant is identical for the four switch core elements, the precise switching instant of each of the four considered control signals will not be strictly synchronized in view of the fact that transit times may differ slightly from one element to another. In FIG. 21, the non-perfect synchronization of the four signals 7111-j, 7112-j, 7121-j and 7122-j is represented by a certain width (epsilon) in the time transition of the signals. More precisely, the figure shows that the transit time for each control signal can be decomposed into two elements: a first delay t0 that corresponds to the mean delay (identical for the four elements) that is required for the transmission of the signal from the output of the switch core to the input of the OR gate located in the considered first-stage arbiter, e.g. OR gate 7210-j of arbiter 7110-j. The second element of the delay corresponds to the value epsilon that may differ from one arbiter to another and which results in the fact that the four switching instants of the control signals are not strictly synchronous.

The four Queue_Empty control signals 7111-j, 7112-j, 7121-j and 7122-j that are respectively entering the OR gate of the first stage arbiters 7110-j and the OR gate of the first stage arbiter 7120-j, results in the propagation of two Queue_Empty control signals 7131-j and 7132-j which are both transmitted to the two input leads of OR gate 7310-j of second stage arbiter 7130-j. FIG. 21 shows the timing diagrams of control signals 7131-j and 7132-j, and it appears that the switching instant for each of these control signals is delayed with respect to the four control signals 7111-j, 7112-j, 7121-j and 7122-j. As previously, for each second-stage Queue-Empty control signal, the delay is composed of two elements: a first delay t1 which is common for each signal 7131-j and 7132-j and which is the mean delay corresponding to the transit time throughout the OR gate in one first stage element—e.g. OR gate 7210-j—plus the transit time of the bus 7131-j and 7131-j. The second element, epsilon, is the value that explains the difference between the actual switching instants.

The two Queue-Empty control signals 7131-j and 7132-j, which are entered into the OR gate 7310-j of second stage arbiter 7130-j, results in a control signal 7141-j that, as shown in the figure, has a switching instant that is still delayed with respect to the mean switching instant of the two Queue-Empty control signals 7131-j and 7132-j. Similarly to above, the delay comprises a value t2 (+/−epsilon) corresponding to the mean delay of transmission through the OR element.

The Queue-Empty control signal 7141-j is transmitted to the input of AND gate 7320-j so as to be processed by the Phase Alignment circuit 7321-j. The latter processes, in cooperation with AND gate 7320-j, three control requests that may be in contention: the first one is carried by control lead 7141-j and is generated by the SCAL element in order to indicate whether or not the SCAL element is ready to receive the cell which is arriving on bus 7041-j. The second control request is received by AND gate 7320-j and carries a Gate signal that can be advantageously used for priority management purpose. The third request is obviously the Queue_Empty control signal 7141-j that is derived from the first stage arbiter Queue_Empty control signals. The function of Phase Alignment circuit 7321-j is to put the GRANT control signal 7141-j in phase with the Queue_Empty control signal on the same bus 7141-j, since it is clear that the SCAL element which receives the cell and the switch core element that transmits the cell operates at the same frequency, but with a different phase. In other words, Phase Alignment circuit 7321-j provides AND gate 7320-j with two inputs 7141-j and 7324-j which are in phase in order to get on bus 7325-j a pulse that has a width of a cell cycle with a minimum amount of distortion and delay. To achieve this, Phase Alignment circuit uses an over-sampling technique which is based on the MC master clock. Such a technique is well-known in the considered technical field.

As it appears in FIG. 21, when there is an occurrence between the three inputs of the AND gate 7320-j—that is to say that there is simultaneously a request for a GRANT control signal associated with the actual possibility of transmitting a cell to the SCAL element (signal 7141-j) and the AND Gate also being authorized by a positive Gate signal (7322-j)—the AND gate 7320-j can deliver a positive GRANT control signal or a so-called TOKEN control signal that will be distributed to the first-stage arbiters. The TOKEN being generated is transmitted to combinatory logic circuit 7311-j which determines the appropriate direction of propagation of the TOKEN. To achieve this, combinatory circuit 7311-j realizes the logical table that is represented in FIG. 23. In the case where there is an unique request transmitted by one of the two first-stage arbiters, that is to say one among the two Queue_Empty control signals on bus 7131-j and 7132-j, combinatory logic propagates the TOKEN to the direction that issued the request. For instance, should the Queue_Empty control signal of bus 7131-j carry an active signal, then combinatory logic causes the token to be transmitted to the Grant control lead of the same bus 7131-j. In addition, combinatory logic circuit 7311-j produces on lead 7315-j a signal that will be transmitted to the D-input of latch 7314-j so as to memorize the particular direction to which the TOKEN has been transmitted. Phase Acquisition circuit 7312-j, which is also based on an over-sampling technique, generates a clock signal 7317-j having the shape of a pulse, the clock signal being transmitted to the clock input of latch 7314-j. In addition, Phase Acquisition circuit 7312-j produces a second clock signal 7316-j having a phase which is determined from the phase of the TOKEN that is generated on lead 7325-j so that the resulting clock signal—being transmitted to the clock input of latch 7313-j produces a signal at the output of the latch which is in phase with the TOKEN and which indicates to which of the two lines 7131-j and 7132-j the TOKEN was distributed the last time.

As a consequence, when an unique Queue_Empty control signal was active on one of the two busses 7131-j and 7132-j, combinatory logic performs the transmission of the TOKEN that is provided from AND gate 7320-j to the bus that requested the token and, additionally, records this particular bus by means of latch 7313-j.

When the two Queue_Empty control signals on busses 7131-j and 7132-j issue a request, combinatory logic 7311-j uses the contents of latch 7313-j (available on lead 7326-j) in order to determine to which direction the TOKEN was distributed the last time, and, correspondingly, to distribute the current TOKEN to the opposite direction in order to respect the fairness of the TOKEN allocation. This mechanism has the strong advantage of preventing the use of traditional and fixed bandwidth allocation mechanisms that appear quite ineffective in the context of high speed and large switching architectures. Then, the precise destination bus of the token is recorded as described above, by means of two successive storing operations in latches 7314-j and 7313-j under control of Phase Acquisition circuit 7312-j.

The TOKEN is then received by the appropriate first-stage arbiter, e.g. arbiter 7110-j on the GRANT control lead of bus 7131-j, as shown in FIG. 22A. This GRANT signal is then processed by combinatory logic 7211-j by means of a mechanism that appears similar to what is preceding. Therefore, in the case where one unique Queue_Empty control lead issues a request for a TOKEN, combinatory logic 7211 provides the TOKEN to that direction and records this particular direction into latch 7213-j through latch 7214-j under control of Phase Acquisition circuit 7212-j. However, should the two busses 7111-j and 7112-j issue an active Queue_Empty control signal, then combinatory logic 7211 produces the TOKEN to the opposite direction with respect to the bus which actually received the TOKEN the last time. Additionally, this particular bus which is being granted the TOKEN is recorded by means of two successive store operations in latches 7214-j and 7213-j as described above. It therefore appears that one single Token can be delivered to one single switch core element.

As appears in FIG. 21, the delivering of the TOKEN is to be performed sufficiently in advance so that the switch core element that receives it can process the TOKEN, that is to say, before the completion of the cell cycle. In the figure, the latest instant for permitting the correct processing of the Token by the switch core element is represented by the letter S (sampling) that is delayed from the cell cycle beginning T by the equation:

$$\text{Sampling time} = T + T\text{cell} - T\text{process}$$

where T represents the cell cycle beginning, Tcell represents the value of the cell cycle, and Tprocess represents the minimum period that is required by the switch core element for processing the TOKEN.

As a consequence, it appears that the unique switch core element that receives the TOKEN is able to deliver a full cell at the next cell cycle. The cell which is delivered by the appropriate switch core element, for instance element 6100, appears on bus 550-j of the switch core. Bus 550-j transports the cell contents on 8 bits, a clock delimiting the cell boundary on one lead, and an additional signal on one lead for indicating the presence of a cell. The cell is then transmitted to the Communication Circuit 6900-j which converts the information into an analog form for the media that is suited for the communication, be it either optical, or a common cable 7011-j. In addition to this first function, Communication Circuit 6900-j introduces in the flow of data a coding pattern. This coding pattern has the purpose of introducing all the information composing bus 550-j into one unique serial flow of data.

In the present invention one redundant code that is advantageously used, is based on the 8B/10B coding scheme that is disclosed in article "A DC-balanced, partitioned-block, 8B/10B transmission code ", IBM J. Res. Dev., vol.

27, pp. 440–451 by A. X. Widmer and P. A. Franaszek. As known by the skilled artisan, this coding scheme provides, in addition to the effects related to the transmission (DC balanced and high bit density), a redundancy which is used for detecting line errors and creation of special patterns or characters, so-called comma characters, which can be used for synchronization purposes. As explained in this document, the comma character indicates the proper byte boundaries and can be used for instantaneous acquisition or verification of byte synchronization. More particularly, in the absence of errors, the comma does not occur in any other bit positions, neither within characters nor through overlap between characters. Three characters in the 8B/10B code have been recognized as presenting those properties, the K.28.1, K.28.5 and K.28.7 characters.

The use of the 8B/10B code for transport purpose is also addressed in the article "Single-chip 4×500-MBd CMOS Transceiver" in the IEEE Journal of Solid-State Circuits, December 1996, Vol. 31; number 12 by A. X. Widmer et al. This article discloses the use of comma characters in empty cell cycles in order to allow the detection of the cell clock. This results in an absence of overhead since the length of the cell which contains data is not increased with the insertion of the comma synchronization character. This is particularly interesting and advantageous when small cells are processed and switched.

In the present invention, the comma character is advantageously used by the first stage of merging circuit 6810-j, that is to say by first stage circuit 7010-j and first stage circuit 7020-j. Indeed, thanks to the arbitration process that is particularly performed by circuit 7110-j as thoroughly explained above, first stage circuit 7010-j is assured to receive a maximum of one cell coming from one among the two links or physical media 7011-j and 7012-j. The invention is designed so that the four switch core elements operate with the same cell clock. The circuitry to achieve this kind of synchronization is straightforward for the skilled artisan and will not be further described. Therefore, assuming that switch core element 6100 is assigned the delivery of one cell at a period n, and that the switch core element 6110 is assigned the delivery of one cell at the next period n+1 (thanks to the arbitration process described above), the producing of the first element of the two cells is strictly separated by a cell cycle period. In other words, all the busses 550 are strictly synchronous. In addition, the different cables embodying the links 7011-j, 7012-j, 7021-j and 7022-j are chosen so that they have practically a similar length, and the electronic components of the communication circuit 6900 are also designed in order to present a determined controlled transmit delay.

Assuming that T represents an arbitrary origin, and that Tcell is the cell period, the cell boundary for all the busses 550 is given by the following formula:

$$T(k)=T+k\times T\text{cell}.$$

Assuming now that the transit time between bus 550-j and the first stage circuit 7010-j (via element 6900-j and link 7011-j) has a nominal value of Ttransit; the cells arriving at the input of first stage circuit 7010-j is given by the formula:

$$T1(k)=T+kT\text{cell}+T\text{transit}+\text{epsilon1}$$

while the cells arriving at the input of first stage circuit 7020-j comply with the formula:

$$T2(k)=T+kT\text{cell}+T\text{transit}+\text{epsilon2}.$$

The values of epsilon1 and epsilon2 distinguishes the overall transmit times of the cells which strongly depend on the internal characteristics of the components (temperature, power supply etc.) and the actual length of the cables.

The first stage circuit 7010-j operates in accordance with the following algorithm. When the link 7011-j appears to present the comma character—characteristics of empty cell boundary—circuit 7010-j switches its output 7031-j on the link 7012-j. Conversely, if the link 7012-j appears to contain the K.28.5 (for instance) comma character, the circuit 7010-j switches so as to connect its output 7031-j to the link 7011-j. When both input links appear to contain the comma character the circuit 7010-j indifferently switches to one among the two inputs. Since the comma character is ten bits long, a small buffer can be used.

Figure 24:
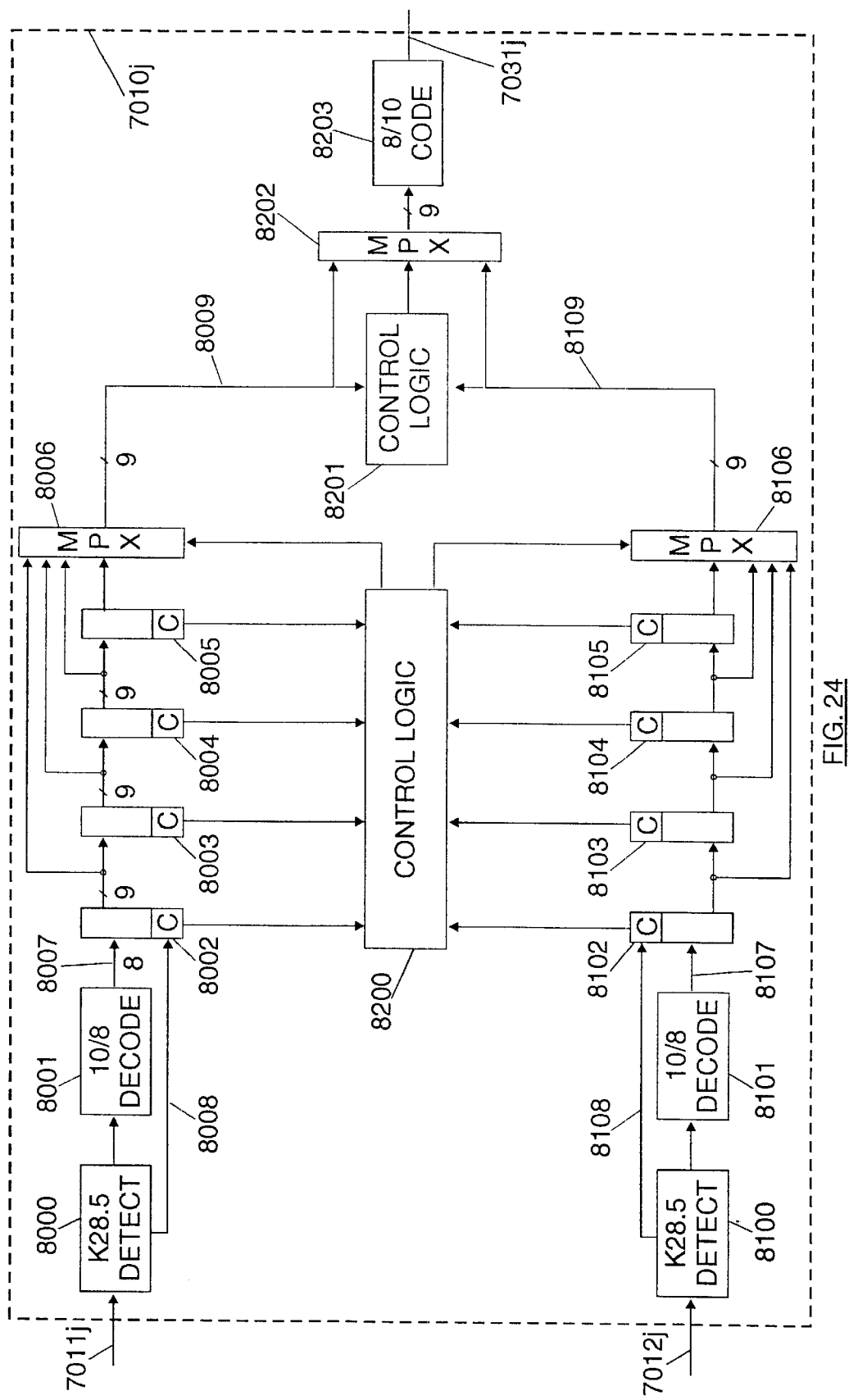
FIG. 24 illustrates the particular structure within first stage circuit 7010-j which, eventually, provides the effective merging of the data cells, taking into account the existence of the comma character and the possible difference in delays for transfer through the two busses 7011-j and 7012-j.

With respect to FIG. 24 there is shown the particular structure within first stage circuit 7010-j which, eventually, provides the effective merging of the data cells, taking into account the existence of the comma character and the possible difference in delays of transfer through the two busses 7011-j and 7012-j. For clarity's sake the whole circuit is illustrated without the use of the reference j. However, it should clearly understood that since the structure being illustrated corresponds to the first stage circuit 7011-j, the elements therein included should logically bear the same reference.

The signal is entered in to a 10B/8B decode circuit 8001 which extracts from the 10 bits of the 10B/8B code, previously aligned by the comma detector 8000, the information byte. The 8 bits of a register 8002 receives the byte that is provided by 10B/8B bit decoder 8001 through bus 8007, and a 9th bit of the same register receives one additional bit on lead 8008 generated by K28.5 detector circuit 8000 which is a pulse that corresponds to the detection of the comma character. The detection of the comma character within detector 8000 is delayed before being entered into register 8002 in order to take into account the transfer time of the bytes through the 10B/8B decode circuit 8001. The information that is contained within register 8002 represents the information byte that is decoded by the circuit 8001, taken on a 10 bit sample; the sample is correctly aligned by the comma detection circuit 8000. The 9the bit indicates whether the 10 bit sample that is considered was carrying the comma character.

The byte is then successively entered into a pipeline circuit that is formed by the three 8-bit registers 8003, 8004 and 8005 that each have a 9th bit for carrying the comma bit. Each register 8002–8005 has an output which is connected to a corresponding input of a multiplexing circuit 8006.

Similarly, the signal that is coming from bus 7012-j is successively entered into comma dectection circuit 8100, 10B/8B bit decoder 8101 and the corresponding pipelined formed of the succession of registers 8102–8105, which registers have an output connected to a corresponding input of a multiplexing circuit 8106.

The comma bits which are stored into the 9th bit of each register 8002–8005 and 8102–8105 are also transmitted to a control circuit 8200, which is used for controlling the two multiplexing circuits 8006 and 8106. The control process that is executed in control circuit 8200 operates as follows:

When two empty cells are respectively presented on input bus 7011-j and 7012-j, a comma character appears in the first 10 bits of the two cells. These two comma characters are detected and a corresponding positive 9th bit appears in the two pipelines 8002–8005 and 8102–8105. Because of the difference of the transfer time throughout the two links 7011-j and 7012-j, the two comma bits will appear at different instants. For instance, at a given instant, the comma bit may well be in latch 8104 (for link 7012-j) , while it is in latch 8002 (for the link 7011-j). This is representative of a two byte delay within the two links.

From this information, control circuit 8200 will control the multiplexing circuits 8006 and 8106 in such a way that multiplexor 8006 is switched to the output of register 8002 while multiplexor 8106 is switched to the output of register 8104. From this instant, the two multiplexors are locked to this position which should not be changed as long as the difference in the transfer times is the same. More generally, control circuit 8200 operates in order to detect the simultaneous appearance of one comma in each pipeline circuit. Obviously, this detection will occur when the second comma bit appears within one of the two pipelines, e.g. pipeline 8002–8005 when link 7011-j appears to be the slowest, or pipeline 8102–8105 when link 7012-j is slower. At the instant of occurrence of the second comma, control circuit 8200 latches the position of the comma within the two pipelines and uses this configuration for controlling, as illustrated above, the two multiplexing circuits 8006 and 8106.

It should be noted that, as mentioned above, the position of the two multiplexors are locked to this position, and an additional mechanism is used for ascertaining that this position remain appropriate. This is done by a continuous checking of the position of the comma bits on the occurrence of the second comma bit within the pipeline circuits.

The cells that are provided at the output of the two multiplexors 8006 and 8106 appear strictly synchronous, byte by byte. An additional multiplexor 8202, controlled by a control logic 8201, is used for providing the merging of the traffic coming from the two synchronous outputs 8009 and 8109 of multiplexors 8006 and 8106. Control logic reads the presence of the 9th bit of both outputs of multiplexors 8006 and 8106 and controls the multiplexor 8202 as follows: when one comma bit is detected at the output of one multiplexor (and one only), control logic 8201 controls multiplexor 8202 so that the latter switches its output to the opposite bus that does not contain the comma bit. When the two input busses of multiplexor 8201 contain the comma bit, the latter multiplexor 8201 is switched to a default position, for instance bus 8009. It should be noted, while the detection of the comma bit is made during one byte, the control logic 8201 controls the mutliplexor 8202 during a full cell period.

The output of multiplexor 8202 is then transmitted to an 8B/10B bit coder 8203 which is used for building the ten bits of the 8B/10B bit code as a function of the byte and the comma character that appear at the output of this multiplexor.

Queuing

This part of the disclosure will describe more thoroughly the queuing process that is involved in the present invention. It has been seen that the switch operates on a ½store while route basis, since a cell which enters through the port 10-i is being stored in the Cell Storage 1 at a location that is defined by the corresponding ASA register that was described with respect to FIGS. 2 and 3 detailing the internal structure of the switching modules. During the temporary storage of the cell into Cell Storage 1, the control section of the switching modules determines the appropriate output destination(s) 11-j. To achieve this, as described above with great detail, the control section determines the particular Output Address Queues 50-0 to 50-7, and 51-0 to 51-7 to store the address of the Cell Storage 1, which address is presently located in the ASA registers 22 and 23.

Unfortunately, this control section might be in certain circumstances unable to operate correctly. This might appear in two different cases: (1) the saturation of the Cell Storage 1 and (2) the saturation of the Output Address Queue 4.

The first case of saturation, that of the Cell Storage 1 occurs when the latter becomes substantially full. In this situation, the Free Address Queue (FAQ) 5 is unable to provide addresses (corresponding to available locations in the Cell Storage 1) to be stored into the appropriate ASA registers so as to achieve the correct processing of the entering cell.

In the second situation of saturation, one particular Output Address Queue becomes unable to store any additional addresses. This obviously happens when too many cells are to be routed to the same output port. In the preferred embodiment of the invention, each Output Address Queue has a set of 32 positions, and the Cell Storage 1 has 128 different locations for the entire set of 16 input ports. This configuration permits temporarily allocating more bandwidth to a given output port, assuming that the total bandwidth of all the ports does not exceed the switch element bandwidth. Should the sixteen input ports provide cells that are to be directed to the same output port, it appears that, in no more than two cell cycles, the Output Address Queue that corresponds to the considered output port becomes overflown.

Therefore, the flow control mechanism of the present invention must be adapted to this particular structure of the switch core element, and more particularly to provide a so-called ½back pressure mechanism which allows the rejection of the incoming cell, and the information of the originating Protocol Engine that that cell cannot be processed by the switch core element. Therefore, the Protocol Engine will have to resend the same cell later at an instant where the switch core will be capable of processing it. However, since the physical length of link 1400 may reach a great value, as well as the data flow rate, it might well happen that the Protocol Engine that receives the back pressure information has already transmitted subsequent cells. Such a situation is obviously not permissible since the cell sequencing must be preserved.

Therefore, the flow control mechanism in accordance with the present invention has to incorporate a specific and well adapted back pressure mechanism that ensures that the cell sequencing will be maintained.

Figure 25:
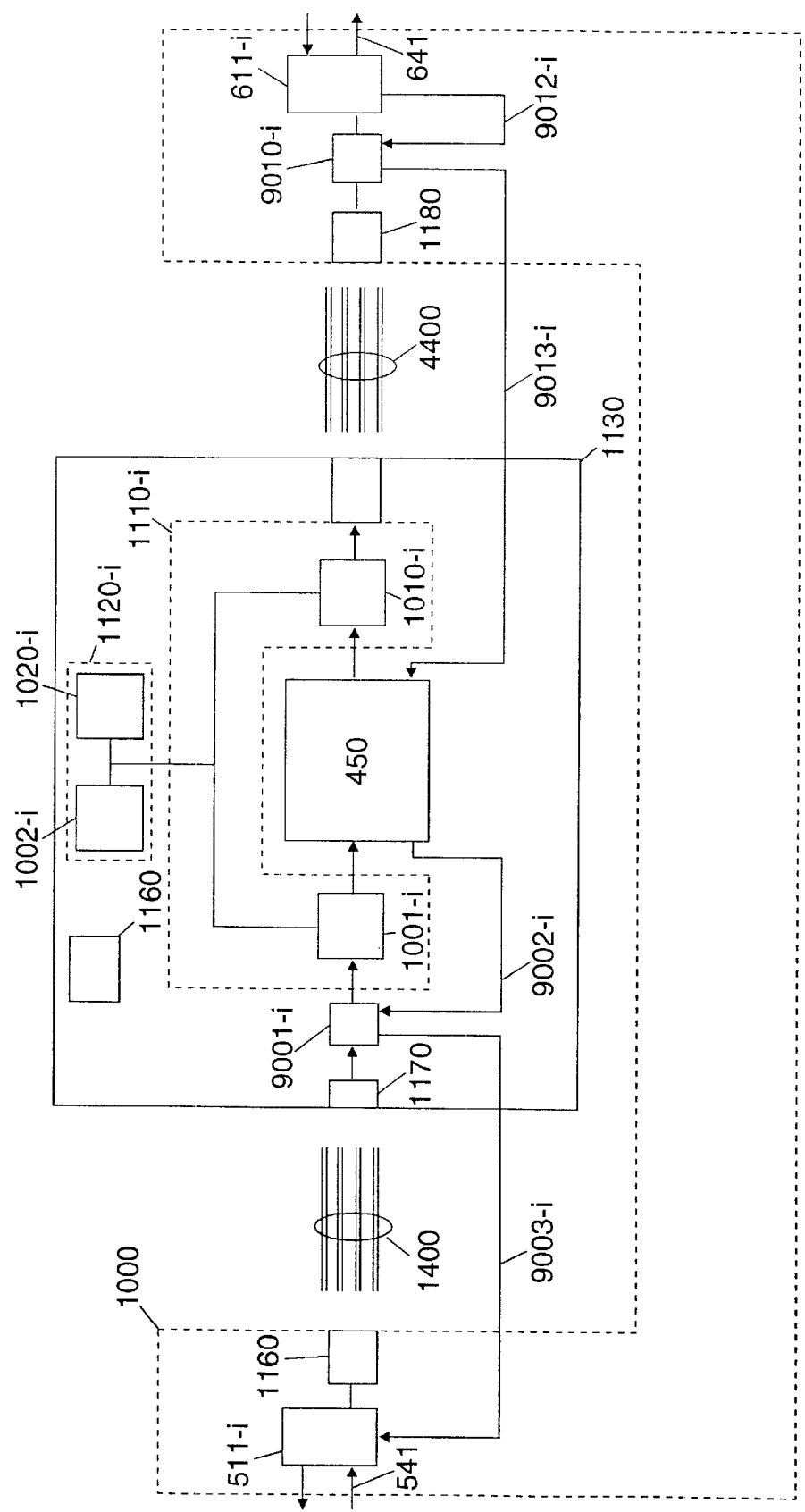
FIG. 25 shows the adaptation of the switch fabric in order to incorporate the contention mechanism in accordance with the present invention.

FIG. 25 shows the modification to be brought to the switch fabric structure of FIG. 11 in order to incorporate the flow control mechanism in accordance with the present invention. The invention takes advantage of two specific circuits 9001-i and 9010-j that are respectively incorporated downstream of deserializer 1170 that belongs to the switch core, and deserializer 1180 that is incorporated into the Switch Core Access Layer (SCAL) 1000. In addition to these two circuits, the flow control mechanism of the present invention is based on the use of control signals that are symbolized in FIG. 25 by the four following references:

BPRi signal 9002-i (Back Pressure Receive) is generated by the switch core structure 450 in order to report a back pressure condition to the circuit 9001i;

FCR-i signal 9003-i (Flow Control Receive) which is transmitted to its corresponding PINT receive circuit 511 for informing the latter that no further cells should be transmitted;

BPX-i signal 9012-i (Back Pressure Transmit) generated by the PINT transmit circuit 611 in order to report to circuit 9010-i a back pressure condition;

FCX-i signal 9013-i (Flow Control Transmit) which is transmitted to the switch core structure 450 for informing the latter that no further cells should be transmitted.

Figure 26:
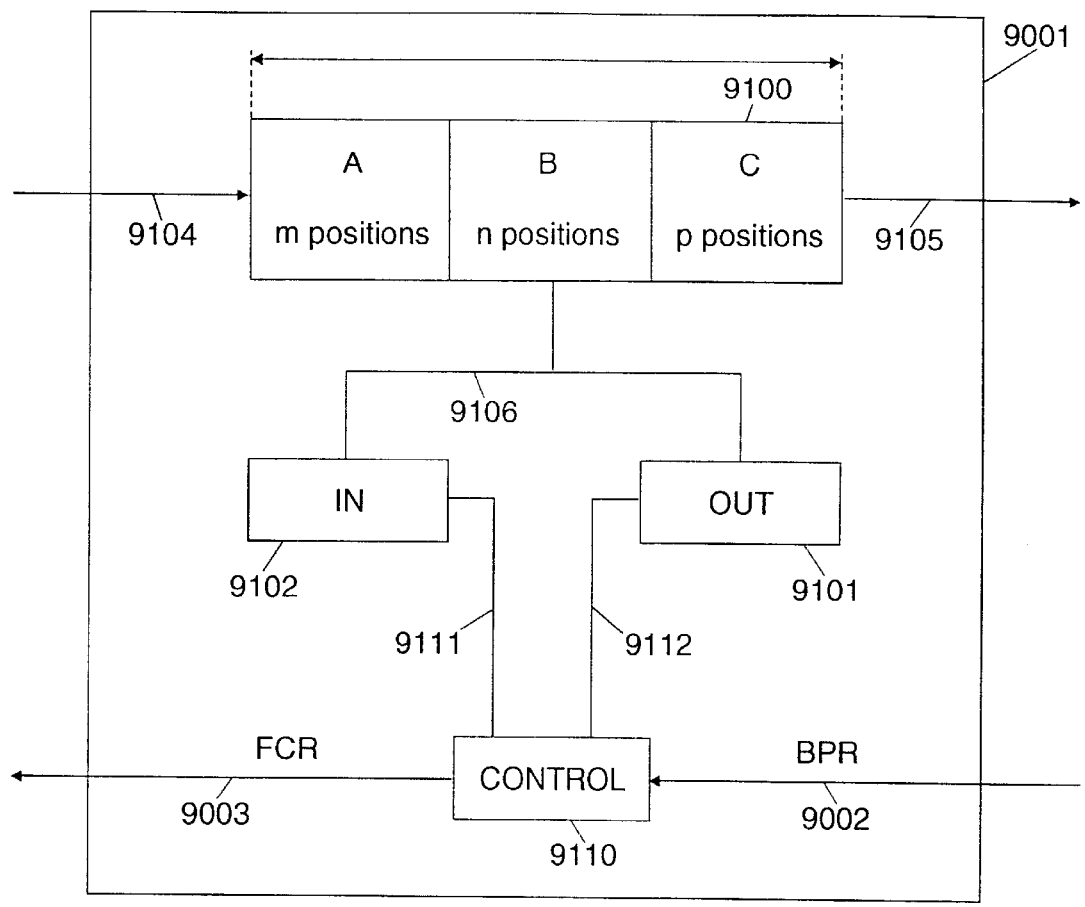
FIG. 26 illustrates the particular structure of circuit 9001.

With respect to FIG. 26, there is shown the particular structure of circuit 9001 which is based on the use of a cell buffer 9100 that is divided in three areas, respectively area A, area B and area C as illustrated in the figure. This memory receives the data that are generated by deserializer 1170 through a data-in bus 9104, which data is then provided to Routing Control Device 1001-i via a bus 9105. In addition an IN pointer 9102 and an OUT pointer 9101 are used for controlling the address bus 9106 of cell buffer 9100 which is represented in FIG. 26. When a cell is entered in cell buffer 9100 through bus 9104, the IN pointer is incremented by one and, conversely, when a cell is extracted from the cell buffer 9100, it is the OUT pointer that is incremented. The two IN and OUT pointers are designed to operate in the ½wrap around mode and when the cell buffer becomes empty, both carry the same value. An additional control circuit 9110 receives the two values that are carried by the IN and OUT pointers (via busses 9111 and 9112) as well as the Back Pressure (BPR) signal on lead 9002, and produces a Flow Control Receive (FCR) signal 9003, as well as control signals for the incrementation process within IN and OUT pointers.

During the normal operation of the switching structure, when there is no back pressure condition, the OUT pointer follow the IN pointer with a maximum offset of 1. Indeed, when the flow is continuous, the offset is 1 while, when the input flow stops, the offset is reduced to zero. Conversely, when the system falls into back pressure condition, that is to say when either the Cell Storage 1 or the Output Adress Queue (4) appears to be saturated, control circuit 9110 stops the incrementation of the OUT pointer 9101 so that the cell that is being sent (but rejected) can be sent again at the next cell cycle. Obviously, if the back pressure condition tends to rapidly disappear—causing the switching of the BPR signal to the opposite state—control circuit 9110 again authorizes the incrementation of the OUT pointer 9101 so that the next cell can be transmitted to the switch core. However, should the back pressure condition tend to continue, and should new cells appear on the input bus 9104 of circuit 9001, the difference between the IN pointer and the OUT pointer will tend to increase. The inventive control circuit uses the value of the difference in the two IN and OUT pointers in order to generate FCR signals on lead 9003 that will be transmitted to the PINT element 511. However, the control circuit must take into account the delay of propagation of the cells through the serializers 1160, the link 1400 and the deserializer 1170, as well as the delay in propagation of the FCR signal between the control circuit 9110 and the PINT 511 (going in the reverse direction).

Indeed, since the switch may operate at a speed of about 1.6 Gigabit/second, the cell cycle is about 300 nanoseconds. The transport of one full cell over sixty meters will thus require about one cell cycle, that is to say 5 nanoseconds per meter). When the PINT element decides to stop the transmission of a cell, the preceding cells (at least two when the distance between the SCAL 1000 and the switch core 1130 extends over 100 meters) might well not be received by the buffer 9100 and will still be transported over the link 1400. This effect is still increased by the transmit time required by serializer 1160 and deserializer 1170. In addition to this, the transmission of the FCR signal from the control circuit 9110 to the PINT element 511 still requires a transmission time of about one or more cell cycles.

As a conclusion, when control circuit 9110 decides to generate FCRi control signal to PINT circuit 511, the cell buffer 9100 must be able to store, from that instant, a set of m cells comprising, first the cells that are being conveyed through the link 1400 (plus the set of serializer/deserializer) and which were just generated by the PINT circuit 511, and, second, the cells that the PINT will further produce during the time of propagation of the FCR signal from the control circuit 9110 to the PINT circuit itself.

The cell buffer 9100 is particularly arranged in order to take into account this requirement, with a first area which can store a set of m cells. Practically, for links of about 100 meters, m is fixed to a value of four. Generally speaking, control section 9110 produces a FCR control signal to be transmitted to the PINT circuit 511 as soon as the difference between the IN pointer and the OUT pointer reaches a value that is equal to X−m, where m represents the size of the area A and X represents the total size of the cell buffer 9100.

Cell buffer 9100 further comprises an area C that is arranged so as to store the number of cells that may be statistically rejected because of the Cell Storage saturation. Indeed, it should be noted that the saturation of the Cell Storage 1 is a phenomenon quite different from that of the Output Address Queue, particularly as the former may statistically rapidly disappear. This is due to the fact that, at every cell cycle, the Cell Storage can deliver 16 locations. On the contrary, the saturation of the OAQ 4 is likely to continue much longer since, at every cell cycle, only one available position can be attained. Therefore, the area C of cell buffer 9100 comprises p additional positions in order to permit local handling of the cell process in case of Cell Storage saturation.

At last, the cell buffer size is increased by a value corresponding to an additional area B (n further positions) that is intended to prevent some underrun situations and which value is fixed so as to comply with the following relation:

$$n+p>m.$$

When a FCR signal is issued by the control circuit 9110 (causing the IN pointer to be frozen), the difference between the two IN and OUT pointers is between X−m and X. When the back pressure signal on lead BPRi 9002 disappears, the OUT pointer will be incremented again in accordance with the cell retrieve of the buffer 9100 and, consequently, the difference between the two pointers will tend to decrease since the IN pointer is set to a frozen state. The inventive control circuit takes advantage of a threshold mechanism in the deactivation process of the FCR signal. Indeed, this deactivation is only permitted when the difference between the values reached by the two IN and OUT pointers goes below X−m. When control section 9110 detects that sufficient cells are being retrieved from the cell buffer 9100 in order to permit release of area A, control section 9110 can deactivate FCR signal 9003. Because of the delay of propagation that was previously evoked, the first cell that the PINT element will transmit again will arrive at the input of the cell buffer 9100 only after a delay corresponding to m cell cycles. Therefore, it appears necessary, in order to prevent the cell buffer becoming empty before receiving that first cell, to arrange a third area B that comprises at least n cell positions, with n+p being greater than m.

As a conclusion, the minimum size of the cell buffer should be m+n+p so as to permit smooth operating conditions, with m corresponding to the number of cells being generated by the PINT element during the propagation of the FCR control signal as well as the propagation through the link 1400; p corresponding to the handling process for Cell Storage 1 saturation, and n being fixed to a value that is greater than m−p.

Figure 27:
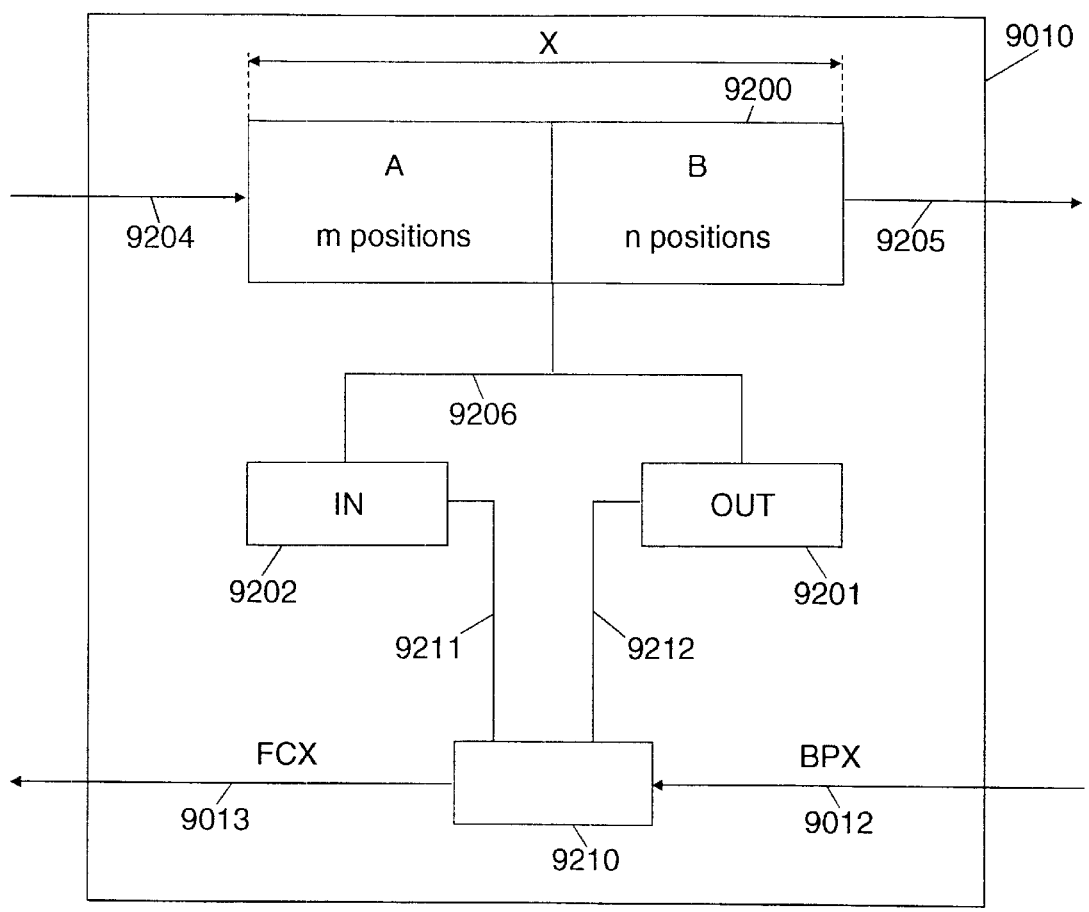
FIG. 27 shows the structure of circuit 9010.

A similar circuit 9010 is introduced between deserializer 1180 and the transmit part of the PINT circuit 611 as illustrated in FIG. 27. This circuit 9010 is based on a cell buffer 9200 that is arranged in two areas, respectively area A and area B. This memory receives the data that is generated by deserializer 1180 through a data_in bus 9204, which data is then provided to PINT 611 via a bus 9205. In addition two IN and OUT pointers 9202 and 9201 are used for controlling the address bus 9206 of cell buffer 9200 which is represented in FIG. 27. When a cell is entered in cell buffer 9200, the IN pointer is incremented by one, and, conversely, when a cell is extracted, the OUT pointer is incremented. Similarly as described above for circuit 9001, the two pointers operate in the ½wrap around mode and when the cell buffer is empty the two pointers carry the same value. An additional control circuit 9210 receives the two values carried by IN and OUT pointers, as well as the Back Pressure Transmit (BPX) signal on lead 9012, and produces a Flow Control Transmit (FCX) signal 9013, as well as control signals for the incrementation of the IN and OUT pointers.

During normal operation of the switching structure, when there is no back pressure condition, the OUT pointer follows the IN pointer with a maximum offset of 1. Indeed, when the flow is continuous, the offset is permanently fixed to one; when the input flow stops—revealing a saturation of the queues 801–804 of PINT transmit part 611—control circuit 9210 stops the incrementation of the OUT pointer 9201 so that the cell that is being sent (but rejected) can be sent again at the next cell cycle. Obviously, if the back pressure tends to rapidly disappear—causing the switching of the BPX signal to the opposite state—control circuit 9210 again authorizes the incrementation of the OUT pointer 9201. However, should the back pressure condition tend to persist, and should new cells appear at the input bus 9204 of circuit 9010, the difference between the IN pointer and the OUT pointer will tend to increase. This difference is used by control circuit 9210 in order to generate FCX signals on lead 9013 that will be transmitted to the switch core element 450. However, as above, the control circuit must take into account the delay in propagation of the FCX signal between the control circuit 9210 and the switch core 450, which correspond to the transport of a set of m cells.

Additionally, cell buffer 9200 is arranged in order to include a second area B that consists of n positions, with n>m in order to prevent some underrun situations. The operation of control section 9210 appears to be quite similar to that of control section 9110 that was described above.

In addition to the two circuits 9001 and 9010, the flow control mechanism takes advantage of two signaling mechanisms between the Protocol Engines and their connected corresponding PINT elements 511 and 611. The first signaling is performed between PINT 511 and its attached Protocol Engine to report a saturation condition of the PINT internal queue, in order to stop the reception of the data on R-data lead 541. Similarly, a second signaling protocol is involved between PINT 611 at its associated Protocol Engine so that the latter can inform the PINT 611 of the occurrence of a saturation condition and to stop the transmission of data on lead 641.

With the effective arrangement of all the queuing mechanisms that are involved in the present invention, it appears that bursts in data traffic can be advantageously distributed and smoothly managed at every level of the switching architecture, thus achieving an efficient use of the cell buffering resources.

The effectiveness of the queuing mechanism can be strongly improved by means of the incorporation of specific processing based on the use of the Switch Routing Header (SRH) and the different queues that form the queuing structure of the switching architecture.

Indeed, it has been seen that, when a cell arrives on lead 541 at the input of the PINT receive part (FIG. 25), it is passed through a first queuing level in the PINT circuit 511-i, the latter being embodied in the form of the set of FIFO elements 701–704 as shown in FIG. 8 of the present application. It should be noted that the first queuing level has some limited capacity since it appears closely dependent on the size of the FIFO, and more generally by the limitations of the particular technology that is used for embodying the PINT elements.

A second level of queuing is implemented within circuit 9001, in the form of cell buffer storage 9100, the capacity of which is closely dependent on the size of the memory being used. A third level of queuing is provided by the Cell Storage 1 that is included in each switching module and which is used for storing the received cells before they are routed as explained above. However, as mentioned above, a further limitation exists which depends on the size of the Output Address Queue 4 which is for preventing the shared Cell Storage from being monopolized by a single overloaded output port.

A fourth level of queuing is apparent in circuit 9010 under the form of the cell buffer 9200 which is also dependent on the actual technology involved and, finally, the fifth level of queuing is located in the transmit part of the PINT element 611 in the form of the FIFO queues 801–804 that are shown in FIG. 9.

Such a combination of different queuing levels throughout the distributed switching architecture obviously permits the handling of many saturation conditions which inevitably tend to develop when the load on the switch significantly increases. In this situation, the data flow might unfortunately result in a temporary head of line blocking which is detrimental to the overall performance of the switching architecture.

It has been discovered that the overall behavior of the switching architecture can be strongly improved by an additional mechanism that takes advantage of both the Switch Routing Header (SRH) that is incorporated into the Protocol Adapter or Protocol Engine, and the different queuing levels.

In accordance with the present invention, an enhanced flow control mechanism is provided which involves the use of a specific bit, a so-called ½flow control inhibit bit that is carried by the Switch Routing Header incorporated in the cell by the Protocol Engine.

At the first queuing level, that is to say within PINT 511, a specific circuit decodes the value carried on bus 541 of FIG. 8 in order to detect the occurrence of the ½flow control inhibit bit contained inside the SRH. When the queue which is composed of the four FIFOs of that PINT 511 enters into a saturation condition, ie, when the load (filling) of the FIFOs reaches a predetermined value, the loading of the incoming cell within the FIFO is inhibited. This is obviously performed by techniques that are well known to the skilled artisan.

Similarly, at the second queuing level, when the appearance of the ½flow control inhibit bit within the SRH of an incoming cell on lead 9104 is detected, and when the control circuit 9110 detects that the cell buffer 9100 has reached the filling level in the area A, control circuit 9110 maintain the contents of the IN_pointer at its current value so that the loading of the incoming cell inside the cell buffer is also inhibited.

At the third queuing level, the detection of the ½flow control inhibit bit is processed at the level of the Output Address Queue 4. Indeed, the incoming cell is being rejected, as in the above described back pressure mechanism, but, in contrast to that mechanism, no report or information is sent back to the Protocol Engine to inform the Protocol Engine that the cell has been rejected. Consequently, the Protocol Engine will not send the rejected cell.

The processing of the ½flow control inhibit bit in the fourth and fifth queuing level are respectively similar to the processing that was previously described with respect to the second and first queuing levels. The successive processing steps of the ½flow control inhibit bit provide the significant advantage of eliminating the cells at a location which is overloaded in order to ascertain normal routing conditions in most cases. In the Protocol Engine, the setting of the flow control inhibit bit takes advantage of a particular and useful mechanism which is based on the discrimination of the cells in three different categories. A first category is one for which the loss of data must be avoided in any case, and in which case the Protocol Engine will always switch off the ½flow control inhibit bit. The second category characterizes the cells for which the loss is allowed, and, in this case, the ½flow control inhibit bit will always be set by the Protocol Engine. Finally, a third category is arranged for cells which the Protocol Engine decides to switch off the ½flow control inhibit bit insofar as its own queuing resources do not fall below a predetermined value. When this situation occurs, the Protocol Engine switches off the ½flow control inhibit bit.

It should be noted that this mechanism provides some significant advantages particularly when using cells that are concatenated in order to build some long messages. Indeed, for this kind of cell, the loss of one cell inevitably results in the loss of the entire message including that cell. Therefore, in accordance with the present invention, the Protocol Engine is given the capability to decide which cells will be lost, so that, insofar as some resources remain available, the long messages can still be routed without any loss. Only when the queuing resources in the Protocol Engine are substantially reduced, the ½flow control inhibit bit is set to one, thus resulting in the possible loss of entire messages.

Generally speaking the Protocol Engine is able to provide the appropriate ½flow control inhibit bit since, in accordance with background information well known to the skilled artisan, the Protocol Engine is aware of the characteristics of the different connections being established, as shown in FIGS. 16 and 17, and particularly the quality of service that is associated with each connection.

In-band Flow Control Mechanism

As mentioned above with respect to the back pressure mechanism described in reference to FIGS. 25–27, the switch core 1130 has to convey a Flow Control Receive (FCR) information that is theoretically transported on lead 9003-i in order to inform the receive part of the PINT element of the SCAL that no further cell should be emitted. As it clearly appears on the FIG. 25, the direction of transmission of the Flow Control Receive (FCR) signal is reverse to that of the normal data flow flowing on communication link 1400. On the other hand, the SCAL 1000 has to convey to switch core 1130 a Flow Control Transmit (FCX) information, transmitted on lead 9013-i, which has a reverse direction with respect to that of the normal data flow flowing from the switch core to the SCAL.

Therefore it appears that these control signals can not be directly incorporated into the data flow and their transport would normally require additional control leads. This invention provides this transport with such additional control leads.

With the teaching of the present invention, both the FCR and the FCX signals can be conveyed in the reverse direction with respect to the normal data flow.

Figure 28:
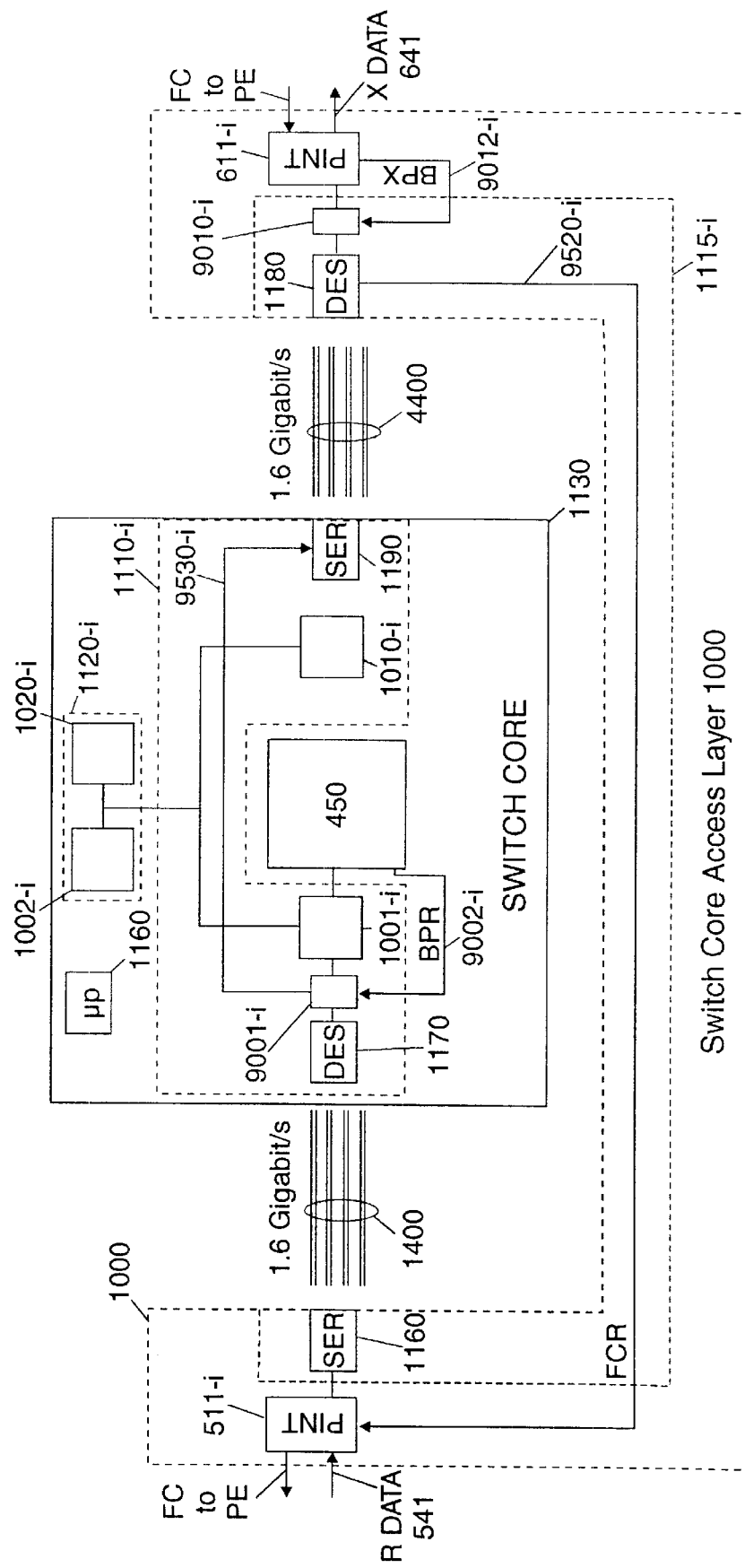
FIGS. 28 and 29 illustrate the embodiment of the flow control mechanism inside the data flow, carrying out the transport of both the FCR and FCX, respectively, upward and downward without requiring any additional wires or physical leads.

FIG. 28 shows the basic functional elements used in the switch core 1130, including the switching element 450 and a set of 16 individual modules 1110-i (with i=1to 16), of which only one module is being represented. Each module comprises the routing control devices 1001-i and 1010-i that respectively update, upstream and downstream with respect to the switching structure 450, the value of the bitmap field in accordance with data extracted from the memory 1120-i that contains the two tables 1002-i and 1020-i. In addition each module 1110-i includes a serializer 1190 that codes the cells in accordance with 8B/10B coding, and a deserializer 1170 that decodes the cells in accordance with the same format. Further, the circuit 9001-i generates the FCR control signal that is to be used for performing the flow control management, which information is to be transmitted upstream with respect to the normal data flow.

In accordance with the present invention, this upstream flow control transmission is achieved by means of three successive steps. In the first step, a direct signal is transmitted from the element 9001-i to the serializer 1190 that belongs to the same module 1110-i. This direct transmission is straitghforward since the two components belong to the same local module. In the second step, the serializer 1190 transmits downstream a corresponding FCR flow control information through the 1.6 Gigabits serialized channel 4400, in accordance with the teaching of the copending application FR897085. Therefore, it appears that during every cell cycle, FCR information can be transmitted to the remote deserializer 1180. Finally, in the third step, deserializer 1180 which appears to belong to the same remote physical entity as that of PINT 511-i, can transmit a corresponding information to that PINT element in order to inform the PINT element of the occurrence of the FCR information generated by element 9001-i. In FIG. 28, this transmission involved in the third step uses the control lead 9520-i. Obviously, the transmission of the FCR control information from 9001-i to PINT 511-i upstream involves a delay that will depend on the length of the physical link 4400, as well as the transit time of the serializer 1190 and deserializer 1180. However, it should be noted that this delay may be well compensated by means of the buffers that are used in circuit 9001-i.

Figure 29:
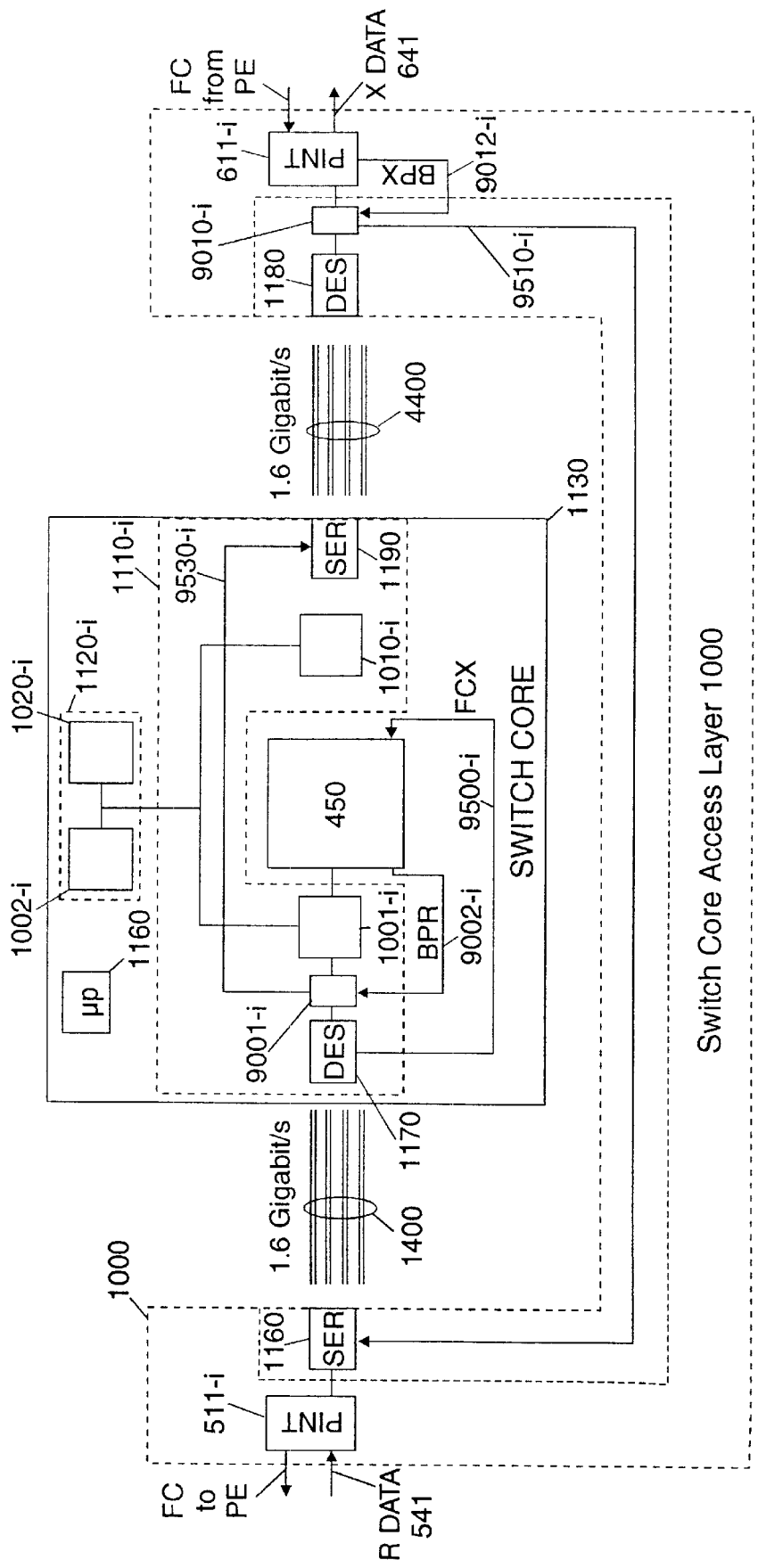

With respect to FIG. 29 there is shown the practical realization in accordance with the present invention of the upstream transport of the FCX control information generated by the SCAL 1000 and transmitted to switch core 1130. Similarly as above, this transmission is achieved by means of three distinct steps that fully cooperate in order to provide an upstream transport of the control information. In the first step, circuit 9010-i generates a FCX flow control information in response to a preliminary back pressure transmit signal received from PINT 611-i. This FCX flow control information takes the route of a direct transport, illustrated in FIG. 29 by a lead referenced 9510-i, to the serializer 1160 that appears to be located in the same physical module. In the second step, the serializer incorporates corresponding information into the control channel created into the 8B/10B coded data flow in accordance with the teaching of the copending application FR897085. In the third step, the deserializer 1170 being remote to serializer 1160 receives that flow control information and generates a corresponding control signal, represented by lead 9500-i in the figure, which can be easily transmitted to switching element 450 since they belong to the same physical entity (even if in different modules). Therefore, it appears that the flow control information can be conveyed from SCAL 1000 to switch core 1130 in a direction that is reverse to the normal data flow in which the flow control information is embedded.

Now will be described how the invention achieves the reverse direction for the flow control information when a complex switching architecture is involved, particularly when using port expansion.

Figure 30:
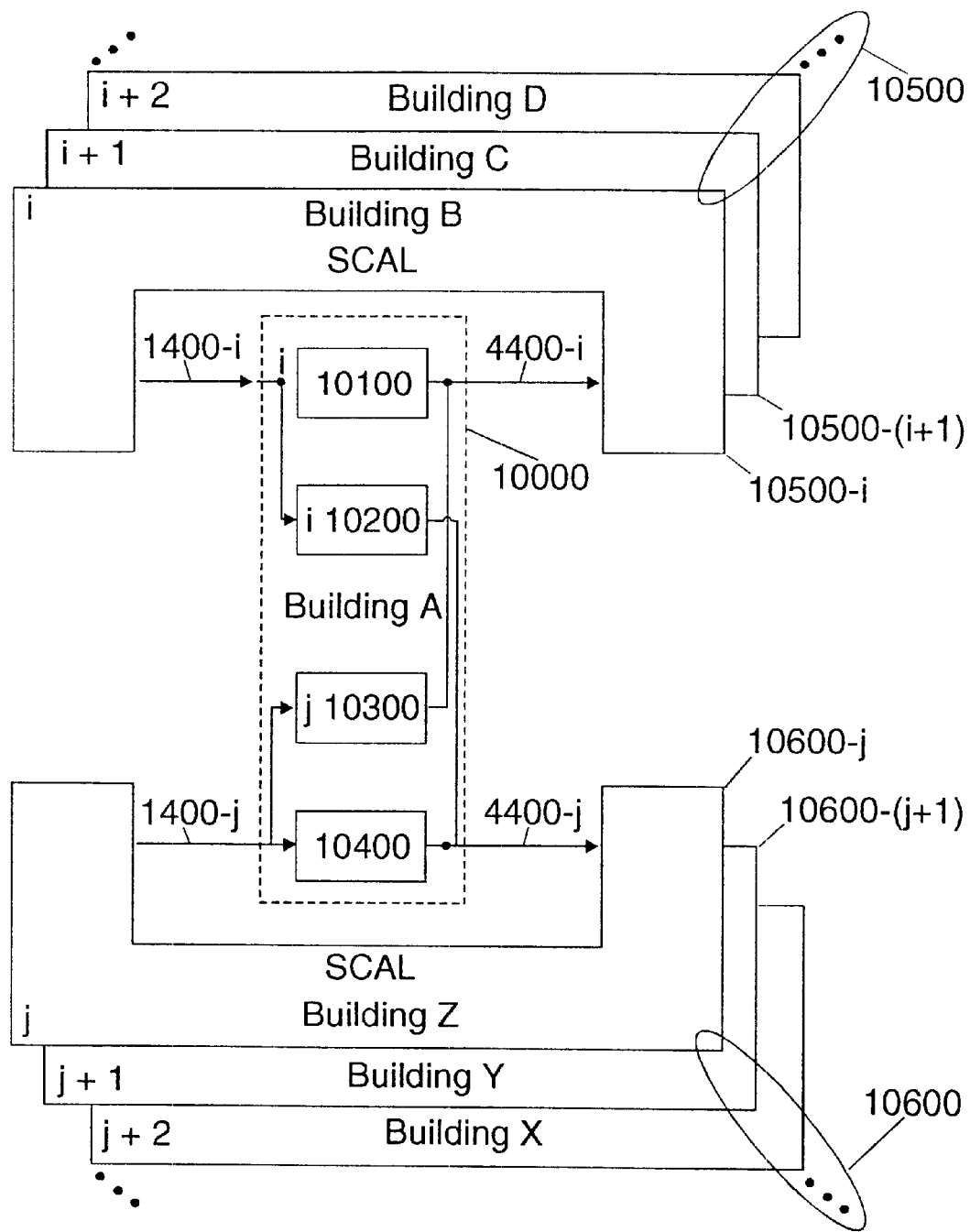
FIG. 30 illustrates the incorporation of the invention in a port expansion architecture having an expansion coefficient of two.

FIG. 30 illustrates the incorporation of the invention in a port expansion architecture having an expansion coefficient of two in order to simplify the explanation, and thus permitting to multiply by two the number of ports. The architecture is based on a set of four elementary switch cores 10100, 10200, 10300 and 10400, that are all identical to switch core 1130 of FIG. 28. As represented in the figure, the four cores are all located in the same physical entity, represented by dotted line 10000 which is assumed to be located in building A. In this architecture, the number of ports can be multiplied by a factor of two, which allows the attachment of two distinct sets of 16 SCAL elements each: set 10500 and set 10600. Set 10500 comprises sixteen SCALs among which only three are illustrated for clarity's sake: SCAL 10500-i, SCAL 10500-(i+1) and SCAL 10500 (i+2). In accordance with the port expansion architecture of the invention, SCAL 10500-i is attached to the input port i of switch core elements 10100 and 10200 via link 1400-i and appropriate fan-out circuits (the latter not being illustrated in this figure); and is attached to the two output ports i of switch core elements 10100 and 10300 via link 4400-i and appropriate but not shown fan-in circuits. Similarly, SCAL 10500-(i+1) is attached to the input port i+1 of switch core elements 10100 and 10200 via link 1400-(i+1) (and appropriate but not shown fan-out circuits) and is attached to the output port i+1of switch core elements 10100 and 10300 via link 4400-(i+1).

Set 10600 comprises sixteen SCALs among which only three are illustrated: SCAL 10600-j, SCAL 10600-(j+1), SCAL 10600-(j+2). As above, SCAL 10600-j is attached to the input port j of switch core elements 10300 and 10400 via link 1400-j (and appropriate fan-out circuits) as well as the output port j of switch core elements 10200 and 10400 (and appropriate fan-in circuits).

Assuming that SCAL 10600-j located in building Z, for instance, wishes to transmit a FCX flow control transmit signal to the switch core 10000, the flow control transmit information must be transmitted to the two elementary switch cores 10200 and 10400 in order to inform them of the occurrence of a local saturation in the SCAL 10600-j. With the mechanism that was described above it appears that only the switch core 10400 can be informed of this saturation since the FCX flow control signal would arrive to both cores 10300 and 10400 through the link 1400-j. However, it is clearly shown that elementary switch core 10200—that is likely to provide cells to the saturated SCAL 10600-j— cannot be informed of this situation.

Figure 31:
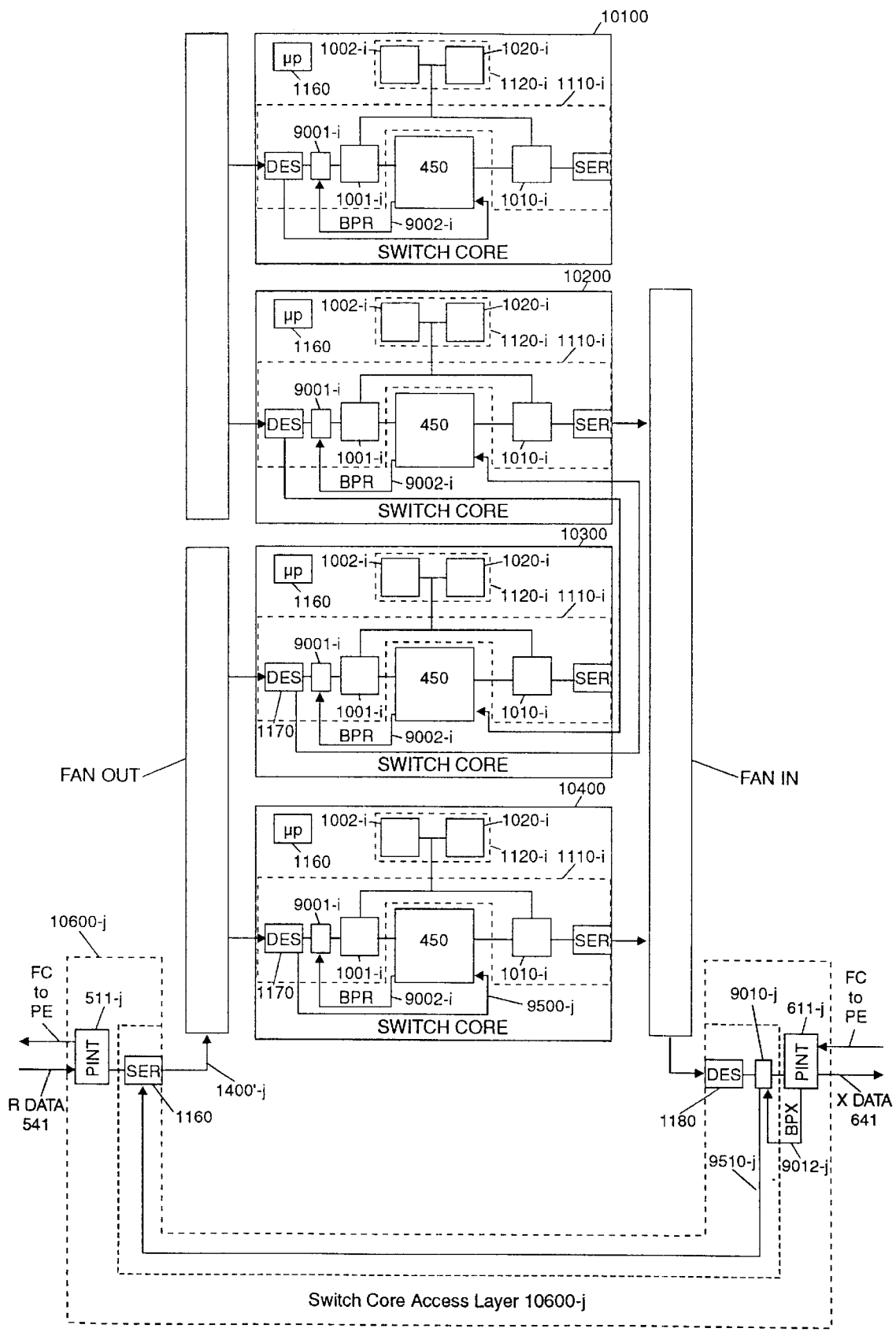
FIG. 31 is an expanded view of the internal structure of the switch cores 10100 and 10400, and the appropriate fan-in and fan-out circuits, showing the PINT to switch flow control.

In accordance with the present invention, this information is provided to the switch core 10200 by means of an improved and advantageous mechanism that will now be described in reference to FIG. 31. FIG. 31 is an expanded view, showing the internal structure of the switch cores 10100–10400 and the appropriate fan-out and fan-in circuits, which clarifies how the flow control transmit information can be provided to the switch core 10300 through the SCAL 10600-j. To achieve this, a set of three steps is involved. In the first step, the circuit 9010-j of SCAL 10600-j detects the occurrence of the back pressure transmit signal coming from the associated PINT circuit 611-j, and generates a corresponding internal signal on a lead 9510-j that is transmitted to the serializer 1160 that is located on the same SCAL circuit 10600-j. In the second step, the serializer transmits the corresponding information into the coded 8B/10B signal that is conveyed through link 1400-j, and transmitted (via the represent fan-out circuits) to the deserializers 1170 that are contained in each of switch cores 10300 and 10400. In switch core 10400, the switching structure 450 is made aware of the occurrence of the flow control transmit information as explained above, by means of lead 9500-j. In switch core 10300, the same information is detected by the deserializer 1170 that is therein included and a corresponding control information can be directly transmitted to the switch core 10200 which is collocated in the same physical entity. Therefore, the switching structure 450 of core 10200 can be informed of the saturation occurring in SCAL 10600-j.

Again, with regard to FIG. 30, it appears that the flow control receive information requires a specific arrangement in order to be transmitted upstream. Indeed, it might well occur, for instance, that switch core 10000 becomes saturated with respect to its input port j—corresponding to SCAL 10600-j. Obviously, the saturation of the general core 10000 may result from the individual saturation of either the core 10300 or 10400 since only these two cores are attached to the SCAL j and receive data cells from the latter.

Assuming that the saturation comes from the core 10400, it appears that the mechanism that was described with respect to FIG. 28 permits the upstream transmission of the FCR flow control receive information. Indeed, in this case, circuit 9001-j of core 10400 detects the saturation condition that occurs internally in the core. Then, in a first step, a corresponding control signal is propagated on a lead 9530-j to the serializer 1190-j, and the latter inserts this information into the data flow that can be propagated to the remote deserializer 1180-j via the link 4400-j via a fan-in circuit 11010-j in a second step. The deserializer 1180-j extracts this control information and generates, in a third step, corresponding information that can be locally transmitted on a physical lead 9520-j to the PINT circuit 511-j in order to inform the PINT circuit that no additional cells can be transmitted.

Considering now the saturation condition occurring in the core 10300, FIG. 30 shows that the saturation management is much complex since the output port j that corresponding to the input port j which is becoming saturated is not actually connected to the same SCAL that includes the PINT 511-j that produces the cells that are conveyed to the saturated input port of core 10300. Indeed, it appears that the output port j of core 10300 is connected to the SCAL that is in the set 10500, but with the same index order. Therefore, if the PINT 511-5 that is in SCAL 10600-5 for instance is to be stopped, because of the local saturation of core 10300 at its input port number 5, then the flow control information will be transported via the output port number 05 to the corresponding SCAL of the same order, that is to say SCAL 10500-5 that belong to the opposite set of SCALs. Therefore the invention provides a mechanism which permits this information to return to the SCAL that corresponds to the PINT which must be stopped, ie, SCAL 10600-5.

Figure 32:
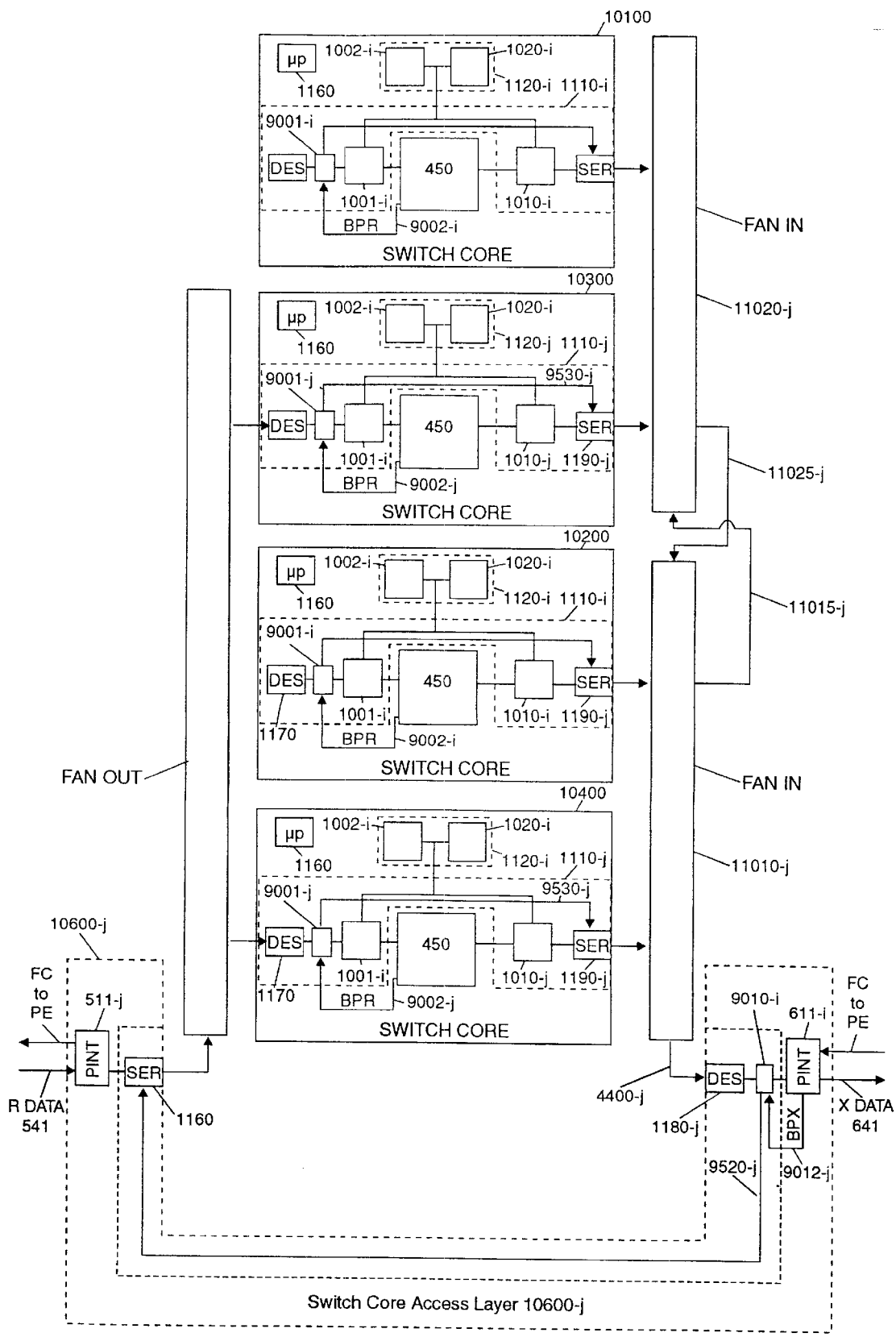
FIG. 32 illustrates the switch to PINT flow control.

This result is achieved, in accordance with the present invention, by means of an effective four-step process, and two improved fan-in circuits 11010-j and 11020-j as described in FIG. 32. In a first step, circuit 9001-j of switch core 10300 detects the occurrence of the saturation condition and correspondingly transmits a control signal to the serializer 1190-j that is located in the same module via lead 9530-j. In a second step, serializer 1190-j incorporates this information in the 8B/10B coding of the cell, the cell comprising the data that will be transmitted via link 4400 to the SCAL 10500-j. In accordance with the teaching of the present invention, this flow control information that is coded into the 8B/10B coding of the cell arrives in fan-in circuit 11020-05 (if the input port 05 is saturated), and that fan-in circuit extracts the corresponding information in order to generate a corresponding flow control receive information that can be transported, via appropriate local wiring 11025-05, to fan-in circuit 11010-j in a third step. In a fourth step, fan-in circuit 11010-05 (if j is equal to 05) combines the flow control information that is received from fan-in circuit 11020-05 with that which could result from the saturation condition of core 10400. Therefore, this information can be remotely transported on physical media 4400'-05 to the deserializer 1180-05 that is located in the SCAL 10600-05, and to which the PINT circuit 511-05 belongs which can then be informed of the fact that no additional data cells can be received by the core 10000.

Therefore, by means of the effective association of the SCALs that belong to the two sets 10500 and 10600, it appears that in any case, the flow control information can be transmitted upstream. The only condition existing is that the fan-in circuit 11010-j and 11020-j, for a same value of j, must be located in the same entity in order to reduce the length of the control lead 11025-j.

Figure 33:
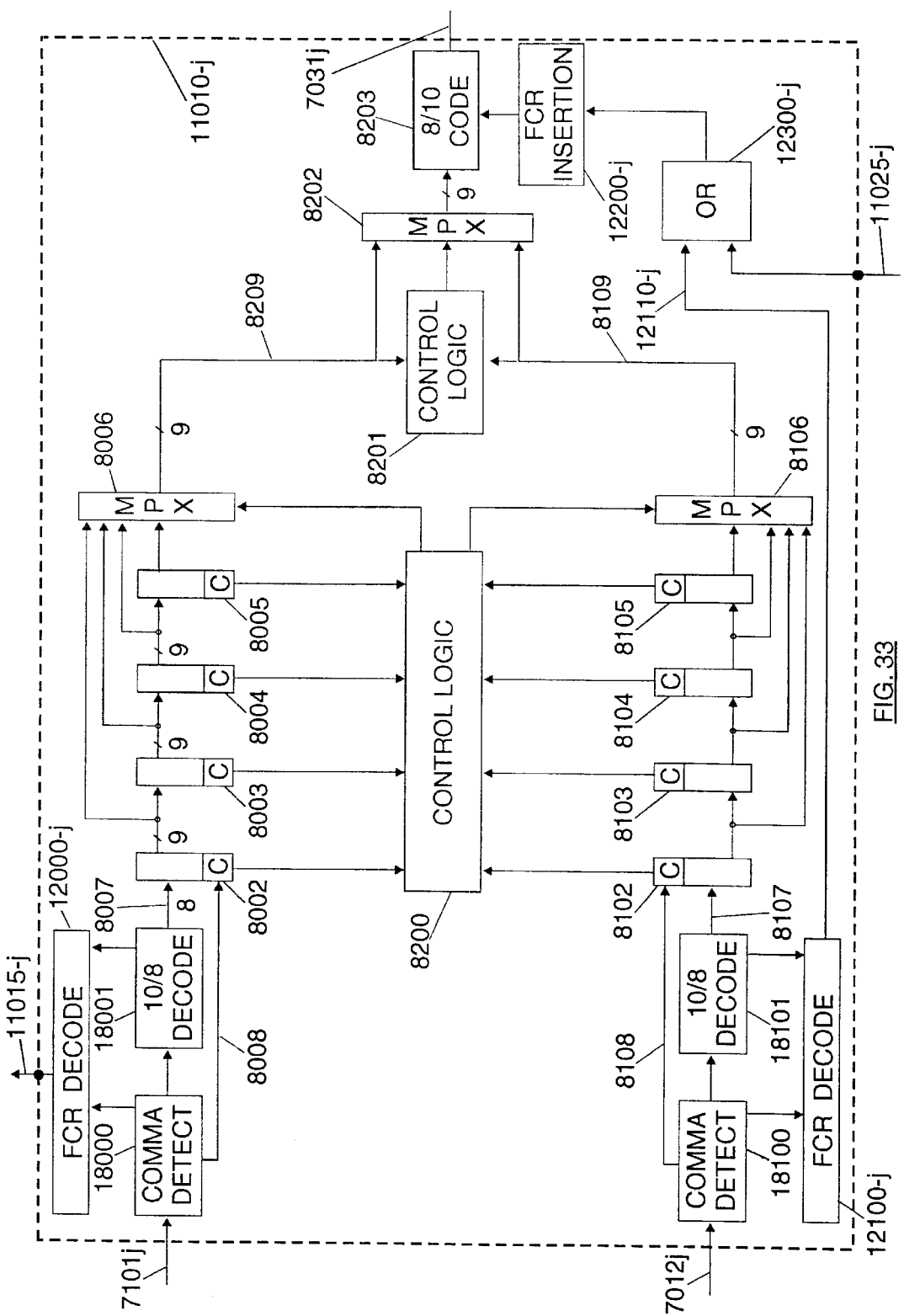
FIG. 33 shows the internal structure of the fan-in circuit 11010-j.

FIG. 33 shows the internal structure of fan-in circuit 11010-j (which is identical to the fan-in circuit 11020-j). Fan-in circuit 11010-j is derived from the internal structure of the merging data cell circuit 7010-j that was described with reference to FIG. 24. Therefore, the elements of fan-in circuit 11010-j that appear to be similar to that of merging circuit 7010-j described previously will carry the same reference numbers for clarity's sake, and will not be further described. It should be noted that K.28.5 circuits 8000 and 8100, 10B/8B decode circuits 8001 and 8101, and 8B/10B coding circuit 8203 are adapted in order to manage the respective decoding and coding of two different commas characters which are used in order to create an additional flow control channel as explained in copending application (FR997055). Basically, this is achieved by means of the use of two among the three available "comma characters" in order to create this specific flow control channel. When the cells are idle or empty, the nature of the comma character that appears at the beginning of the cell provides the appropriate flow control bit information. For instance, should the K.28.5 character be detected, the receiving entity (either the core or the remote SCAL) will decode it as a positive state, while the other character K.28.1. will be determined as being characteristic of a negative state. Those adapted circuits 8000, 8100, 8001, 8101 and 8203 respectively receive the new reference numbers 18000, 18100, 18001, 18101 and 18203.

In addition to these elements fan-in circuit 11010-j includes the components that will provide the combination of the flow control receive information that comes either from serializer 1190-j located in core 10400 with the flow control receive information that is produced by the fan-in circuit 11020-j. These components comprise two comma detector circuits 18000 and 18100 that respectively receive the data cells from cores 10400 on lead 7012-j and from core 10200 on lead 7011-j. In addition two FCR decode circuits 12100-j and 12000-j, a FCR insertion circuit 12200-j and an OR gate 12300-j are used. When the cell which is received on lead 7012-j is an empty cell, the nature of the comma character that appears at the beginning of the cell is used to determine the state of the flow control information. For instance, should the K.28.5 character be detected, the comma detection circuit 18100 will decode it as a positive flow control receive (FCR) information while, the detection of the K.28.1 character will be decoded as a negative flow control information. When the cell that arrives on lead 7012-j appears to be a data cell—characterized by the lack of comma character on the first byte of the cell—then the 10B/8B decode circuit 18101-j will detect a predetermined bit in the first byte of the cell which will provide the flow control information. In other words, the circuit 18100 detects the flow control information in the idle cell, while the circuit 18101 is used for detecting the flow control information in the data cell. In any case the flow control information is reported to FCR decode circuit 12100-j, as represented in FIG. 33, which can issue a corresponding FCR control signal that is transported to a first input lead of OR gate 12300-j. The second input lead of the OR gate receives the control signal that is generated by the associated fan-in circuit 11020-j on lead 11025-j, when the latter appears to receive, and decode, a FCR control signal generated by the core 10300. Therefore, the output of OR gate 12300 carries an aggregate flow control receive signal that reports the occurrence of a saturation condition that happens either in core 10400 or core 10300, which must be reported to PINT circuit 511-j as explained above. This signal that is produced by OR gate 12300-j is introduced into a FCR insertion circuit 12200-j that will control the 8B/10B coding circuit 18203 to use the appropriate comma character in accordance with the saturation condition existing in core 10400 or 10300. Similarly, the comma detection circuit 18000 detects the nature of the comma characters in the empty cells, and 10B/8B decode circuit 18001 detects the FCR bit in the data cell. Therefore, the flow control receive information that is detected either in circuit 18000 or 18001 is reported to FCR decode circuit 12000-j which issues a corresponding control signal that is transmitted to the associated fan-in circuit 11020-j on a lead 11015-j. Lead 11015-j corresponds to the same function than that performed by lead 11025-j used for transmitting the FCR signal from one fan-in circuit to the other associated one. Therefore, when a local saturation occurs in core 10200, the FCR signal which is introduced in the cells by serializer 1190-j is received by fan-in circuit 11010-j and can be reported to the associated fan-in circuit 11020-j so that the latter can introduce that information into the 8B/10B coded cells which can then be remotely transported on wire 4400-j and received by the SCAL 10500-j that contains the PINT circuit that must be stopped.

Therefore, with the teaching of the present invention, it appears that, in any case, the flow control receive information can be transported upstream. Obviously, as the port expansion was represented with only a coefficient of expansion of two, the invention can be easily embodied in any other kind of port expansion architecture, such as that of FIG. 18 that shows an expansion coefficient of four. This is simply achieved by using the improved fan-in circuit, as illustrated in FIG. 33, in the architecture which is shown in FIG. 20 so as to permit the port expansion factor of 4.

APPENDIX

| tables Address SRH | 1002-i | 1020-0 | 1020-1 | 1020-2 | 1020-3 | — |
|---|---|---|---|---|---|---|
| x'0000' | x'8000' | x'8000' | valid bit off | valid bit off | valid bit off | |

APPENDIX-continued

| tables Address SRH | 1002-i | 1020-0 | 1020-1 | 1020-2 | 1020-3 |
|---|---|---|---|---|---|
| x'0001' | " | x'4000' | " | valid bit off | valid bit off |
| x'0002' | " | x'2000' | " | valid bit off | valid bit off |
| x'0003' | " | x'1000' | " | valid bit off | valid bit off |
| x'0004' | x'4000' | valid bit off | x'8000' | valid bit off | valid bit off |
| x'0005' | " | " | x'4000' | valid bit off | valid bit off |
| x'0006' | " | " | x'2000' | valid bit off | valid bit off |
| x'0007' | " | " | x'1000' | valid bit off | valid bit off |
| x'0008' | x'2000' | valid bit off | valid bit off | x'8000' | valid bit off |
| x'0009' | " | " | " | x'4000' | valid bit off |
| x'000A' | " | " | " | x'2000' | valid bit off |
| x'000B' | " | " | " | x'1000' | valid bit off |
| x'000C' | x'1000' | valid bit off | valid bit off | valid bit off | x'8000' |
| x'000D' | " | " | " | valid bit off | x'4000' |
| x'000E' | " | " | " | valid bit off | x'2000' |
| x'000F' | " | " | " | valid bit off | x'1000' |
| . | . | . | . | . | . |
| . | . | . | . | . | . |
| x'0100' processor | x'0000' | valid bit off | valid bit off | valid bit off | valid bit off |
| . | . | . | . | . | . |
| . | . | . | . | . | . |

What is claimed is:

1. A flow control method for a switching system comprising at least one switch core connected through serial communication links to remote and distributed Protocol Adapters or Protocol Engines through a plurality of Switch Core Access Layer (SCAL) elements;

wherein for each input port i:
each of said SCAL elements comprises a receive Protocol Interface for the handling of the particular protocol corresponding to the adapter assigned to the input port i and a first serializer for providing cells in at least one serialized data flow which can be transmitted through a first communication link;
said switch core comprises a first deserializer for receiving the serialized cells from said first communication link and wherein for each output port j:
each of said SCAL elements comprises a transmit Protocol Interface for the handling of the protocol corresponding to the adapter associated with one output port j, and a second deserializer for receiving the cells transported on at least one serialized data flow through a second communication link;
said switch core comprises a second serializer for the connection to said second communication link assigned to the output port j;

the flow control method comprising the steps of:
monitoring the input i of said switch core in order to detect the occurrence of a saturation condition on input port i;
in response to the detection of said saturation condition occurring on one particular input port i, transmitting a corresponding internal flow control receive signal to the second serializer corresponding to that input port and located in said switch core;
inserting by means of said second serializer a flow control receive (FCR) signal in the data flow conveyed through the second serial communication link attached to that particular output port;
detecting the reception of said flow control receive (FCR) signal in the data flow received by said second deserializer;
in response to the detection of said flow control receive (FCR) signal in said second deserializer, forwarding such flow control receive signal to the receive Protocol Interface in order to inform the receive Protocol Interface that no additional cell should be transmitted to the considered input port i,
whereby the flow control receive (FCR) signal can be transmitted upstream in a direction that is opposite with respect to the normal data flow on said first serial communication link.

2. The flow control method according to claim 1 further comprising the steps of:
monitoring the state of the transmit Protocol Interface attached to the output port j in order to determine a saturation condition;
in response to the detection of said saturation condition occurring to that particular transmit Protocol Interface, transmitting a corresponding internal flow control transmit (FCX) control signal to the first serializer corresponding to that output port (i=j) and located in said switch core;
inserting by means of said first serializer a flow control transmit (FCX) signal in the data flow conveyed through the first serial communication link attached to that particular input port j;
detecting the reception of said flow control transmit (FCX) information in the data flow received by said first deserializer;
in response to the detection of said flow control transmit (FCX) signal in said second deserializer, forwarding such flow control transmit signal to the switch core in order to inform the switch core that no additional cell should be transmitted to the considered output port i,
whereby the flow control transmit (FCX) signal can be transmitted upward in a direction that is opposite with respect to the normal data flow on said serial communication link.

3. The flow control method according to claim 2 adapted to a switching architecture based on a set of nxn individual switching systems connected in a port expansion mode, said switching architecture comprising:
n input groups of n switching structures each, each group being arranged to receive by means of fan-out or duplicating circuits the cells that are transmitted to the corresponding input i of the n elementary switching structures therein included;
the set of nxn switching structures being organized in n output groups of n switching structures each, each switching structure of a considered output group having its output port j transmitting the cells to the same direction;
n groups of fan-in or merging circuits for providing each circuit the fan-in operation for the elementary switching structures belonging to a common output group, n groups of SCAL elements, each comprising a Protocol Interface receive, Protocol Interface transmit, a first serializer and a second deserializer, said method further comprising the steps of:
monitoring in each SCAL element a saturation condition occurring in said transmit Protocol Interface;
transmitting a corresponding internal flow control Ttansmit (FCX) signal to the serializer located in the SCAL element that detected the saturation condition;
introducing a flow control transmit (FCX) signal into the normal data flow which is conveyed throughout said first serial communication link;
detecting said FCX signal in the data flow propagated by said first communication link and the fan-out circuit to the deserializer of the switching structures belonging to the same input group;
transmitting an internal flow control transmit (FCX) signal to every switching structure belonging to the same output group so that the data flow received by the saturated Protocol Interface decreases.

4. The flow control process according to claim 1 adapted to a switching architecture based on a set of n×n individual switching systems connected in a port expansion mode, said switching architecture comprising:

n input groups of n switching structures each, each group being arranged to receive by means of fan-out or duplicating circuits the cells that are transmitted to the corresponding input i of the n elementary switching structures therein included;

the set of n×n switching structures being organized in n output groups of n switching structures each, each switching structure of a considered output group having its output port j transmitting the cells to the same direction;

n groups of fan-in or merging circuits for providing each circuit the fan-in operation for the elementary switching structures belonging to a common output group, n groups of SCAL elements, each comprising a Protocol Interface receive, a Protocol Interface transmit, a first serializer and second deserializer, said method further comprising the steps of:
monitoring the occurrence of a saturation condition in each switching structure;
transmitting a corresponding internal flow control receive (FCX) signal to the serializer located in said saturated switching structure;
introducing a flow control receive (FCR) signal into the normal data flow which is conveyed to said fan-in circuit;
propagating said flow control receive (FCR) signal to the fan-in circuits which are associated with the switching structures belonging to the same input groups so that the signal can be received by the deserializer located in the SCAL belonging to said input groups;
forwarding said FCR signal to the Protocol Interface receive circuits which belong to the same group so that the data flow coming into the saturated switching group can be reduced.

5. The method according to anyone of claims 1 to 4 wherein the first and second serial communication links carries data flows that are coded in accordance with an 8B/10B coding scheme and, in addition, two comma characters are used for this coding in order to create a special out-of-band channel for transporting either of the flow control receive or the flow control transmit signals.

* * * * *